United States Patent
Olsson et al.

(10) Patent No.: US 11,209,115 B2
(45) Date of Patent: Dec. 28, 2021

(54) PIPE INSPECTION AND/OR MAPPING CAMERA HEADS, SYSTEMS, AND METHODS

(71) Applicant: SeeScan, Inc., San Diego, CA (US)

(72) Inventors: Mark S. Olsson, La Jolla, CA (US); Michael J. Martin, San Diego, CA (US); Adam Mullett, San Diego, CA (US); Alexander L. Warren, Escondido, CA (US)

(73) Assignee: SEESCAN, INC., San Diego, CA (US)

( * ) Notice: Subject to any disclaimer, the term of this patent is extended or adjusted under 35 U.S.C. 154(b) by 0 days.

(21) Appl. No.: 16/687,057

(22) Filed: Nov. 18, 2019

(65) Prior Publication Data

US 2020/0173602 A1 Jun. 4, 2020

Related U.S. Application Data

(60) Provisional application No. 62/768,760, filed on Nov. 16, 2018.

(51) Int. Cl.
*F16L 55/48* (2006.01)
*F16L 55/46* (2006.01)
(Continued)

(52) U.S. Cl.
CPC .............. *F16L 55/48* (2013.01); *F16L 55/46* (2013.01); *G01C 21/16* (2013.01); *G01V 3/12* (2013.01);
(Continued)

(58) Field of Classification Search
CPC ......... H04N 2005/2255; H04N 5/2253; H04N 5/2256; H04N 5/2355; H04N 7/183;
(Continued)

(56) References Cited

U.S. PATENT DOCUMENTS 6,020,918 A * 2/2000 Murphy ............... G01N 21/954
108/93
6,111,600 A * 8/2000 McLeod ................... E03F 7/12
348/84

(Continued)

FOREIGN PATENT DOCUMENTS

| EP | 3130900 A1 | 2/2017 |
| WO | 2009/097616 A1 | 8/2009 |
| WO | 2018/031471 A2 | 2/2018 |

OTHER PUBLICATIONS

International Searching Authority, Written Opinion of the International Searching Authority for PCT Patent Application No. PCT/US19/62070, dated Jun. 18, 2020, European Patent Office, Munich.

*Primary Examiner* — Paulos M Natnael

(74) *Attorney, Agent, or Firm* — Michael J. Pennington, Esq.; Steven C. Tietsworth, Esq.

(57) ABSTRACT

Camera heads and associated systems, methods, and devices for inspecting and/or mapping pipes or cavities are disclosed. A camera head may be coupled to a push-cable and may include one or more image sensors to capture images and/or videos from interior of the pipe or cavity. One or more multi-axis sensors may be disposed in the camera head to sense data corresponding to movement of the camera head within the pipe or cavity. The images and/or videos captured by the image sensors may be used in conjunction with the data sensed by the multi-axis sensors to generate information pertaining to the pipe or cavity may be generated.

22 Claims, 30 Drawing Sheets

(51) Int. Cl.
  *G01C 21/16* (2006.01)
  *G01V 3/12* (2006.01)
  *H04N 5/225* (2006.01)
  *H04N 5/235* (2006.01)
  *H04N 7/18* (2006.01)
  *F16L 101/30* (2006.01)

(52) U.S. Cl.
  CPC ......... *H04N 5/2253* (2013.01); *H04N 5/2256* (2013.01); *H04N 5/2355* (2013.01); *H04N 7/183* (2013.01); *F16L 2101/30* (2013.01); *H04N 2005/2255* (2013.01)

(58) Field of Classification Search
  CPC ........ G03B 37/005; F16L 55/48; F16L 55/46; F16L 2101/30; G01C 21/16; G01V 3/12; G06F 11/0778; G06F 11/3466; G06F 11/1407; G06F 11/0709; G06F 11/0715; G06F 11/1471
  See application file for complete search history.

(56) References Cited

U.S. PATENT DOCUMENTS

| | | | |
|---|---|---|---|
| 2002/0131781 A1* | 9/2002 | Buck | H04N 5/2259 396/419 |
| 2016/0261829 A1* | 9/2016 | Olsson | H04N 5/23293 |
| 2017/0026554 A1* | 1/2017 | Olsson | H04N 5/2254 |
| 2018/0169719 A1* | 6/2018 | Turner | E03F 7/12 |
| 2018/0249061 A1* | 8/2018 | Olsson | H04N 5/23203 |
| 2018/0283953 A1* | 10/2018 | Frank | H04N 5/33 |
| 2018/0313715 A1* | 11/2018 | Cichosz | G01M 3/40 |
| 2018/0350056 A1* | 12/2018 | Cardenas Bernal | G01N 21/9515 |
| 2018/0373019 A1* | 12/2018 | Thursby | E21B 47/002 |
| 2019/0079279 A1* | 3/2019 | Thursby | E21B 47/002 |
| 2019/0331284 A1* | 10/2019 | Phillips | G05D 1/0011 |
| 2019/0346330 A1* | 11/2019 | Krohlow | G01N 21/954 |
| 2020/0088653 A1* | 3/2020 | Martin | G01N 21/954 |

* cited by examiner

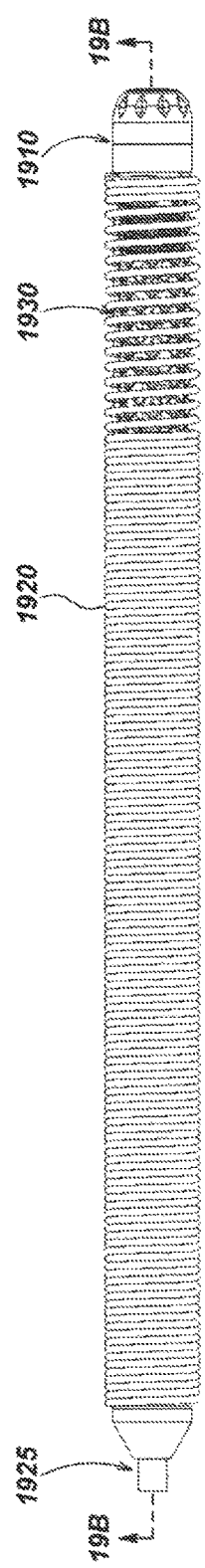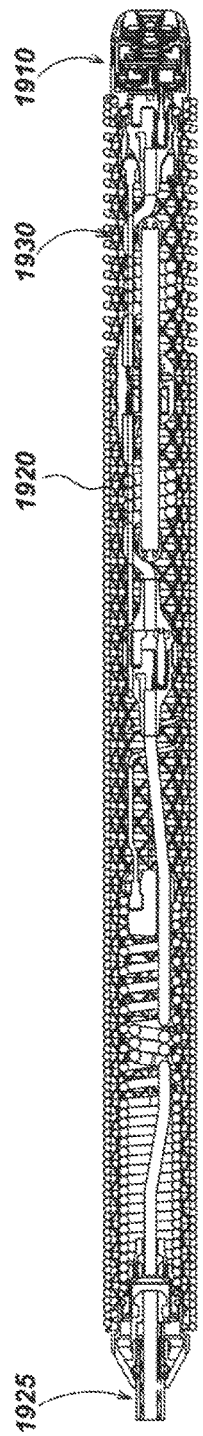
FIG. 19A
FIG. 19B

PIPE INSPECTION AND/OR MAPPING CAMERA HEADS, SYSTEMS, AND METHODS

FIELD

This disclosure relates generally to pipe inspection and/or mapping. More specifically, but not exclusively, this disclosure relates to pipe inspection and/or mapping camera heads, including high dynamic range camera heads, for inspecting and/or mapping an interior of pipes, cavities, or other conduits.

BACKGROUND

There are many situations where it is desirable to internally inspect pipes or other difficult to access cavities or voids that are already in place, whether underground, in a building, or underwater. For example, various utility pipes (e.g., sewer, water, gas, electrical conduits, fiber optic conduits, or the like) frequently must be internally inspected to diagnose any existing problems and to determine if there are any breaks causing leakage or obstructions impairing the free flow of waste. Likewise, such pipes may often require excavation for repair, improvement, or other servicing. Precise mapping of such pipes may be instrumental in avoiding damage to infrastructure and thereby avoiding hazardous situations to crews performing the excavation.

Traditional systems and method for inspecting the pipes include a camera head disposed on a push cable that may be forced down a pipe to display the interior of the pipe on a camera control unit (CCU) or other video display. Such pipe inspection camera heads and associated systems, devices, and methods visually inspect the interior of the pipes and to identify defects caused by, for example, ingress of roots; pipe cracks or breaks; corrosion; leakage; and/or other defects or blockages inside the pipe. Camera heads and associated systems and devices known in the art configured to produce in pipe imagery are limited in exposure range thus making elements existing in the pipe often difficult to discern by one or more human operators. Such limitations in pipe imagery often result in situations where problems existing inside the pipe may be missed or otherwise misdiagnosed by the system operator(s). Further, traditional camera heads and associated devices and systems are generally lacking in functionality to provide an array of other inspection and camera head data which may be useful in the inspection and mapping of pipes.

Accordingly, there is a need in the art to address the above-described as well as other problems.

SUMMARY

This disclosure relates generally to camera heads and pipe inspection and/or mapping systems and methods used to inspect and/or map the interior of pipes and other conduits, cavities, or voids. More specifically, but not exclusively, this disclosure relates to pipe inspection and mapping camera heads, including high dynamic range camera heads, as used in pipe inspection and mapping systems and methods for enhanced inertial data and improved pipe mapping.

According to one aspect, a camera head may be coupled to a push-cable and may include one or more image sensors to capture images and/or videos from interior of the pipe or cavity. One or more multi-axis sensors may be disposed in the camera head to sense data corresponding to movement of the camera head within the pipe or cavity. The images and/or videos captured by the image sensors may be used in conjunction with the data sensed by the multi-axis sensors to generate information pertaining to the pipe or cavity may be generated.

According to another aspect, a system for inspecting and/or mapping a pipe or avity may include a cable storage drum, a push-cable stored in turns inside the cable storage drum and having a distal end and a proximal end, a camera head coupled to the distal end of the push-cable. The camera head may include one or more image sensors to capture images and/or videos from the interior of a pipe or cavity. The camera head may be movable in a first direction when the push-cable is deployed into the pipe or cavity and a second direction when the push-cable is retracted from the pipe or cavity. The system may further include a multi-axis inertial sensor disposed in the camera head to sense three dimensional inertial data corresponding to movement of the camera head in the first direction and the second direction, and a processing element communicatively coupled to the image sensors and the inertial sensor, to receive the images and/or videos from the image sensors and the sensed inertial data from the inertial sensor. Based at least on the received images and/or videos and the inertial data sensed during movement of the camera head in the first direction and the second direction, the processing element may generate information pertaining to the pipe or cavity.

The system may further include a cable counter to generate cable count data indicative of an amount of cable dispensed or retracted to/from the cable storage drum. The processing element may receive such cable count data and correlate, based at least on the cable count data, the inertial data sensed in the first direction and the second direction. The processing element may associate the images and/or videos of the pipe or cavity with the correlated data to generate a pipe map. The pipe map may include one or more location points corresponding to location points on a ground surface.

According to another aspect, a camera head for inspecting and/or mapping a pipe or cavity may include an outer housing having a hollow interior and a camera module assembly disposed in the hollow interior. The camera module assembly may include a rotating assembly rotatable relative to the outer housing, a stationary assembly and a slip ring electrically coupling the stationary assembly and the rotating assembly. The rotating assembly may include one or more image sensors to capture one or more images and/or videos and generate an output signal corresponding to the captured images and/or videos. The rotating assembly may further include a first processing element configured to control operation of the image sensors. The stationary assembly may include a multi-axis inertial sensor to generate inertial data related to movements of the camera head, and may further include a second processing element configured to receive and process the output signal from of the image sensors and the inertial data from the multi-axis inertial sensor, to generate information pertaining to a pipe or cavity.

According to another aspect, a pipe inspection and/or mapping system is disclosed that may include a motion tracking camera head to generate a video signal representing real time or near real time images of scenes from the inside of a pipe and inertial data relating to measured positions or related aspects of the camera head and movements thereof. The system may further include a cable storage drum (interchangeably referred to as a drum reel) rotatably mounted on a support frame and a resilient, flexible push cable having a conductive element for communicating video and data signals to and from the camera head operatively connected to a distal end of the push cable and to and from a central hub of the drum reel operatively connected to a proximal end of the push cable. The push cable may be stored in continuous turns on the drum reel, to be unwound and dispensed from the drum reel to force the camera head a substantial distance down a length of the pipe. A cable counting element may be provided to generate cable counting data measuring the distance of the push cable distributed out of the drum reel. A processing element may be disposed in one or more system devices for receiving at least the inertial data and cable counting data and generating control signals and output data from methods associated with corrected inertial data and pipe mapping. A non-transitory computer-readable memory may be disposed in one or more system devices for storing video and non-video data as well as associated output data. The system may further include a display element for displaying real time or post processed video or still images and other system and camera head data.

In another aspect, a motion tracking camera head is disclosed that may include an outer housing having a hollow interior in which a camera module assembly may be disposed. The camera module may include one or more image sensors for generating a video signal representing real time or near real time images of scenes in view of the image sensor(s). The camera head may include an illumination element configured to illuminate the field of view of the one or more image sensors. A multi-axis inertial sensor including at least one nine-axis sensor, may be disposed in the camera head, comprising at least accelerometers, magnetometers, and gyroscopic sensors measuring in three dimensions and configured to generate inertial data relating to measured positions or related aspects of the camera head and movements thereof. The camera head may further include a processing element to receive video signals, inertial data, and other non-video data which may include instructions from one or more directly or indirectly wired or wirelessly coupled system devices and perform operations relating to received instructions as well as received video signals and other data and generate related output video and non-video data signals that include the inertial data as well as command signals for controlling aspects of the camera head and other system devices.

In another aspect, a self-leveling motion tracking camera head is disclosed that may include an outer housing having a hollow interior in which a camera module assembly may be disposed. The camera module assembly may include a rotating assembly and a stationary assembly. The rotating assembly may be weighted along one side to be rotatable relative to the outer housing and contain one or more image sensors for generating a video signal that includes video and still image data corresponding to an interior of a pipe. The stationary assembly may be disposed inside and movable relative to the outer housing, comprising at least one nine-axis sensor comprising at least accelerometers, magnetometers, and gyroscopic sensors measuring in three dimensions configured to generate inertial data relating to measured positions or related aspects of the camera head and movements thereof. The stationary assembly may further include a processing element to receive video signals, inertial data, and other non-video data which may include instructions from one or more directly or indirectly wired or wirelessly coupled system devices and perform operations relating to received instructions as well as received video signal and other data and generate related output video and non-video data signals that include the inertial data as well as command signals for controlling aspects of the camera head and other system devices. The self-leveling motion tracking camera head may further include a slip ring electrically coupling the stationary assembly and the rotating assembly.

In another aspect, another self-leveling motion tracking camera head is disclosed that may include an outer housing having a hollow interior in which a camera module assembly may be disposed. The camera module assembly may include a rotating assembly and a stationary assembly. The rotating assembly may be weighted along one side to be rotatable relative to the outer housing and contain one or more image sensors for generating a video signal that includes video and still image data corresponding to an interior of a pipe. The rotating assembly may further include a first processing element configured to control aspects of the image sensor and/or video signal to enhance output video signals.

The stationary assembly may be disposed inside and movable relative to the outer housing, comprising at least one nine-axis sensor comprising at least accelerometers, magnetometers, and gyroscopic sensors measuring in three dimensions configured to generate inertial data relating to measured positions or related aspects of the camera head and movements thereof. The stationary assembly may further include a second processing element to receive video signals, inertial data, and other non-video data which may include instructions from one or more directly or indirectly wired or wirelessly coupled system devices and perform operations relating to received instructions as well as received video signal and other data and generate related output video and non-video data signals that include the inertial data as well as command signals for controlling aspects of the camera head and other system devices. The self-leveling motion tracking camera head may further include a slip ring electrically coupling the stationary assembly and the rotating assembly.

In another aspect, an inertial data correction and pipe mapping method is disclosed. The method may include determining the location of the access point of the camera head into a pipe and determining the direction of the camera head. The method may further include moving the camera head forward through the pipe while simultaneously determining push cable count data representing the length of push cable dispensed from the drum reel and outgoing inertial navigation data generated at the camera head. The method may further include moving the camera head through the pipe in the reverse direction while simultaneously determining push cable count data representing the length of data collected back into the drum reel and ingoing inertial navigation data generated at the camera head. Outgoing inertial navigation data and ingoing inertial navigation data may be correlated from the push cable count data. The method may include generating corrected inertial data based on correlating outgoing and ingoing inertial data. Optionally, a pipe map based on corrected inertial navigation data may be generated in another step. In a further optional step, the pipe map may be correlated to ground surface locations based on the access point location and directions from prior steps.

In another aspect, a method of depth from defocus for pipe inspection systems is disclosed. The method includes turning on the system, moving the camera head inside a pipe or other void while generating images of the inspection area and simultaneously determining a motion metric for the camera head, and performing depth from defocus during the inspection wherein the motion metric indicates the camera head is stationary or near stationary to within a predetermined threshold.

In another aspect, a method of depth from defocus for pipe inspection systems is disclosed. The method includes turning on the inspection system, moving the camera head inside a pipe or other void while generating images of the inspection area and simultaneously determining a motion metric for the camera head, and performing depth from defocus during the inspection wherein the motion metric indicates the camera head is stationary or near stationary to within a predetermined threshold.

In another aspect, a method for determining pipe and inspection parameters from an inspection system including audio exciter devices is disclosed. The method includes turning on the inspection system that includes a camera head having one or more microphones, moving the camera head inside a pipe while measuring and recording audio signals broadcast by one or more acoustic exciter devices, comparing the spectral signature of the audio signals against a database of audio signal spectral signatures to various pipe and inspection parameters, and determine a best fit match for the spectral signature in database to that received by the microphone(s). In another aspect, a method for alerting and/or avoiding pipe damage with a pipe inspection system having a camera head with one or more microphones. The method includes turning on the inspection system that includes a camera head having one or more microphones, moving the camera head inside a pipe while measuring and recording audio signals generated by the excavation process, comparing the audio signals against a database to determine potential danger to the pipe, and generating alerts to the user/excavator and/or actuating a kill switch to automate turning off of the excavation tools upon identifying danger to the pipe.

In another aspect, a method for controlling auto white balance (AWB) in a pipe inspection system. The method includes turning on the pipe inspection system that includes a camera head having a first AWB setting, continuing with the inspection until the pipe inspection system reaches a configured parameter limit relating to the AWB of the image sensors, and switching the camera head to a second AWB setting.

Various additional aspects, features, devices, systems, and functionality are further described below in conjunction with the appended Drawings.

BRIEF DESCRIPTION OF THE DRAWINGS

The present application may be more fully appreciated in connection with the following detailed description taken in conjunction with the accompanying Drawings, wherein:

FIG. 19A is an illustration of a camera head, push cable spring, and push cable assembly with an optical lace system.

FIG. 19B is a section view of the assembly from FIG. 19A along line 19B-19B.

DESCRIPTION OF EMBODIMENTS

Overview

Figure 1A:
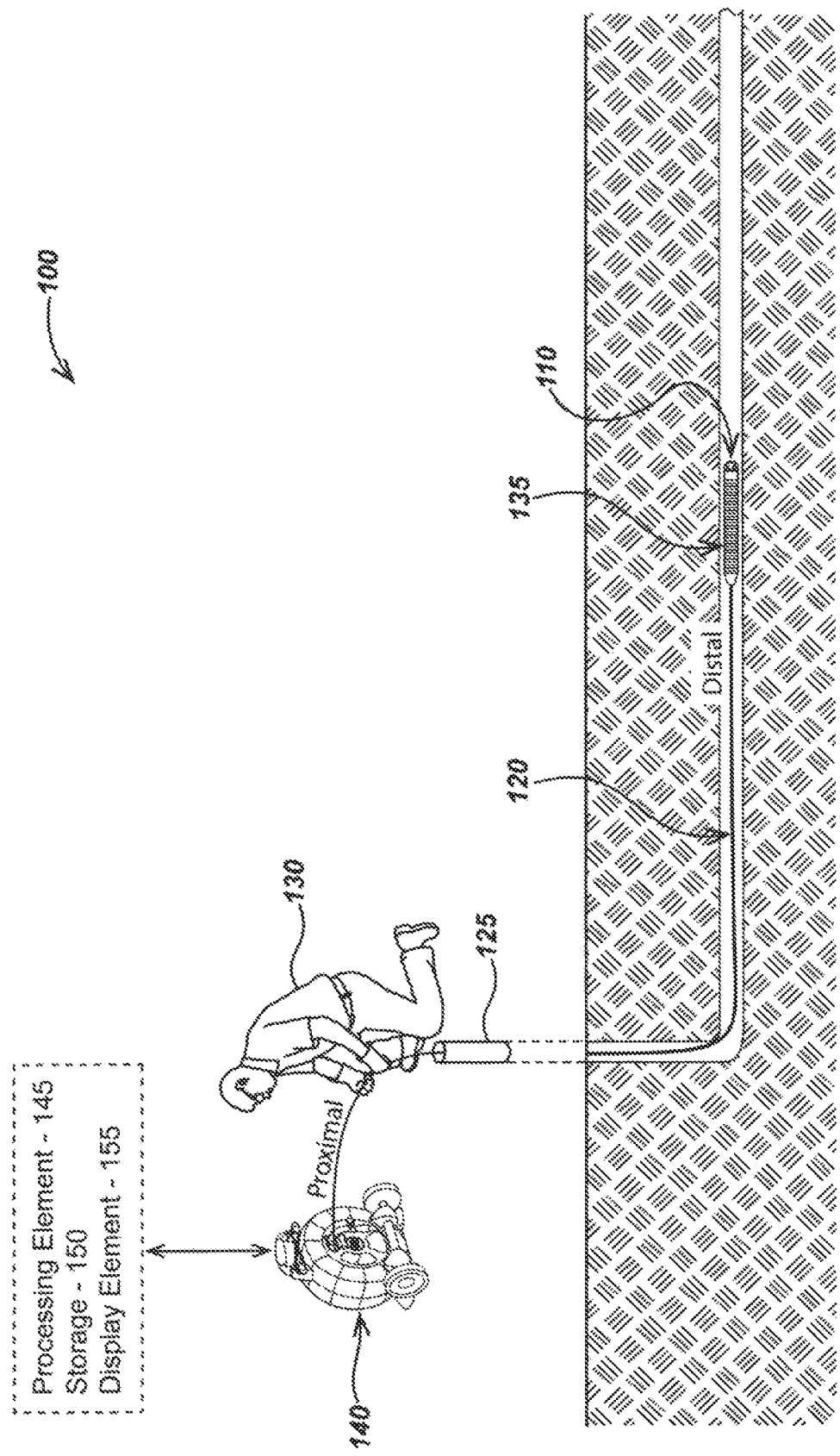
FIG. 1A is an illustration of a pipe inspection and mapping system embodiment in accordance with certain aspects.

This disclosure relates generally to camera heads and pipe inspection and/or mapping systems and methods used to inspect and/or map the interior of pipes and other conduits, cavities or voids. More specifically, but not exclusively, this disclosure relates to pipe inspection and mapping camera heads, including high dynamic range camera heads, as used in pipe inspection and mapping systems and methods for enhanced inertial data and improved pipe mapping.

According to one aspect, a pipe inspection and mapping system is disclosed including a motion tracking camera head configured for generating a video signal representing real time or near real time images of scenes from the inside of a pipe and inertial data relating to measured positions or related aspects of the camera head and movements thereof. The pipe inspection system includes a drum reel rotatably mounted on a support frame and a resilient, flexible push cable having a conductive element for communicating video and data signals to and from the camera head, operatively connected to a distal end of the push cable, and to and from a central hub of the drum reel operatively connected to a proximal end of the push cable wherein the push cable may be stored in continuous turns on the drum reel to be unwound and dispensed from the drum reel to force the camera head a substantial distance down a length of pipe. A cable counting element may generate cable counting data measuring the distance of the push cable distributed out of the drum reel. A processing element may be disposed in one or more system devices for receiving at least the inertial data and cable counting data and generating control signals and output data from methods associated with corrected inertial data and pipe mapping. A computer-readable memory may be disposed in one or more system devices for storing video and non-video data as well as associated output data. The pipe mapping system may further include a display element for displaying real time or post processed video or still images and other system and camera head data.

According to another aspect, the pipe inspection and mapping system may include various other system devices either directly or wirelessly coupled. For instance, the system may include one or more buried utility locator devices configured to receive electromagnetic field signals emitted from a hidden or buried conductor and/or Sonde device so as to determine and map the locations of the electromagnetic signal and associated source therefrom at the ground surface. The system may include one or more tracked rangefinder devices configured to generate imagery of geolocations on the Earth's surface having coordinates in a world coordinate system. A camera control unit (CCU) may be included in the system operatively coupled to the central hub of the drum reel to display and store video or other images representing the interior of the pipe, as well as display, process, and/or store inertial data and/or other non-video data. The system may include one or more remotely or directly coupled smart phones, tablets, laptops, data server computers, and/or other computing devices to display and store video or other images representing the interior of the pipe as well as display, process, and/or store inertial data and/or other non-video data. In the various devices (e.g., in the CCU, utility locating devices, drum reel, computing devices, or the like), WiFi, Bluetooth, and/or other wireless transceiver modules may communicate video/image, inertial, and/or other data for processing, storage, and/or display purposes.

In another aspect, the system may include a Sonde device at a known location relative to the camera head configured to broadcast an electromagnetic signal measurable at a utility locator device to determine the corresponding ground level location of the Sonde device. The Sonde may be disposed along the push cable at a known distance from the camera head and/or disposed in the camera head and may be a multi-frequency device. In some applications, the Sonde device may broadcast signal(s) at various distinct points during the pipe inspection that may be measured at a corresponding ground surface location via a utility locating device. The broadcasts signal(s) at various distinct points during the pipe inspection may be measured at a corresponding ground surface location via a utility locating device wherein each broadcast signal of each distinct point may have a unique frequency or signature.

In according to another, the various system devices may include one or more global navigation satellite system (GNSS) receivers to determine location(s) in a world coordinate system. For instance, GNSS receivers may be global positioning satellite (GPS) receivers disposed in the utility locator device, CCU, drum reel, and/or other system device. Likewise, the system may include one or more GPS backpack devices.

In another aspect, the system may be configured to generate corrected inertial data from inertial data generated from outgoing movements of the camera head correlating to ingoing movement of the camera head during a pipe inspection. The system may further generate a pipe map from the corrected inertial data of the camera head. The system may further correlate the pipe map location to locations at the ground surface.

In another aspect, the system may further include an in-pipe accessory device that may communicate with the camera head through receiving and transmitting a modulated light signal. The accessory may, for example, be a grasping tool for grasping objects which may be inside the pipe, separate Sonde device, a crawler device to aid in navigating the camera head through turns in the pipe, a pipe clearing device configured to remove debris or other unwanted items inside the pipe, or the like.

In another aspect, a motion tracking camera head is disclosed that may include an outer housing having a hollow interior in which a camera module assembly may be disposed. The camera module may including one or more image sensors for generating a video signal representing real time or near real time images of scenes in view of the image sensor(s). The camera head may include an illumination element configured to illuminate the field of view of the one or more image sensors. At least one nine-axis sensor may be included in the camera head comprising at least accelerometers, magnetometers, and gyroscopic sensors measuring in three dimensions and configured to generate inertial data relating to measured positions or related aspects of the camera head and movements thereof. The camera head may further include a processing element to receive video signals, inertial data, and other non-video data which may include instructions from one or more directly or indirectly wired or wirelessly coupled system devices and performing operations relating to received instructions as well as received video signal and other data and generating related output video and non-video data signals that includes the inertial data as well as command signals for controlling aspects of the camera head and other system devices.

In another aspect, a self-leveling motion tracking camera head is disclosed that may include an outer housing having a hollow interior in which a camera module assembly may be disposed. The camera module assembly may include a rotating assembly and a stationary assembly. The rotating assembly may be weighted along one side to be rotatable relative to the outer housing and contain one or more image sensors for generating video signal that includes video and still image data corresponding to an interior of a pipe. The stationary assembly may be disposed inside and movable relative to the outer housing comprising at least one nine-axis sensor comprising at least accelerometers, magnetometers, and gyroscopic sensors measuring in three dimensions configured to generate inertial data relating to measured positions or related aspects of the camera head and movements thereof. The stationary assembly may further include a processing element to receive video signals, inertial data, and other non-video data which may include instructions from one or more directly or indirectly wired or wirelessly coupled system devices and performing operations relating to received instructions as well as received video signal and other data and generating related output video and non-video data signals that includes the inertial data as well as command signals for controlling aspects of the camera head and other system devices. The self-leveling motion tracking camera head may further include a slip ring electrically coupling the stationary assembly and the rotating assembly.

In another aspect, another self-leveling motion tracking camera head is disclosed that may include an outer housing having a hollow interior in which a camera module assembly may be disposed. The camera module assembly may include a rotating assembly and a stationary assembly. The rotating assembly may be weighted along one side to be rotatable relative to the outer housing and contain one or more image sensors for generating video signal that includes video and still image data corresponding to an interior of a pipe. The rotating assembly may further include a first processing element configured to control aspects of the image sensor and/or video signal to enhance output video signal. The stationary assembly may be disposed inside and movable relative to the outer housing comprising at least one nine-axis sensor comprising at least accelerometers, magnetometers, and gyroscopic sensors measuring in three dimensions configured to generate inertial data relating to measured positions or related aspects of the camera head and movements thereof. The stationary assembly may further include a second processing element to receive video signals, inertial data, and other non-video data which may include instructions from one or more directly or indirectly wired or wirelessly coupled system devices and performing operations relating to received instructions as well as received video signal and other data and generating related output video and non-video data signals that includes the inertial data as well as command signals for controlling aspects of the camera head and other system devices. The self-leveling motion tracking camera head may further include a slip ring electrically coupling the stationary assembly and the rotating assembly.

In another aspect, the motion tracking camera heads may have high dynamic range (HDR) or auto HDR image sensors. In some second embodiments, a processing element may be configured to generate HDR video and images. Such embodiments may use inertial data as a metric in generating HDR video and images.

In another aspect, the motion tracking camera heads may include one or more Sondes disposed in the camera heads which may be multi-frequency Sondes.

In another aspect, the camera head may include a variety of other sensors. For instance, the camera head may include a temperature sensor configured to measure camera head temperature, a humidity sensor configured to measure humidity inside the camera head, and/or one or more distance ranging sensors configured to measure distance to aspects in the pipe viewed by the image sensor(s).

In another aspect, the camera head may be configured to modulate the light emitted by the illumination module. The modulation of the illumination element may be used to transmit data with an in-pipe accessory device. The camera head may, likewise, be configured to receive, interpret, and perform operations relating to transmitted data in the form of modulated light from an in-pipe accessory device.

In another aspect, an inertial data correction and pipe mapping method is disclosed. The method may include determining the location of the access point of the camera head into a pipe and determining the direction of the camera head. The method may further include moving the camera head forward through the pipe while simultaneously determining push cable count data representing the length of push cable dispensed from the drum reel and outgoing inertial navigation data generated at the camera head. The method may further include moving the camera head through the pipe in the reverse direction while simultaneously determining push cable count data representing the length of data collected back into the drum reel and ingoing inertial navigation data generated at the camera head. Outgoing inertial navigation data and ingoing inertial navigation data may be correlated from the push cable count data. The method may include generating corrected inertial data based on correlating outgoing and ingoing inertial data. Optionally, a pipe map based on corrected inertial navigation data may be generated in another step. In a further optional step, the pipe map may be correlated to ground surface locations based on the access point location and directions from prior steps.

In another aspect, access point location where the camera head enters a pipe at the ground surface may be determined. For instance, access point location may be determined by GPS, by a user and input into the pipe mapping system, identified and photographed by a tracked distance measuring device, the camera head may automatically identify the access point location, and/or like device or technique to determine locations in a world coordinate system.

In another aspect, the direction of the camera head may be determined, for instance, by compass sensor data at the camera head, determined by location points along the ground surface, or the like. In some embodiments, compass data may be corrected or improved by known location points at the ground surface.

In another aspect, the mapping of utility lines may include camera heads and assemblies and systems including camera heads having various sensors and apparatus to determine bend and turns in pipes or like conduits in both degree and direction. For instance, at one embodiment in keeping with the present disclosure may include a camera head or assembly including a camera head (e.g., assembly further including a push cable and/or push cable spring) which may include one or more strain gauges to measure the degree and direction of bends and turns in the pipe as the assembly is moved through. Likewise, at least one embodiment may include an assembly having a series of spatially separated inertial sensors with known orientations wherein the degree and direction of bends and turns in the pipe are measured and mapped via changes in the alignment of the inertial sensors as the assembly is moved through the bends and turns. In at least one embodiment in keeping with the present disclosure, the measuring and mapping of bends and turns may be achieved via an optical lace system. Such an optical lace system may have a deformable lattice structure embedded with optical fibers or similar optical pathways to interpret the movement of the lattice structure via changes in light determined at a number of light sensors and wherein the movements of the lattice structure are interpreted as movements of the camera head assembly through bends and turns in a pipe for purposes of mapping. In some embodiments, the optical lace system may function as a push cable spring providing improved handling and control in moving the camera head and assembly through the pipe or other conduit. For instance, such an optical lace push cable spring may have various sections of differing stiffness to improve handling.

In another aspect, the push cable springs of the various embodiments herein may be 3D printed. For instance, in embodiments having an optical lace push cable spring, 3D printing process may allow for the resolution to form the intricate lattice structure of the optical lace push cable spring. Likewise, a 3D printing process may be used to form other push cable springs. In such embodiments, the 3D printing process may allow for low cost push cable springs having intricate details and unique mechanical properties.

In another aspect, a method of depth from defocus for pipe inspection systems is disclosed. The method includes turning on the system, moving the camera head inside a pipe or other void while generating images of the inspection area and simultaneously determining a motion metric for the camera head, and performing depth from defocus during the inspection wherein the motion metric indicates the camera head is stationary or near stationary to within a predetermined threshold.

In another aspect, a method of depth from defocus for pipe inspection systems is disclosed. The method includes turning on the inspection system, moving the camera head inside a pipe or other void while generating images of the inspection area and simultaneously determining a motion metric for the camera head, and performing depth from defocus during the inspection wherein the motion metric indicates the camera head is stationary or near stationary to within a predetermined threshold.

In another aspect, a method for determining pipe and inspection parameters from an inspection system including audio exciter devices is disclosed. The method includes turning on the inspection system that includes a camera head having one or more microphones, moving the camera head inside a pipe while measuring and recording audio signals broadcast by one or more acoustic exciter devices, comparing the spectral signature of the audio signals against a database of audio signal spectral signatures to various pipe and inspection parameters, and determine a best fit match for the spectral signature in database to that received by the microphone(s). In another aspect, a method for alerting and/or avoiding pipe damage with a pipe inspection system having a camera head with one or more microphones. The method includes turning on the inspection system that includes a camera head having one or more microphones, moving the camera head inside a pipe while measuring and recording audio signals generated by the excavation process, comparing the audio signals against a database to determine potential danger to the pipe, and generating alerts to the user/excavator and/or actuating a kill switch to automate turning off of the excavation tools upon identifying danger to the pipe.

In another aspect, a method for controlling auto white balance (AWB) in a pipe inspection system. The method includes turning on the pipe inspection system that includes a camera head having a first AWB setting, continuing with the inspection until the pipe inspection system reaches a configured parameter limit relating to the AWB of the image sensors, and switching the camera head to a second AWB setting. The first AWB setting is optimized for viewing the external environment before entering the pipe. For instance, the first AWB setting may turn off AWB. The configured parameter limit may be or include a time setting from turning on the system, is related to push cable count provided by a cable counter element, and/or is related to a motion metric of the camera head. The second AWB setting may be optimized for viewing the internal environment in the pipe. For instance, the second AWB setting may have the AWB turned on.

Various aspects of pipe inspection and/or mapping systems, apparatus, devices, configurations and methods that may be used in conjunction with the details herein of various embodiments are described in co-assigned patents and patent applications including: U.S. Pat. No. 6,545,704, issued Apr. 7, 1999, entitled VIDEO PIPE INSPECTION DISTANCE MEASURING SYSTEM; U.S. Pat. No. 5,939,679, issued Aug. 17, 1999, entitled VIDEO PUSH CABLE; U.S. Pat. No. 6,831,679, issued Dec. 14, 2004, entitled VIDEO CAMERA HEAD WITH THERMAL FEEDBACK LIGHTING CONTROL; U.S. Pat. No. 6,862,945, issued Mar. 8, 2005, entitled CAMERA GUIDE FOR VIDEO PIPE INSPECTION SYSTEM; U.S. Pat. No. 6,908,310, issued Jun. 21, 2005, entitled SLIP RING ASSEMBLY WITH INTEGRAL POSITION ENCODER; U.S. Pat. No. 6,958,767, issued Oct. 25, 2005, entitled VIDEO PIPE INSPECTION SYSTEM EMPLOYING NON-ROTATING CABLE STORAGE DRUM; U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled A COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,298,126, issued Nov. 20, 2007, entitled SONDES FOR LOCATING UNDERGROUND PIPES AND CONDUITS; U.S. Pat. No. 7,332,901, issued Feb. 19, 2008, entitled LOCATOR WITH APPARENT DEPTH INDICATION; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,443,154, issued Oct. 28, 2008, entitled MULTI-SENSOR MAPPING OMNIDIRECTIONAL SONDE AND LINE LOCATOR; U.S. Pat. No. 7,498,797, issued Mar. 3, 2009, entitled LOCATOR WITH CURRENT-MEASURING CAPABILITY; U.S. Pat. No. 7,498,816, issued Mar. 3, 2009, entitled OMNIDIRECTIONAL SONDE AND LINE LOCATOR; U.S. Pat. No. 7,518,374, issued Apr. 14, 2009, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 7,557,559, issued Jul. 7, 2009, entitled COMPACT LINE ILLUMINATOR FOR LOCATING BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. patent application Ser. No. 12/704,808, now U.S. Pat. No. 10,009,582, filed Feb. 12, 2010, entitled PIPE INSPECTION SYSTEM WITH REPLACEABLE CABLE STORAGE DRUM; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. Pat. No. 7,825,647, issued Nov. 2, 2010, entitled METHOD FOR LOCATING BURIED PIPES AND CABLES; U.S. Pat. No. 7,830,149, issued Nov. 9, 2010, entitled AN UNDERGROUND UTILITY LOCATOR WITH A TRANSMITTER A PAIR OF UPWARDLY OPENING POCKETS AND HELICAL COIL TYPE ELECTRICAL CORDS; U.S. Pat. No. 7,863,885, issued Jan. 4, 2011, entitled SONDES FOR LOCATING UNDERGROUND PIPES AND CONDUITS; U.S. Pat. No. 7,948,236, issued May 24, 2011, entitled ADAPTIVE MULTICHANNEL LOCATOR SYSTEM FOR MULTIPLE PROXIMITY DETECTION; U.S. Pat. No. 7,969,419, issued Jun. 28, 2011, entitled PRE-AMPLIFIER AND MIXER CIRCUITRY FOR A LOCATOR ANTENNA; U.S. patent application Ser. No. 13/189,844, filed Jul. 25, 2011, entitled BURIED OBJECT LOCATOR SYSTEMS AND METHODS; U.S. Pat. No. 7,990,151, issued Aug. 2, 2011, entitled TRI-POD BURIED LOCATOR SYSTEM; U.S. Pat. No. 8,013,610, issued Sep. 6, 2011, entitled HIGH Q SELF-TUNING LOCATING TRANSMITTER; U.S. Pat. No. 8,035,390, issued Oct. 11, 2011, entitled OMNIDIRECTIONAL SONDE AND LINE LOCATOR; U.S. patent application Ser. No. 13/346,668, now U.S. Pat. No. 10,001,425, filed Jan. 9, 2012, entitled PORTABLE CAMERA CONTROLLER PLATFORM FOR USE WITH PIPE INSPECTION SYSTEM; U.S. Pat. No. 8,106,660, issued Jan. 31, 2012, entitled SONDE ARRAY FOR USE WITH BURIED LINE LOCATOR; U.S. Pat. No. 8,203,343, issued Jun. 19, 2012, entitled RECONFIGURABLE PORTABLE LOCATOR EMPLOYING MULTIPLE SENSOR ARRAYS HAVING FLEXIBLE NESTED ORTHOGONAL ANTENNAS; U.S. patent application Ser. No. 13/584,799, filed Aug. 13, 2012, entitled BURIED OBJECT LOCATOR SYSTEMS AND METHODS; U.S. Pat. No. 8,248,056, issued Aug. 21, 2012, entitled A BURIED OBJECT LOCATOR SYSTEM EMPLOYING AUTOMATED VIRTUAL DEPTH EVENT DETECTION AND SIGNALING; U.S. Pat. No. 8,264,226, issued Sep. 11, 2012, entitled SYSTEMS AND METHODS FOR LOCATING BURIED PIPES AND CABLES WITH A MAN PORTABLE LOCATOR AND A TRANSMITTER IN A MESH NETWORK; U.S. patent application Ser. No. 13/647,310, filed Oct. 8, 2012, entitled PIPE INSPECTION SYSTEM APPARATUS AND METHODS; U.S. Pat. No. 8,289,385, issued Oct. 16, 2012, entitled PUSH-CABLE FOR PIPE INSPECTION SYSTEM; U.S. patent application Ser. No. 13/769,202, filed Feb. 15, 2013, entitled SMART PAINT STICK DEVICES AND METHODS; U.S. patent application Ser. No. 13/774,351, now U.S. Pat. No. 10,371,305, filed Feb. 22, 2013, entitled DOCKABLE TRIPODAL CAMERA CONTROL UNIT; U.S. patent application Ser. No. 13/787,711, filed Mar. 6, 2013, entitled DUAL SENSED LOCATING SYSTEMS AND METHODS; U.S. patent application Ser. No. 13/793,168, filed Mar. 11, 2013, entitled BURIED OBJECT LOCATORS WITH CONDUCTIVE ANTENNA BOBBINS; U.S. Pat. No. 8,395,661, issued Mar. 12, 2013, entitled PIPE INSPECTION SYSTEM WITH SELECTIVE IMAGE CAPTURE; U.S. patent application Ser. No. 13/826,112, filed Mar. 14, 2013, entitled SYSTEMS AND METHODS INVOLVING A SMART CABLE STORAGE DRUM AND NETWORK NODE FOR TRANSMISSION OF DATA; U.S. Pat. No. 8,400,154, issued Mar. 19, 2013, entitled LOCATOR ANTENNA WITH CONDUCTIVE BOBBIN; U.S. patent application Ser. No. 13/851,951, filed Mar. 27, 2013, entitled DUAL ANTENNA SYSTEMS WITH VARIABLE POLARIZATION; U.S. patent application Ser. No. 13/894,038, now U.S. Pat. No. 10,042,072, filed May 14, 2013, entitled OMNI-INDUCER TRANSMITTING DEVICES AND METHODS; U.S. patent application Ser. No. 13/925,636, now U.S. Pat. No. 10,090,498, filed Jun. 24, 2013, entitled MODULAR BATTERY PACK APPARATUS, SYSTEMS, AND METHODS INCLUDING VIRAL DATA AND/OR CODE TRANSFER; U.S. patent application Ser. No. 14/027,027, filed Sep. 13, 2013, entitled SONDE DEVICES INCLUDING A SECTIONAL FERRITE CORE STRUCTURE; U.S. Pat. No. 8,547,428, issued Oct. 1, 2013, entitled PIPE MAPPING SYSTEM; U.S. Pat. No. 8,564,295, issued Oct. 22, 2013, entitled METHOD FOR SIMULTANEOUSLY DETERMINING A PLURALITY OF DIFFERENT LOCATIONS OF THE BURIED OBJECTS AND SIMULTANEOUSLY INDICATING THE DIFFERENT LOCATIONS TO A USER; U.S. patent application Ser. No. 14/033,349, filed Sep. 20, 2013, entitled PIPE INSPECTION WITH SNAP ON PIPE GUIDES; U.S. Pat. No. 8,540,429, issued Sep. 24, 2013, entitled SNAP ON PIPE GUIDE; U.S. patent application Ser. No. 14/077,022, now U.S. Pat. No. 10,024,994, filed Nov. 11, 2013, entitled WEARABLE MAGNETIC FIELD UTILITY LOCATOR SYSTEM WITH SOUND FIELD GENERATION; U.S. Pat. No. 8,587,648, issued Nov. 19, 2013, entitled SELF-LEVELING CAMERA HEAD; U.S. patent application Ser. No. 14/136,104, now U.S. Pat. No. 10,288,997, filed Dec. 20, 2013, entitled ROTATING CONTACT ASSEMBLIES FOR SELF-LEVELING CAMERA HEADS; U.S. patent application Ser. No. 14/148,649, filed Jan. 6, 2014, entitled MAPPING LOCATING SYSTEMS AND METHODS; U.S. Pat. No. 8,635,043, issued Jan. 21, 2014, entitled LOCATOR AND TRANSMITTER CALIBRATION SYSTEM; U.S. patent application Ser. No. 14/203,485, filed Mar. 10, 2014, entitled PIPE INSPECTION CABLE COUNTER AND OVERLAY MANAGEMENT SYSTEM; U.S. patent application Ser. No. 14/207,527, filed Mar. 12, 2014, entitled ROTATING CONTACT ASSEMBLIES FOR SELF-LEVELING CAMERA HEADS; U.S. patent application Ser. No. 14/207,502, filed Mar. 12, 2014, entitled GRADIENT ANTENNA COILS FOR USE IN LOCATING SYSTEMS; U.S. patent application Ser. No. 14/214,151, filed Mar. 14, 2014, entitled DUAL ANTENNA SYSTEMS WITH VARIABLE POLARIZATION; U.S. patent application Ser. No. 14/216,358, filed Mar. 17, 2014, entitled SMART CABLE STORAGE DRUM AND NETWORK NODE SYSTEM AND METHODS; U.S. Pat. No. 8,717,028, issued May 6, 2014, entitled SPRING CLIPS FOR USE WITH LOCATING TRANSMITTERS; U.S. Pat. No. 8,773,133, issued Jul. 8, 2014, entitled ADAPTIVE MULTICHANNEL LOCATOR SYSTEM FOR MULTIPLE PROXIMITY DETECTION; U.S. Pat. No. 9,703,002, issued Jul. 13, 2014, entitled UTILITY LOCATOR SYSTEMS AND METHODS; U.S. patent application Ser. No. 14/446,145, now U.S. Pat. No. 10,274,632, filed Jul. 29, 2014, entitled UTILITY LOCATING SYSTEMS WITH MOBILE BASE STATION; U.S. Pat. No. 8,841,912, issued Sep. 23, 2014, entitled PRE-AMPLIFIER AND MIXER CIRCUITRY FOR A LOCATOR ANTENNA; U.S. patent application Ser. No. 14/935,878, now U.S. Pat. No. 10,440,332, filed Nov. 7, 2014, entitled INSPECTION CAMERA DEVICES AND METHODS WITH SELECTIVELY ILLUMINATED MULTISENSOR IMAGING; U.S. patent application Ser. No. 14/557,163, now U.S. Pat. No. 10,024,366, filed Dec. 1, 2014, entitled ASSYMETRIC DRAG FORCE BEARING; U.S.

Pat. No. 8,908,027, issued Dec. 9, 2014, entitled ASYMMETRIC DRAG FORCE BEARING FOR USE WITH PUSH-CABLE STORAGE DRUM; U.S. Pat. No. 8,970,211, issued Mar. 3, 2015, entitled PIPE INSPECTION CABLE COUNTER AND OVERLAY MANAGEMENT SYSTEM; U.S. patent application Ser. No. 14/642,596, now U.S. Pat. No. 10,100,507, filed Mar. 9, 2015, entitled PIPE CLEARING CABLES AND APPARATUS; U.S. Pat. No. 8,984,698, issued Mar. 24, 2015, entitled LIGHT WEIGHT SEWER CABLE; U.S. patent application Ser. No. 14/709,301, filed May 11, 2015, entitled PIPE MAPPING SYSTEMS AND METHODS; U.S. Pat. No. 9,041,794, issued May 26, 2015, entitled PIPE MAPPING SYSTEMS AND METHODS; U.S. Pat. No. 9,057,754, issued Jun. 16, 2015, entitled ECONOMICAL MAGNETIC LOCATOR APPARATUS AND METHOD; U.S. patent application Ser. No. 14/746,590, now U.S. Pat. No. 10,171,712, filed Jun. 22, 2015, entitled THERMAL EXTRACTION ARCHITECTURES FOR CAMERA AND LIGHTING DEVICES; U.S. Pat. No. 9,066,446, issued Jun. 23, 2015, entitled THERMAL EXTRACTION ARCHITECTURE FOR CAMERA HEADS, INSPECTION SYSTEMS, AND OTHER DEVICES AND SYSTEMS; U.S. patent application Ser. No. 14/749,545, now U.S. Pat. No. 10,175,177, filed Jun. 24, 2015, entitled ADJUSTABLE VARIABLE RESOLUTION INSPECTION SYSTEMS AND METHODS; U.S. patent application Ser. No. 14/797,760, filed Jul. 13, 2015, entitled HAPTIC DIRECTIONAL FEEDBACK HANDLES FOR LOCATING DEVICES; U.S. patent application Ser. No. 14/798,177, now U.S. Pat. No. 10,059,504, filed Jul. 13, 2015, entitled MARKING PAINT APPLICATOR FOR USE WITH PORTABLE UTILITY LOCATOR; U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. Pat. No. 9,080,992, issued Jul. 14, 2015, entitled ADJUSTABLE VARIABLE RESOLUTION INSPECTION SYSTEMS AND METHODS; U.S. patent application Ser. No. 14/800,490, filed Jul. 15, 2013, entitled UTILITY LOCATOR DEVICES, SYSTEMS, AND METHODS WITH SATELLITE AND MAGNETIC FIELD SONDE ANTENNA SYSTEMS; U.S. Pat. No. 9,085,007, issued Jul. 21, 2015, entitled MARKING PAINT APPLICATOR FOR PORTABLE LOCATOR; U.S. Pat. No. 9,134,255, issued Sep. 15, 2015, entitled PIPE INSPECTION SYSTEM WITH SELECTIVE IMAGE CAPTURE; U.S. patent application Ser. No. 14/949,868, now U.S. Pat. No. 10,078,149, filed Nov. 23, 2015, entitled BURIED OBJECT LOCATORS WITH DODECAHEDRAL ANTENNA NODES; U.S. Pat. No. 9,207,350, issued Dec. 8, 2015, entitled BURIED OBJECT LOCATOR APPARATUS WITH SAFETY LIGHTING ARRAY; U.S. patent application Ser. No. 14/970,362, filed Dec. 15, 2015, entitled COAXIAL VIDEO PUSH-CABLES FOR USE IN INSPECTION SYSTEMS; U.S. Pat. No. 9,222,809, issued Dec. 29, 2015, entitled PORTABLE PIPE INSPECTION SYSTEMS AND APPARATUS; U.S. patent application Ser. No. 15/006,119, now U.S. Pat. No. 10,353,103, filed Jan. 26, 2016, entitled SELF-STANDING MULTI-LEG ATTACHMENT DEVICES FOR USE WITH UTILITY LOCATORS; U.S. patent application Ser. No. 15/434,056, now U.S. Pat. No. 10,401,526, filed Feb. 16, 2016, entitled BURIED UTILITY MARKER DEVICES, SYSTEMS, AND METHODS; U.S. patent application Ser. No. 15/050,267, now U.S. Pat. No. 10,009,519, filed Feb. 22, 2016, entitled SELF-LEVELING CAMERA HEAD; U.S. Pat. No. 9,277,105, issued Mar. 1, 2016, entitled SELF-LEVELING CAMERA HEAD; U.S. Pat. No. 9,341,740, issued May 17, 2016, entitled OPTICAL GROUND TRACKING APPARATUS, SYSTEMS, AND METHODS; U.S. patent application Ser. No. 15/187,785, filed Jun. 21, 2016, entitled BURIED UTILITY LOCATOR GROUND TRACKING APPARATUS, SYSTEMS, AND METHODS; U.S. Pat. No. 9,372,117, issued Jun. 21, 2016, entitled OPTICAL GROUND TRACKING APPARATUS, SYSTEMS, AND METHODS; U.S. patent application Ser. No. 15/225,623, filed Aug. 1, 2016, entitled SONDE-BASED GROUND-TRACKING APPARATUS AND METHODS; U.S. patent application Ser. No. 15/225,721, filed Aug. 1, 2016, entitled SONDES AND METHODS FOR USE WITH BURIED LINE LOCATOR SYSTEMS; U.S. Pat. No. 9,411,066, issued Aug. 9, 2016, entitled SONDES AND METHODS FOR USE WITH BURIED LINE LOCATOR SYSTEMS; U.S. Pat. No. 9,411,067, issued Aug. 9, 2016, entitled GROUND-TRACKING SYSTEMS AND APPARATUS; U.S. patent application Ser. No. 15/247,503, filed Aug. 25, 2016, entitled LOCATING DEVICES, SYSTEMS, AND METHODS USING FREQUENCY SUITES FOR UTILITY DETECTION; U.S. Pat. No. 9,927,546, issued Aug. 29, 2016, entitled PHASE SYNCHRONIZED BURIED OBJECT LOCATOR APPARATUS, SYSTEMS, AND METHODS; U.S. Pat. No. 9,435,907, issued Sep. 6, 2016, entitled PHASE SYNCHRONIZED BURIED OBJECT LOCATOR APPARATUS, SYSTEMS, AND METHODS; U.S. patent application Ser. No. 15/264,355, now U.S. Pat. No. 10,356,360, filed Sep. 13, 2016, entitled HIGH BANDWIDTH VIDEO PUSH-CABLES FOR PIPE INSPECTION SYSTEMS; U.S. Pat. No. 9,448,376, issued Sep. 20, 2016, entitled HIGH BANDWIDTH PUSH-CABLES FOR VIDEO PIPE INSPECTION SYSTEMS; U.S. Pat. No. 9,465,129, issued Oct. 11, 2016, entitled IMAGE-BASED MAPPING LOCATING SYSTEM; U.S. Pat. No. 9,468,954, issued Oct. 18, 2016, entitled PIPE INSPECTION SYSTEM WITH JETTER PUSH-CABLE; U.S. patent application Ser. No. 15/331,570, now U.S. Pat. No. 10,073,186, filed Oct. 21, 2016, entitled KEYED CURRENT SIGNAL UTILITY LOCATING SYSTEMS AND METHODS; U.S. Pat. No. 9,477,147, issued Oct. 25, 2016, entitled SPRING ASSEMBLIES WITH VARIABLE FLEXIBILITY FOR USE WITH PUSH-CABLES AND PIPE INSPECTION SYSTEMS; U.S. patent application Ser. No. 15/339,766, now U.S. Pat. No. 10,031,253, filed Oct. 31, 2016, entitled GRADIENT ANTENNA COILS AND ARRAYS FOR USE IN LOCATING SYSTEMS; U.S. patent application Ser. No. 15/345,421, Nov. 7, 2016, entitled OMNI-INDUCER TRANSMITTING DEVICES AND METHODS; U.S. Pat. No. 9,488,747, issued Nov. 8, 2016, entitled GRADIENT ANTENNA COILS AND ARRAYS FOR USE IN LOCATING SYSTEM; U.S. Pat. No. 9,494,706, issued Nov. 15, 2016, entitled OMNI-INDUCER TRANSMITTING DEVICES AND METHODS; U.S. patent application Ser. No. 15/360,979, filed Nov. 23, 2016, entitled UTILITY LOCATING SYSTEMS, DEVICES, AND METHODS USING RADIO BROADCAST SIGNALS; U.S. patent application Ser. No. 15/369,693, now U.S. Pat. No. 10,084,945, filed Dec. 5, 2016, entitled CABLE STORAGE DRUM WITH MOVABLE CCU DOCKING APPARATUS; U.S. patent application Ser. No. 15/376,576, now U.S. Pat. No. 10,082,599, filed Dec. 12, 2016, entitled MAGNETIC SENSING BURIED OBJECT LOCATOR INCLUDING A CAMERA; U.S. Pat. No. 9,521,303, issued Dec. 13, 2016, entitled CABLE STORAGE DRUM WITH MOVEABLE CCU DOCKING APPARATUS; U.S. Pat. No. 9,523,788, issued Dec. 20, 2016, entitled MAGNETIC SENSING BURIED OBJECT LOCATOR INCLUDING A CAMERA; U.S. patent application Ser. No. 15/396,068, now U.S. Pat. No. 10,247,845, filed Dec. 30, 2016, entitled UTILITY LOCATOR TRANSMITTER APPARATUS AND METHODS; U.S. patent application Ser. No. 15/425,785, now U.S. Pat. No. 10,027,526, filed Feb. 6, 2017, entitled METHOD AND APPARATUS FOR HIGH-SPEED DATA TRANSFER EMPLOYING SELF-SYNCHRONIZING QUADRATURE AMPLITUDE MODULATION (QAM); U.S. Pat. No. 9,571,326, issued Feb. 14, 2017, entitled METHOD AND APPARATUS FOR HIGH-SPEED DATA TRANSFER EMPLOYING SELF-SYNCHRONIZING QUADRATURE AMPLITUDE MODULATION (QAM); U.S. patent application Ser. No. 15/457,149, filed Mar. 13, 2017, entitled USER INTERFACES FOR UTILITY LOCATORS; U.S. patent application Ser. No. 15/457,222, filed Mar. 13, 2017, entitled SYSTEMS AND METHODS FOR LOCATING BURIED OR HIDDEN OBJECTS USING SHEET CURRENT FLOW MODELS; U.S. patent application Ser. No. 15/457,897, now U.S. Pat. No. 10,162,074, filed Mar. 13, 2017, entitled UTILITY LOCATORS WITH RETRACTABLE SUPPORT STRUCTURES AND APPLICATIONS THEREOF; U.S. patent application Ser. No. 14/022,067, now U.S. Pat. No. 9,599,740, filed Mar. 21, 2017, entitled USER INTERFACES FOR UTILITY LOCATORS; U.S. Pat. No. 9,599,449, issued Mar. 21, 2017, entitled SYSTEMS AND METHODS FOR LOCATING BURIED OR HIDDEN OBJECTS USING SHEET CURRENT FLOW MODELS; U.S. patent application Ser. No. 15/470,642, filed Mar. 27, 2017, entitled UTILITY LOCATING APPARATUS AND SYSTEMS USING MULTIPLE ANTENNA COILS; U.S. patent application Ser. No. 15/470,713, filed Mar. 27, 2017, entitled UTILITY LOCATORS WITH PERSONAL COMMUNICATION DEVICE USER INTERFACES; U.S. patent application Ser. No. 15/483,924, now U.S. Pat. No. 10,069,667, filed Apr. 10, 2017, entitled SYSTEMS AND METHODS FOR DATA TRANSFER USING SELF-SYNCHRONIZING QUADRATURE AMPLITUDE MODULATION (QAM); U.S. patent application Ser. No. 15/485,082, now U.S. Pat. No. 10,082,591, filed Apr. 11, 2017, entitled MAGNETIC UTILITY LOCATOR DEVICES AND METHODS; U.S. patent application Ser. No. 15/485,125, now U.S. Pat. No. 10,088,592, filed Apr. 11, 2017, entitled INDUCTIVE CLAMP DEVICES, SYSTEMS, AND METHODS; U.S. Pat. No. 9,625,602, issued Apr. 18, 2017, entitled SMART PERSONAL COMMUNICATION DEVICES AS USER INTERFACES; U.S. patent application Ser. No. 15/497,040, filed Apr. 25, 2017, entitled SYSTEMS AND METHODS FOR LOCATING AND/OR MAPPING BURIED UTILITIES USING VEHICLE-MOUNTED LOCATING DEVICES; U.S. Pat. No. 9,632,199, issued Apr. 25, 2017, entitled INDUCTIVE CLAMP DEVICES, SYSTEMS, AND METHODS; U.S. Pat. No. 9,632,202, issued Apr. 25, 2017, entitled ECONOMICAL MAGNETIC LOCATOR APPARATUS AND METHOD; U.S. Pat. No. 9,634,878, issued Apr. 25, 2017, entitled SYSTEMS AND METHODS FOR DATA SYNCHRONIZING QUADRATURE AMPLITUDE MODULATION (QAM); U.S. Pat. No. 9,638,824, issued May 2, 2017, entitled QUAD-GRADIENT COILS FOR USE IN LOCATING SYSTEMS; U.S. patent application Ser. No. 15/590,964, filed May 9, 2017, entitled BORING INSPECTION SYSTEMS AND METHODS; U.S. Pat. No. 9,651,711, issued May 16, 2017, entitled HORIZONTAL BORING INSPECTION DEVICE AND METHODS; U.S. patent application Ser. No. 15/623,174, now U.S. Pat. No. 10,105,723, filed Jun. 14, 2017, entitled TRACKABLE DIPOLE DEVICES, METHODS, AND SYSTEMS FOR USE WITH MARKING PAINT STICKS; U.S. patent application Ser. No. 15/185,018, filed Jun. 17, 2016, entitled RESILIENTLY DEFORMABLE MAGNETIC FIELD TRANSMITTER CORES FOR USE WITH UTILITY LOCATING DEVICES AND SYSTEMS; U.S. patent application Ser. No. 15/626,399, filed Jun. 19, 2017, entitled SYSTEMS AND METHODS FOR UNIQUELY IDENTIFYING BURIED UTILITIES IN A MULTI-UTILITY ENVIRONMENT; U.S. Pat. No. 9,684,090, issued Jun. 20, 2017, entitled NULLED-SIGNAL LOCATING DEVICES, SYSTEMS, AND METHODS; U.S. Pat. No. 9,696,447, issued Jul. 4, 2017, entitled BURIED OBJECT METHODS AND APPARATUS USING MULTIPLE ELECTROMAGNETIC SIGNALS; U.S. Pat. No. 9,696,448, issued Jul. 4, 2017, entitled GROUND-TRACKING DEVICES FOR USE WITH A MAPPING LOCATOR; U.S. patent application Ser. No. 15/670,845, filed Aug. 7, 2017, entitled HIGH FREQUENCY AC-POWERED DRAIN CLEANING AND INSPECTION APPARATUS AND METHODS; U.S. patent application Ser. No. 15/681,250, Aug. 18, 2017, entitled ELECTRONIC MARKER DEVICES AND SYSTEMS; U.S. patent application Ser. No. 15/681,409, filed Aug. 20, 2017, entitled WIRELESS BURIED PIPE AND CABLE LOCATING SYSTEMS; U.S. Pat. No. 9,746,572, issued Aug. 29, 2017, entitled ELECTRONIC MARKER DEVICES AND SYSTEMS; U.S. Pat. No. 9,746,573, issued Aug. 29, 2017, entitled WIRELESS BURIED PIPE AND CABLE LOCATING SYSTEMS; U.S. patent application Ser. No. 15/701,247, now U.S. Pat. No. 10,171,721, issued Sep. 11, 2017, entitled PIPE INSPECTION SYSTEMS WITH SELF-GROUNDING PORTABLE CAMERA CONTROLLER; U.S. Pat. No. 9,769,366, issued Sep. 19, 2017, entitled SELF-GROUNDING TRANSMITTING PORTABLE CAMERA CONTROLLER FOR USE WITH PIPE INSPECTION SYSTEMS; U.S. patent application Ser. No. 15/728,250, now U.S. Pat. No. 10,324,188, filed Oct. 9, 2017, entitled OPTICAL GROUND TRACKING APPARATUS, SYSTEMS, AND METHODS FOR USE WITH BURIED UTILITY LOCATORS; U.S. patent application Ser. No. 15/728,410, now U.S. Pat. No. 10,359,368, filed Oct. 9, 2017, entitled PIPE INSPECTION SYSTEM WITH JETTER PUSH-CABLE; U.S. Pat. No. 9,784,837, issued Oct. 10, 2017, entitled OPTICAL GROUND TRACKING APPARATUS, SYSTEMS, AND METHODS; U.S. patent application Ser. No. 15/785,330, filed Oct. 16, 2017, entitled SYSTEMS AND METHODS OF USING A SONDE DEVICE WITH A SECTIONAL FERRITE CORE STRUCTURE; U.S. Pat. No. 9,791,382, issued Oct. 17, 2017, entitled PIPE INSPECTION SYSTEM WITH JETTER PUSH-CABLE; U.S. Pat. No. 9,798,033, issued Oct. 24, 2017, entitled SONDE DEVICES INCLUDING A SECTIONAL FERRITE CORE; U.S. patent application Ser. No. 15/805,007, filed Nov. 6, 2017, entitled PIPE INSPECTION SYSTEM CAMERA HEADS; U.S. patent application Ser. No. 15/806,219, filed Nov. 7, 2017, entitled MULTI-CAMERA PIPE INSPECTION APPARATUS, SYSTEMS AND METHODS; U.S. Provisional Patent Application 62/580,386 filed Nov. 1, 2017, now U.S. patent application Ser. No. 16/178,494 filed Nov. 1, 2018, entitled THREE AXIS MEASUREMENT MODULES AND SENSING METHODS; U.S. patent application Ser. No. 15/811,264, now U.S. Pat. No. 10,379,436, filed Nov. 13, 2017, entitled SPRING ASSEMBLIES WITH VARIABLE FLEXIBILITY FOR USE WITH PUSH-CABLES AND PIPE INSPECTION SYSTEMS; U.S. patent application Ser. No. 15/811,361, filed Nov. 13, 2017, entitled OPTICAL GROUND TRACKING APPARATUS, SYSTEMS, AND METHODS; U.S. Pat. No. 9,824,433, issued Nov. 21, 2017, entitled PIPE INSPECTION SYSTEM CAMERA HEADS; U.S. Pat. No. 9,829,783, issued Nov. 28, 2017, entitled SPRING ASSEMBLIES WITH VARIABLE FLEXIBILITY FOR USE WITH PUSH-CABLES AND PIPE INSPECTION SYSTEMS; U.S. Pat. No. 9,835,564, issued Dec. 5, 2017, entitled MULTI-CAMERA PIPE INSPECTION APPARATUS, SYSTEMS, AND METHODS; U.S. Pat. No. 9,841,503, issued Dec. 12, 2017, entitled OPTICAL GROUND TRACKING APPARATUS, SYSTEMS, AND METHODS; U.S. patent application Ser. No. 15/846,102, filed Dec. 18, 2017, entitled SYSTEMS AND METHODS FOR ELECTRONICALLY MARKING, LOCATING, AND VIRTUALLY DISPLAYING BURIED UTILITIES; U.S. patent application Ser. No. 15/866,360, filed Jan. 9, 2018, entitled TRACKED DISTANCE MEASURING DEVICE, SYSTEMS, AND METHODS; U.S. patent application Ser. No. 15/870,787, filed Jan. 12, 2018, entitled MAGNETIC FIELD CANCELING AUDIO SPEAKERS FOR USE WITH BURIED UTILITY LOCATORS OR OTHER DEVICES; U.S. Provisional Patent Application 62/620,959 filed Jan. 23, 2018, now U.S. patent application Ser. No. 16/255,524 filed Jan. 23, 2019, entitled RECHARGEABLE BATTERY PACK ONBOARD CHARGE STATE INDICATION METHODS AND APPARATUS; U.S. Pat. No. 9,880,309, issued Jan. 30, 2018, entitled UTILITY LOCATOR TRANSMITTER APPARATUS AND METHODS; U.S. patent application Ser. No. 15/889,067, filed Feb. 5, 2018, entitled UTILITY LOCATOR TRANSMITTER DEVICES, SYSTEMS, AND METHODS WITH DOCKABLE APPARATUS; U.S. Pat. No. 9,891,337, issued Feb. 13, 2018, entitled UTILITY LOCATOR TRANSMITTER DEVICES, SYSTEMS, AND METHODS WITH DOCKABLE APPARATUS; U.S. patent application Ser. No. 15/919,077, filed Mar. 12, 2018, entitled PORTABLE PIPE INSPECTION SYSTEMS AND METHODS; U.S. Pat. No. 9,914,157, issued Mar. 13, 2018, entitled METHODS AND APPARATUS FOR CLEARING OBSTRUCTIONS WITH A JETTER PUSH-CABLE APPARATUS; U.S. patent application Ser. No. 15/922,703, filed Mar. 15, 2018, entitled SELF-LEVELING INSPECTION SYSTEMS AND METHODS; U.S. patent application Ser. No. 15/925,643, filed Mar. 19, 2018, entitled PHASE-SYNCHRONIZED BURIED OBJECT TRANSMITTER AND LOCATOR METHODS AND APPARATUS; U.S. patent application Ser. No. 15/925,671, filed Mar. 19, 2018, entitled MULTI-FREQUENCY LOCATING SYSTEMS AND METHODS; U.S. Pat. No. 9,924,139, issued Mar. 20, 2018, entitled PORTABLE PIPE INSPECTION SYSTEMS AND APPARATUS; U.S. patent application Ser. No. 15/936,250, filed Mar. 26, 2018, entitled GROUND TRACKING APPARATUS, SYSTEMS, AND METHODS; U.S. Pat. No. 9,927,368, issued Mar. 27, 2018, entitled SELF-LEVELING INSPECTION SYSTEMS AND METHODS; U.S. Pat. No. 9,927,545, issued Mar. 27,2018, entitled MULTI-FREQUENCY LOCATING SYSTEM AND METHODS; U.S. Pat. No. 9,928,613, issued Mar. 27, 2018, entitled GROUND TRACKING APPARATUS, SYSTEMS, AND METHODS; U.S. Provisional Patent Application 62/656,259 filed Apr. 11, 2018, now U.S. patent application Ser. No. 16/382,136 filed Apr. 11, 2019, entitled GEOGRAPHIC MAP UPDATING METHODS AND SYSTEMS; U.S. patent application Ser. No. 15/954,486, filed Apr. 16, 2018, entitled UTILITY LOCATOR APPARATUS, SYSTEMS, AND METHODS; U.S. Pat. No. 9,945,976, issued Apr. 17, 2018, entitled UTILITY LOCATOR APPARATUS, SYSTEMS, AND METHODS; U.S. patent application Ser. No. 15/960,340, filed Apr. 23, 2018, entitled METHODS AND SYSTEMS FOR GENERATING INTERACTIVE MAPPING DISPLAYS IN CONJUNCTION WITH USER INTERFACE DEVICES; U.S. Pat. No. 9,959,641, issued May 1, 2018, entitled METHODS AND SYSTEMS FOR SEAMLESS TRANSITIONING IN INTERACTIVE MAPPING SYSTEMS; U.S. Provisional Patent Application 62/686,589 filed Jun. 18, 2018, now U.S. patent application Ser. No. 16/443,789 filed Jun. 17, 2019, entitled MULTI-DIELECTRIC COAXIAL PUSH-CABLES; U.S. Provisional Patent Application 62/688,259 filed Jun. 21, 2018, now U.S. patent application Ser. No. 16/449,187 filed Jun. 21, 2019, entitled ACTIVE MARKER DEVICES FOR UNDERGROUND USE; U.S. Provisional Patent Application 62/726,500 filed Sep. 4, 2018, now U.S. patent application Ser. No. 16/559,576 filed Sep. 3, 2019, entitled VIDEO PIPE INSPECTION SYSTEMS, DEVICES, AND METHODS INTEGRATED WITH NON-VIDEO DATA RECORDING AND COMMUNICATION FUNCTIONALITY; U.S. Provisional Patent Application 62/897,141, filed Sep. 6, 2019, entitled INTEGRATED FLEX-SHAFT CAMERA SYSTEM WITH HAND CONTROL; U.S. patent application Ser. No. 16/144,878, filed Sep. 27, 2018, entitled MULTIFUNCTION BURIED UTILITY LOCATING CLIPS; U.S. Provisional Patent Application 62/759,955, filed Nov. 12, 2018, entitled HEAT EXTRACTION ARCHITECTURE FOR COMPACT VIDEO CAMERA HEADS; and U.S. Provisional Patent Application 62/794,863, filed Jan. 21, 2019, entitled HEAT EXTRACTION ARCHITECTURE FOR COMPACT VIDEO CAMERA HEADS. The content of each of the above-described patents and applications is incorporated by reference herein in its entirety. The above-described patent applications and patents may be referred to herein collectively as the "incorporated applications."

As used herein, the term "in-pipe" may refer to anything detectable at or near the location of the camera head generally during the operation of a pipe inspection.

The term "non-video" as used in "non-video data" or "non-video related sensors" may generally relate to aspects of the camera head or inspection not relating to the image sensor(s) or video generated therefrom. Such aspects may generally refer to sensors or data generated in the camera head not directly relating to the video.

The term "computing devices" may refer to any device for displaying the video and/or non-video data that may be generated as well as accepting user input to generate commands that may be communicated to the camera head and/or other devices (e.g., electronic devices) in the pipe inspection system. "User input" may refer to input explicitly input by the user or implicitly input such as a biometric scan. "User input" may further refer to input from any of the various system sensors. Exemplary display and user input elements may include, but should not be limited to, smart phones, tablets, laptop computers, or other electronic computing devices that may be connected via a wired or wireless connection.

The term "access point" may refer to the entrance location of a camera head into a pipe or other inspection cavity. Such access points may generally exist at or near the ground surface but may also appear at other entrance locations in the pipe or other conduit.

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure. As used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Various additional aspects, features, devices, systems, and functionality are further described below in conjunction with the appended Drawings.

Example Pipe Inspection and/or Mapping Camera Heads, Systems, and Methods

FIG. 1A illustrates a pipe inspection and mapping system embodiment 100 in accordance with aspects of the present disclosure. Inspection and mapping system 100 may include a motion tracking camera head 110 coupled to a push cable 120, allowing the camera head 110 to be pushed into a pipe 125 and/or other conduit or void by a user 130 or via user-controlled or automated mechanical force. The push cable 120 may be a push-cable as described in, for example, the following co-assigned patents and patent applications: U.S. Pat. No. 5,457,288, issued Oct. 10, 1995, entitled Dual Push-Cable for Pipe Inspection; U.S. Pat. No. 5,808,239, issued Sep. 15, 1998, entitled Video Push-Cable; U.S. Pat. No. 5,939,679, issued Aug. 17, 1999, entitled Video Push-Cable; U.S. patent application Ser. No. 11/679,092, filed Feb. 26, 2007, entitled Light Weight Sewer Cable; U.S. patent application Ser. No. 13/589,948, now U.S. Pat. No. 8,984,698, filed Aug. 20, 2012, entitled Light Weight Sewer Cable; U.S. patent application Ser. No. 13/874,879, now U.S. Pat. No. 9,448,376, filed May 1, 2013, entitled High Bandwidth Push-Cables for Pipe Inspection Systems; and/or U.S. patent application Ser. No. 14/207,517, filed Mar. 12, 2014, entitled High Bandwidth Push-Cables for Pipe Inspection Systems. The content of each of these applications is incorporated by reference herein in its entirety. A push cable spring 135 may further couple between the push cable 120 and camera head 110. The spring 135 may be used to further improve movement and/or handling of the camera head 110 into and inside the pipe 125 or other void. The push cable spring 135 may be of the variety described in, for example, co-assigned U.S. patent Ser. No. 14/271,255, now U.S. Pat. No. 9,477,147, filed May 6, 2014, entitled Spring Assemblies with Variable Flexibility for use with Push-Cables and Pipe Inspection Systems, the content of which is incorporated by reference herein in its entirety.

A cable storage drum or drum reel 140 or other apparatus for dispensing push cable 120 may further be coupled to a proximal end of the push cable 120. The camera head 110 may be coupled to a distal end of the push cable 120. The drum reel 140 may be a reel/cable storage drum as described, for example, in co-assigned patents and patent applications including: U.S. Pat. No. 6,958,767, issued Oct. 25, 2005, entitled Video Pipe Inspection System Employing Non-Rotating Cable Storage Drum; U.S. patent application Ser. No. 12/704,808, now U.S. Pat. No. 10,009,582, filed Feb. 12, 2010, entitled Pipe Inspection System with Replaceable Cable Storage Drum; U.S. patent application Ser. No. 13/826,112, filed Mar. 14, 2013, entitled Systems and Methods Involving a Smart Cable Storage Drum and Network Node for Transmission of Data; U.S. patent application Ser. No. 14/216,358, filed Mar. 17, 2014, entitled Systems and Methods Involving a Smart Cable Storage Drum and Network Node and Methods; and/or U.S. patent application Ser. No. 14/469,536, now U.S. Pat. No. 9,521,303, filed Aug. 26, 2014, entitled Cable Storage Drum with Moveable CCU Docking Apparatus. The content of each of these applications is incorporated by reference herein in its entirety.

The drum reel 140 and/or other system device may further include a cable counting element (cable counting element 242 of FIG. 2B) for generating cable counting data corresponding to the measured amount of push cable dispensed such as those described in, for example, co-assigned U.S. patent application Ser. No. 14/203,485, filed Mar. 10, 2014, entitled Pipe Inspection Cable Counter and Overlay Management System, and/or U.S. patent application Ser. No. 12/766,742, now U.S. Pat. No. 8,970,211, filed Apr. 23, 2010, entitled Pipe Inspection Cable Counter and Overlay Management System. The content of each of these applications is incorporated by reference herein in its entirety.

The system 100 may further include a processing element 145 for receiving at least inertial data generated at camera head 110 and cable counting data and generating control signals and output data from methods associated with corrected inertial data and pipe mapping. Storage 150 may include non-transitory computer-readable memory for storing video and non-video data as well as inertial data and associated output data generated by the processing element.

The system 100 may further include a display element 155 for displaying real time, near real time, and/or post processed video or still images and other system and camera head data.

The processing element 145 and associated storage 150 as well as display element 155 may be disposed in one or more system devices. For instance, processing, storage, and display of the pipe inspection and mapping and associated data may occur partially or fully in the camera head 110 or drum reel 140. In some embodiments, various other devices such as electronic devices including a camera control unit (CCU) (such as the CCU 245 of FIGS. 2A and 2B), utility locating devices (such as the utility locating device 260 of FIGS. 2A and 2B), or other electronic or computing devices (such as laptop, smart phone, remote server, tablet or like computing device 250 of FIGS. 2A and 2B) may share or fully contain and perform the operations of the processing element 145, storage 150, and/or display element 155.

Figure 1B:
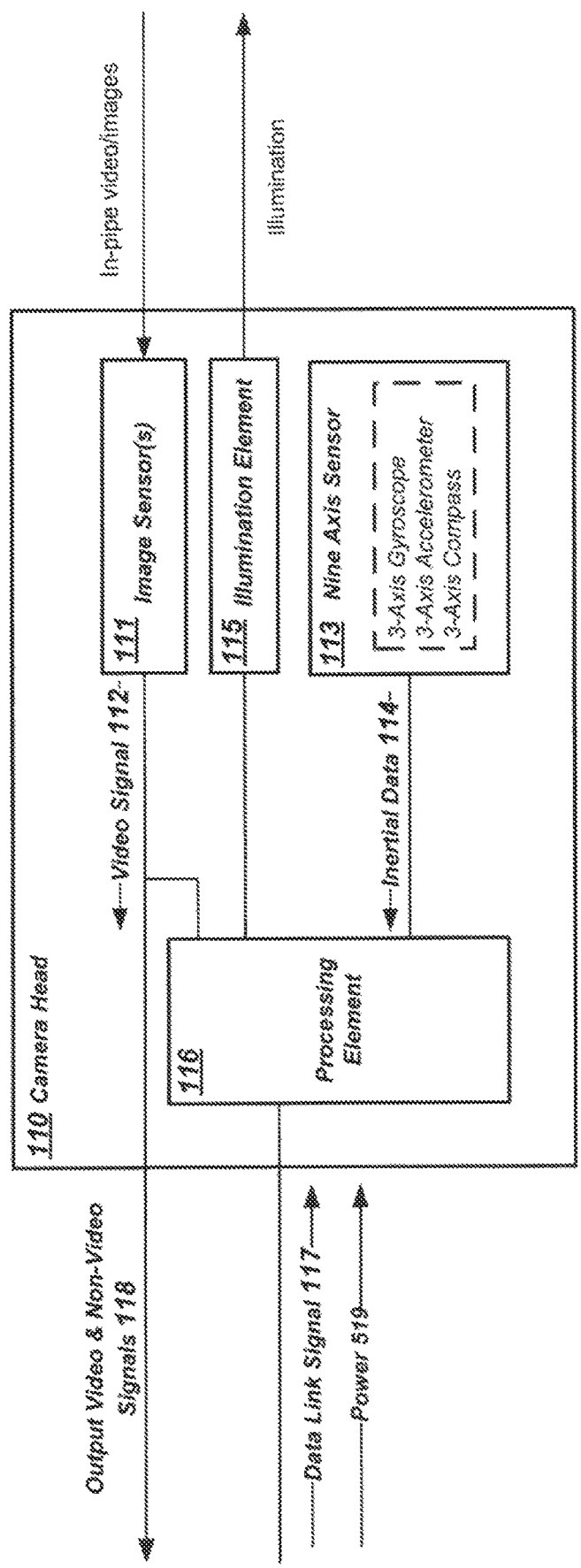
FIG. 1B is a diagram describing aspects of the motion tracking camera head from FIG. 1A.

Turning to FIG. 1B, a diagram of the camera head 110 is illustrated. The camera head 110 may include one or image sensors 111 generating video signal(s) 112 which may be video and images of scenes from the inside of pipe 125 (FIG. 1A) and one or more multi-axis inertial sensors such as one or more nine axis sensors 113 generating inertial data 114 relating to measured positions, orientations, and movements (or lack thereof) of camera head 110. The one or more image sensors 111 may be high dynamic range (HDR) imagers or auto HDR imagers. The nine axis sensor 113 may include accelerometers, magnetometers, and gyroscopic sensors measuring inertial data in three dimensions. An illumination element 115 may be disposed in camera head 110 that may be or include LEDs or other light producing elements configured to illuminate the view of the one or more image sensors 111.

The camera head 110 may include a processing element 116 configured to receive video signals 112 and inertial data 114 and, in some embodiments, other non-video data from other sensors or devices in other camera head or otherwise directly or indirectly wired or wirelessly coupled system devices. Such non-video data may include datalink signals 117 which may include instructions from other system devices. In some embodiments, the datalink signal 117 may include cable counting data from a cable counting element corresponding to the measured amount of push cable 120 (FIG. 1A) dispensed from drum reel 140 (FIG. 1A).

Figure 2A:
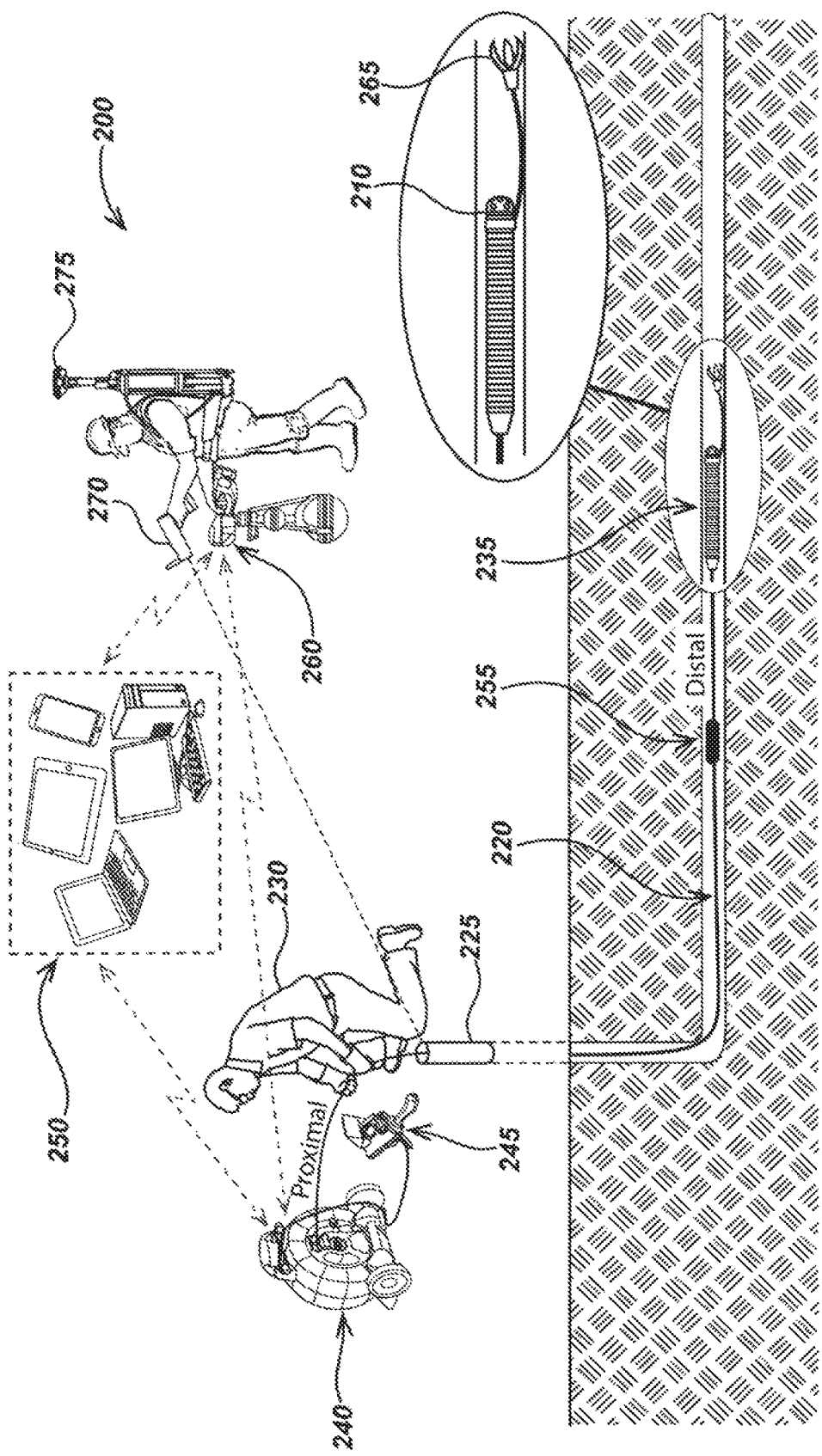
FIG. 2A is another illustration of a pipe inspection and mapping system embodiment.
Figure 3:
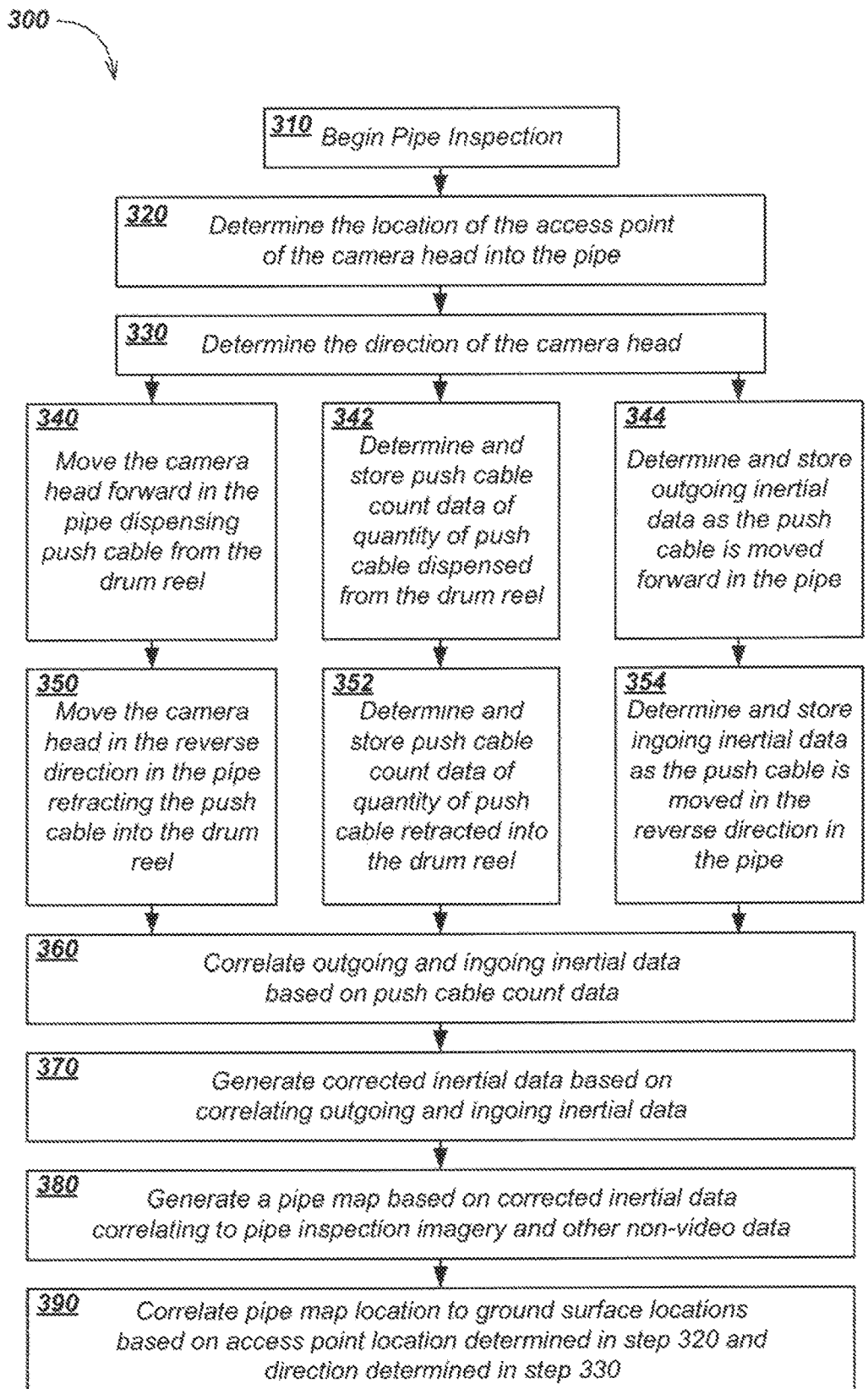
FIG. 3 is a corrected inertial data and pipe mapping method.

Corrected inertial data and pipe mapping methods, such as method 300 of FIG. 3, may be performed partially or fully in the processing element 116 of camera head 110. In other embodiments, such processing may occur in processing elements disposed in one or more other system devices (e.g., CCU 245 of FIG. 2A, utility locating device 260 of FIG. 2A, computing devices 250 of FIG. 2A, or the like). The processing element 116 may be configured to receive such datalink signals 117 and perform operations relating to received instructions as well as communicate instructions to the various sensors and other elements of camera head 110. Power 119 may likewise be provided to processing element 116 for provisioning to the camera head 110. The processing element 116 may generate output video and non-video data signals 118 communicated via push cable 120 (FIG. 1A) to other system devices. Output video and non-video data signals 118 may include data relating to video signal 112 and inertial data 114.

Turning to FIG. 2A, a pipe inspection and mapping system embodiment 200 in accordance with aspects of the present disclosure is disclosed which may include various other devices which may share or fully contain and perform the operations of the processing element 145 (FIG. 1A), storage 150 (FIG. 1), and/or display element 155 (FIG. 1A).

Inspection and/or mapping system 200 may include a camera head 210 such as a motion tracking camera head, coupled to a push cable 220, allowing the camera head 210 to be pushed into a pipe 225 and/or other conduit or void by a user 230 or via user-controlled or automated mechanical force. The push cable 220 may be a push cable as described in, for example, the following co-assigned patents and patent applications: U.S. Pat. No. 5,457,288, issued Oct. 10, 1995, entitled Dual Push-Cable for Pipe Inspection; U.S. Pat. No. 5,808,239, issued Sep. 15, 1998, entitled Video Push-Cable; U.S. Pat. No. 5,939,679, issued Aug. 17, 1999, entitled Video Push-Cable; U.S. patent application Ser. No. 11/679,092, filed Feb. 26, 2007, entitled Light Weight Sewer Cable; U.S. patent application Ser. No. 13/589,948, now U.S. Pat. No. 8,984,698, filed Aug. 20, 2012, entitled Light Weight Sewer Cable; U.S. patent application Ser. No. 13/874,879, now U.S. Pat. No. 9,448,376, filed May 1, 2013, entitled High Bandwidth Push-Cables for Pipe Inspection Systems; U.S. patent application Ser. No. 14/207,517, filed Mar. 12, 2014, entitled High Bandwidth Push-Cables for Pipe Inspection Systems; U.S. Pat. No. 10,356,360, issued Sep. 13, 2016, entitled High Bandwidth Push-Cables for Pipe Inspection Systems; and/or U.S. Provisional Patent Application 62/897,141, filed Sep. 6, 2019, entitled INTEGRATED FLEX-SHAFT CAMERA SYSTEM WITH HAND CONTROL. The content of each of these applications is incorporated by reference herein in its entirety.

A push cable spring 235 may further couple between the push cable 220 and camera head 210. The spring 235 may be used to further improve movement and/or handling of the camera head 210 into and inside the pipe 225 or other void. The push cable spring 235 may be of the variety described in, for example, co-assigned U.S. patent application Ser. No. 14/271,255, now U.S. Pat. No. 9,477,147, filed May 6, 2014, entitled Spring Assemblies with Variable Flexibility for use with Push-Cables and Pipe Inspection Systems; U.S. Pat. No. 9,829,783, issued Oct. 17, 2016, entitled Spring Assemblies with Variable Flexibility for use with Push-Cables and Pipe Inspection Systems; and/or U.S. Pat. No. 10,379,436, issued Nov. 13, 2017, entitled Spring Assemblies with Variable Flexibility for use with Push-Cables and Pipe Inspection Systems, the content of which are incorporated by reference herein in its entirety. The various push cable springs described herein, such as push cable spring 235, may be formed through a 3D printing process. In such embodiments, the 3D printing process may allow for low cost push cable springs having intricate details and thereby unique mechanical properties.

A drum reel 240 or other apparatus for dispensing push cable 220 may further be coupled to a proximal end of the push cable 220. The camera head 210 may be coupled to a distal end of the push cable 220. The drum reel 240 may be a reel/cable storage drum as described, for example, in co-assigned patents and patent applications including: U.S. Pat. No. 6,958,767, issued Oct. 25, 2005, entitled Video Pipe Inspection System Employing Non-Rotating Cable Storage Drum; U.S. patent application Ser. No. 12/704,808, now U.S. Pat. No. 10,009,582, filed Feb. 12, 2010, entitled Pipe Inspection System with Replaceable Cable Storage Drum; U.S. patent application Ser. No. 13/826,112, filed Mar. 14, 2013, entitled Systems and Methods Involving a Smart Cable Storage Drum and Network Node for Transmission of Data; U.S. patent application Ser. No. 14/216,358, filed Mar. 17, 2014, entitled Systems and Methods Involving a Smart Cable Storage Drum and Network Node and Methods; U.S. patent application Ser. No. 14/469,536, now U.S. Pat. No. 9,521,303, filed Aug. 26, 2014, entitled Cable Storage Drum with Moveable CCU Docking Apparatus; and/or U.S. Pat. No. 10,084,945, issued Dec. 5, 2016, entitled Cable Storage Drum with Moveable CCU Docking Apparatus. The content of each of these applications is incorporated by reference herein in its entirety.

The drum reel 240 and/or other system devices may further include a cable counting element (cable counting element 242 of FIG. 2B) for generating cable counting data corresponding to the measured the amount of push cable dispensed (e.g., a cable or distance counter), such as those described in, for example, co-assigned U.S. patent application Ser. No. 14/203,485, filed Mar. 10, 2014, entitled Pipe Inspection Cable Counter and Overlay Management System, and/or U.S. patent application Ser. No. 12/766,742, now U.S. Pat. No. 8,970,211, filed Apr. 23, 2010, entitled Pipe Inspection Cable Counter and Overlay Management System. The content of each of these applications is incorporated by reference herein in its entirety.

The system 200 may further include a CCU 245 which may display images, video, and/or data provided from the camera head 210. The CCU 245 may further control operation of the camera head 210, displayed images/video, and/or other devices within the inspection system. Likewise, processing and storage of camera head data, including inertial data, may occur at the CCU 245. The CCU 245 may, for example, be a device as described in co-assigned U.S. patent application Ser. No. 13/941,381, now U.S. Pat. No. 9,769,366, filed Jul. 12, 2013, entitled Self-Grounding Transmitting Portable Camera Controller for Use with Pipe Inspection Systems, and/or U.S. patent application Ser. No. 14/213,458, filed Mar. 14, 2014, entitled Self-Grounding Transmitting Portable Camera Controller for Use with Pipe Inspection Systems. The content of each of these applications is incorporated by reference herein in its entirety. The displaying, processing, and storage of video data and other camera head data, including inertial data, may occur in one or more other computing devices 250. Such computing devices may include laptops, smart phones, remote servers, tablets or the like.

The system 200 may include a Sonde device 255 at a known location along push cable 220 from camera head 210 and/or, in some embodiments, disposed inside camera head 210. The Sonde device 255 may generate a dipole electromagnetic field from within pipe 225, which may then be detected by a buried utility locating device, such as utility locating device 260, to determine the position of the Sonde device 255 (below the ground) at the ground surface. The Sonde device 255 may, for example, be a Sonde such as those described in co-assigned patents and patent applications including: U.S. Pat. No. 7,221,136, issued May 22, 2007, entitled Sondes for Locating Underground Pipes and Conduits; U.S. Pat. No. 7,298,126, issued Nov. 20, 2007, entitled Sondes for Locating Underground Pipes and Conduits; U.S. Pat. No. 7,863,885, issued Jan. 4, 2011, entitled Sondes for Locating Underground Pipes and Conduits; U.S. patent application Ser. No. 14/027,027, filed Sep. 13, 2013, entitled Sonde Devices Including a Sectional Ferrite Core Structure; and/or U.S. patent application Ser. No. 14/215,290, now U.S. Pat. No. 9,798,033, filed Mar. 17, 2014, entitled Sonde Devices Including a Sectional Ferrite Core Structure. The content of each of these applications is incorporated by reference herein in its entirety. In some embodiments, the one or more Sonde devices 255 may be multi-frequency devices configured to broadcast at a multitude of frequencies. In some embodiments, a unique frequency may be broadcast by the Sonde 255 measurable by a utility locator device 260 to determine locate points at the ground surface. Such locate points may be used to correlate a pipe map to the ground surface, determine or correct directions of the camera head, and/or identify location of aspects inside the pipe.

The utility locating device 260 of system 200 may be used to determine and/or map the location of pipes buried within the ground including pipe locations correlating with video or still images and associated pipe data generated at the camera head 210. In some such system embodiments, a utility locating device such as the utility locating device 260 may further be configured to receive image or video data and/or other data or information generated at the camera head, such as via a wireless data connection, and display and/or store images/video from the pipe inspection as transmitted via wireless data connection between the utility locating device 260 and CCU 245 or utility locating device 260 and drum reel 240. In some system embodiments, such data may be communicated via a wired connection indirectly coupling the camera head 210 and the utility locating device 260.

The utility locating device 260 may include a processing element for processing data, including inertial data from camera head 210, and/or images or video from the camera head 210. The locate data could be combined using synchronization from a common time base. Such a common time base may be achieved through GPS or synchronization of clocks by other means such as optical, audio, or electromagnetic synchronization pulses between system devices. The wireless communication/transceiver module may be, for example, a Bluetooth or Wi-Fi communication module, a cellular data communication module, or other wireless communication modules. In some embodiments, the utility locating device 260 may further be configured to control operational parameters of the camera head 210 and/or other system devices such as the CCU 245 and drum reel 240.

Details of example utility locating devices as may be used in combination with the disclosures herein in various system embodiments are described in co-assigned patents and patent applications including: U.S. Pat. No. 7,009,399, issued Mar. 7, 2006, entitled Omnidirectional Sonde and Line Locator; U.S. Pat. No. 7,276,910, issued Oct. 2, 2007, entitled A Compact Self-Tuned Electrical Resonator for Buried Object Locator Applications; U.S. Pat. No. 7,288,929, issued Oct. 30, 2007, entitled Inductive Clamp for Applying Signal to Buried Utilities; U.S. Pat. No. 7,443,154, issued Oct. 28, 2008, entitled Multi-Sensor Mapping Omnidirectional Sonde and Line Locator; U.S. Pat. No. 7,518,374, issued Apr. 14, 2009, entitled Reconfigurable Portable Locator Employing Multiple Sensor Array Having Flexible Nested Orthogonal Antennas; U.S. Pat. No. 7,619,516, issued Nov. 17, 2009, entitled Single and Multi-Trace Omnidirectional Sonde and Line Locators and Transmitters Used Therewith; U.S. Pat. No. 7,825,647, issued Nov. 2, 2010, entitled Compact Line Illuminator for Locating Buried Pipes and Cables; U.S. Pat. No. 7,990,151, issued Aug. 2, 2011, entitled Tri-Pod Buried Locator System; U.S. patent application Ser. No. 13/469,024, now U.S. Pat. No. 9,207,350, filed May 10, 2012, entitled Buried Object Locator Apparatus and Systems; U.S. patent application Ser. No. 13/570,211, now U.S. Pat. No. 9,435,907, filed Aug. 8, 2012, entitled Phase-Synchronized Buried Object Locator Apparatus, Systems, and Methods; U.S. Pat. No. 8,248,056, issued Aug. 21, 2012, entitled A Buried Object Locator System Employing Automated Virtual Depth Event Detection and Signaling; U.S. Pat. No. 8,264,226, issued Sep. 11, 2012, entitled System and Method for Locating Buried Pipes and Cables with a Man Portable Locator and a Transmitter in a Mesh Network; U.S. patent application Ser. No. 13/676,989, now U.S. Pat. No. 9,638,824, filed Nov. 11, 2012, entitled Quad-Gradient Coils for Use in a Locating System; U.S. patent application Ser. No. 13/851,951, filed Mar. 27, 2013, entitled Dual Antenna Systems with Variable Polarization; U.S. patent application Ser. No. 14/214,151, filed Mar. 14, 2014, entitled Dual Antenna Systems with Variable Polarization; and/or U.S. patent application Ser. No. 14/446,279, now U.S. Pat. No. 9,632,199, filed Jul. 29, 2014, entitled Inductive Clamp Devices, Systems, and Methods. The content of each of these applications is incorporated by reference herein in its entirety.

As disclosed in the various above-listed incorporated patents and patent applications, a utility locating device may include one or more location or position sensors such as global position system (GPS) sensors, inertial sensors, magnetic sensors and the like. Such sensors may be used to track and interpret motion vectors as the utility locating device is moved about its operating surface and/or associate these with absolute position data such as latitude/longitude data or relative position data such as data relating the position of the locator to reference surface features or objects. This data may be combined with images and/or video to generate combined position and mapping data, which may be associated, stored in a memory, transmitted to other electronic computing devices and systems and the like. As described subsequently herein, such mapping solution data may include data corresponding to location imagery as well as data collected through a pipe inspection by a camera head to reference a ground surface location via a utility locator device and/or other system tool. Pipe inspection imagery and data may be displayed upon the utility locating device display, stored in a memory, and/or transmitted to other devices and systems for archiving, mapping, analysis, and the like.

Figure 2B:
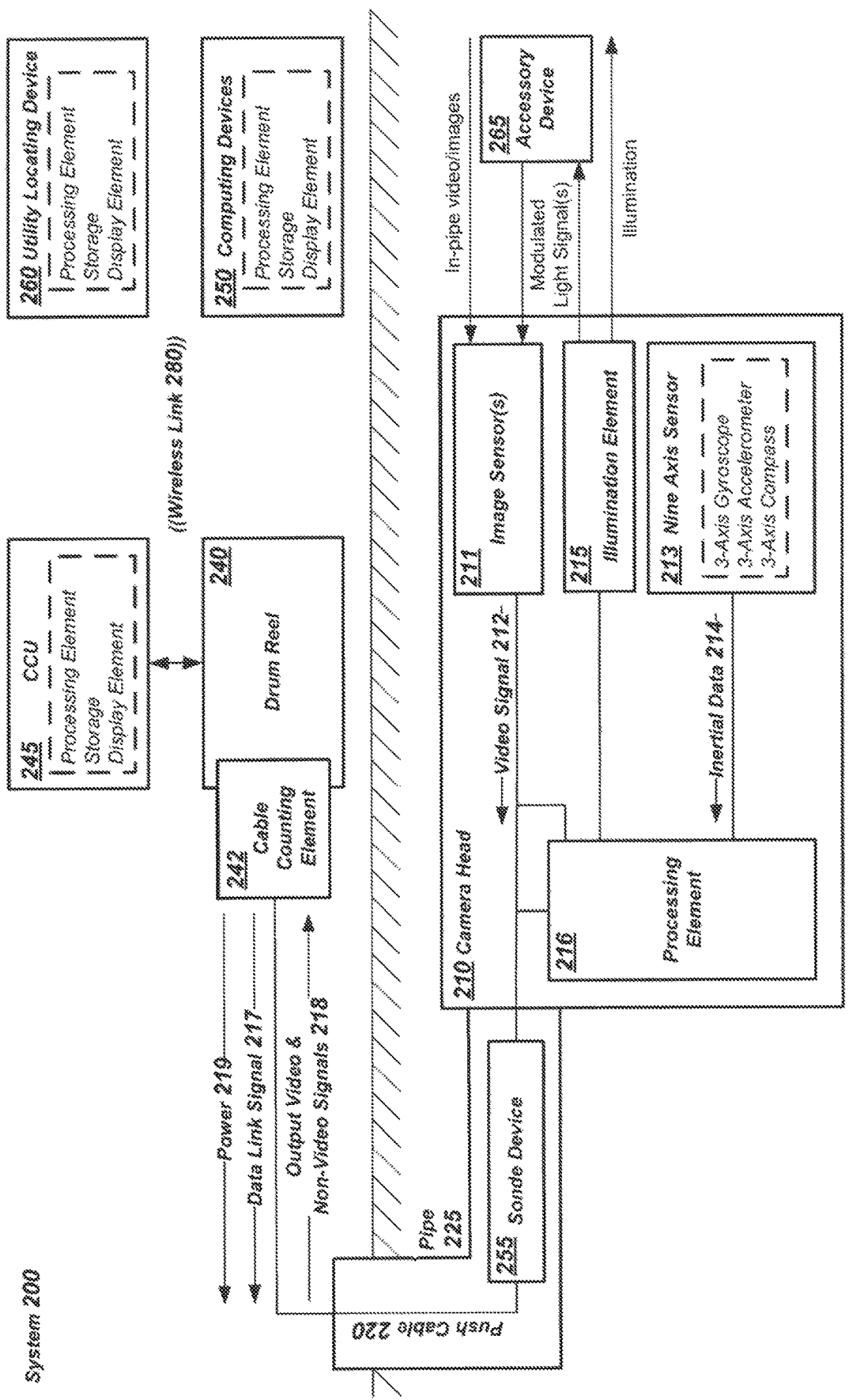
FIG. 2B is a diagram describing aspects of the pipe inspection and mapping system embodiment from FIG. 2A.

The mapping and/or inspection system 200 of FIGS. 2A and 2B may further include an in-pipe accessory device 265 that may be configured to communicate with the camera head 210. For instance, modulation of light emitted by the camera head 210 and/or in-pipe accessory device 265 may be used to transmit a modulated light signal whereas image or photo sensors in the camera head 210 and/or in-pipe accessory device 265 may be used to receive the modulated light signal. Each device, camera head 210 and in-pipe accessory device 265, may include a processing element configured to receive transmitted modulated light signals and carry out operations relating to the commands or other communications. For instance, in FIG. 2A, the in-pipe accessory device 265 is a grasping device for grasping objects that may be lost or otherwise disposed inside the pipe 225. The modulated light signal from the camera head 210 may instruct the in-pipe accessory device 265 to grab onto an object. In some uses, the modulated light signals may include other commands, status of batteries or other device conditions, and/or other instructions between the devices. In other embodiments, other in-pipe accessory devices 265 may include, but are not limited to, pipe clearing devices, additional Sonde devices, crawling devices to aid in navigating pipes, or the like.

System 200 may include a tracked rangefinder device 270 configured to generate imagery of geolocations on the Earth's surface having coordinates in a world coordinate system. The tracked rangefinder device 270 may identify ground surface points that may be significant to the pipe inspection and mapping operations and/or locating. For instance, the tracked rangefinder device 270 may be used to identify the access point of the camera head 210 into pipe 225. The tracked rangefinder device 270 may be or share aspects with the tracked distance finders and rangefinder devices such as those described in co-assigned application U.S. patent application Ser. No. 15/866,360, filed Jan. 9, 2018, entitled Tracked Distance Measuring Devices, Systems, and Methods and/or U.S. patent application Ser. No. 16/241,864, filed Jan. 7, 2019, entitled Tracked Distance Measuring Devices, Systems, and Methods, the content of which is incorporated by reference herein in its entirety.

System 200 may include a GPS backpack device 275 configured to determine or refine the geolocation of various systems in a world coordinate system. The GPS backpack device 275 may be of the variety described in the incorporated U.S. patent application Ser. No. 13/851,951, filed Mar. 31, 2012, entitled DUAL ANTENNA SYSTEMS WITH VARIABLE POLARIZATION; U.S. patent application Ser. No. 14/214,151, filed Mar. 29, 2013, entitled DUAL ANTENNA SYSTEMS WITH VARIABLE POLARIZATION; and U.S. patent application Ser. No. 16/525,157, filed Jul. 29, 2019, entitled DUAL ANTENNA SYSTEMS WITH VARIABLE POLARIZATION. The content of each of these applications is incorporated by reference herein in its entirety.

Turning to FIG. 2B, a diagram of the pipe inspection and mapping system embodiment 200 is illustrated. The camera head 210 of system 200 may include one or image sensors 211 generating video signal(s) 212 which may be video and images of scenes from the inside of pipe 225 and one or more nine axis sensors 213 generating inertial data 214 relating to measured positions, orientations, and movements (or lack thereof) of the camera head 210. The one or more image sensors 211 may be HDR or auto HDR imagers. The nine axis sensor 213 may include accelerometers, magnetometers, and gyroscopic sensors measuring inertial data related to movements of the camera head, generally in three dimensions. In some embodiments, the nine-axis sensors may instead be or include other inertial sensors and/or other sensors for or relating to measuring positions, orientations, and movements (or lack thereof) of a camera head which may occur along nine axes, six axes, or along any number axes or combination of sensors measuring along different axes. An illumination element 215 may be disposed in camera head 210 that may be or include LEDs or other light producing elements configured to illuminate the field of view of the one or more image sensors 211.

The camera head 210 may include a processing element 216 configured to receive video signals 212 and inertial data 214 and, in some embodiments, other non-video data from other sensors or elements in the camera head or otherwise directly or indirectly wired or wirelessly coupled system devices. Such non-video data may include datalink signals 217 which may include instructions from other system devices. In some embodiments, the datalink signal 217 may include cable counting data from a cable counting element 242 corresponding to the measured amount of push cable 220 dispensed from drum reel 240. The cable counting element 242 is illustrated as coupled to the drum reel 240 in system 200. In some system embodiments, a cable counting element such as cable counting element 242 may be included for measuring the amount of push cable dispensed. Power 219 may likewise be provided to processing element 216 for provisioning to the camera head 210. For instance, the CCU 245, drum reel 240, or other connected system device may be battery powered or otherwise connect to a power outlet which may further power the camera head 210.

Corrected inertial data and pipe mapping methods, such as method 300 of FIG. 3, may be performed partially or fully in the processing element 216 of camera head 210. Likewise, such processing may occur in processing elements disposed in the CCU 245 and/or utility locating device 260 and/or computing devices 250 of FIGS. 2A and 2B and/or other system devices containing a processing element. Likewise, storage of system data, including video signals and data, inertial data, output of inertial data and pipe mapping methods, and/or other system data may occur in the CCU 245 and/or utility locating device 260 and/or computing devices 250 of FIGS. 2A and 2B and/or other system devices containing storage which may be transitory or non-transitory memory. The processing element 216 may be configured to receive datalink signals 217 and perform operations relating to received instructions as well as communicate instructions to the various sensors and other elements of camera head 210.

The processing element 216 may generate output video and non-video data signals 218 communicated via push cable 220 to the CCU 245 and/or utility locating device 260 and/or computing devices 250 of FIGS. 2A and 2B and/or other system devices. Output video and non-video data signals 218 may include data relating to video signal 212 and inertial data 214.

Displaying of video/image data may occur at one or more system devices equipped with a display element (e.g., CCU 245, utility locating device 260, computing devices 250, or the like). A wireless link 280 may allow the exchange of data between the drum reel 240 and/or CCU 245 and the utility locating device 260 as well as the exchange of data between the drum reel 240 and/or CCU 245 and one or more other wirelessly connected computing devices 250. The computing devices 250 may be or include smart phones, laptop computers, and/or other like portable or non-portable computing devices 250. In some embodiments, such computing devices 250 may include one or more remote servers.

Turning to FIG. 3, a method 300 for generating corrected inertial data and a subsequent pipe map is described. In a step 310, the pipe inspection operation may begin. In a step 320, the location of the access point of the camera head into a pipe is determined. The step 320 may be accomplished in various ways. For instance, in some method embodiments, the access point location may be input by a user using a GPS device or by identifying the access point on a map. In some method embodiments, the access point location may be identified by a tracked rangefinder device such as the tracked range finder device 270 of FIG. 2A. In yet further embodiments, the camera head may be configured to identify the access point upon entry and determine the location of the access point in a world coordinate system.

In a step 330, the direction of the camera head may be determined. Step 330 may include the use of magnetometers in the camera head. In some embodiments, the magnetometer data may be corrected or enhanced by location points on the ground surface (e.g., such as the location points described in conjunction with operation 400 of FIG. 4). In some embodiments, the ground surface location points alone may be used to determine camera head direction. In parallel steps 340, 342, and 344, the camera head may be moved forward (in a forward direction or first direction) through the pipe while simultaneously determining push cable count data representing the length of push cable dispensed from the drum reel and outgoing inertial navigation data generated at the camera head. In parallel steps 350, 352, and 354, the camera head may be moved in the reverse direction (or second direction) through the pipe while simultaneously determining push cable count data representing the length of push cable dispensed back into the drum reel and ingoing inertial navigation data generated at the camera head.

In a following step 360, outgoing and ingoing inertial data may be correlated based on push cable count data. In a step 370, corrected inertial data may be generated based on correlating ingoing and outgoing inertial data. For instance, the step 370 may include a metric whereby if ingoing and outgoing inertial data agrees to within a threshold, an averaging of inertial data may be determined as correct for the correlated cable count data location. In correlated cable count data locations wherein the ingoing and outgoing inertial data falls outside of a threshold, the inertial data may be discarded. In some embodiments, the correlated cable count data locations may further correlate to in-pipe images or video. The in-pipe images or video may be accessed to determine whether the inertial data is in agreement with what is occurring in the pipe. For instance, inertial data corresponding to a corner or turn may be identified in the video and thereby verified as correct.

In a subsequent step 380, a pipe map may be generated based on the corrected inertial data. For instance, such a pipe map may use 3D reconstruction techniques to reconstruct the bends and turns inside of the inspected pipe. Video or other pipe inspection imagery, as well as other inspection data, may further correlate to the correlated cable count data locations of the pipe map. In a step 390, the pipe map location may be correlated to ground surface locations based on access point location of step 320 and camera head direction of step 330.

Figure 4:
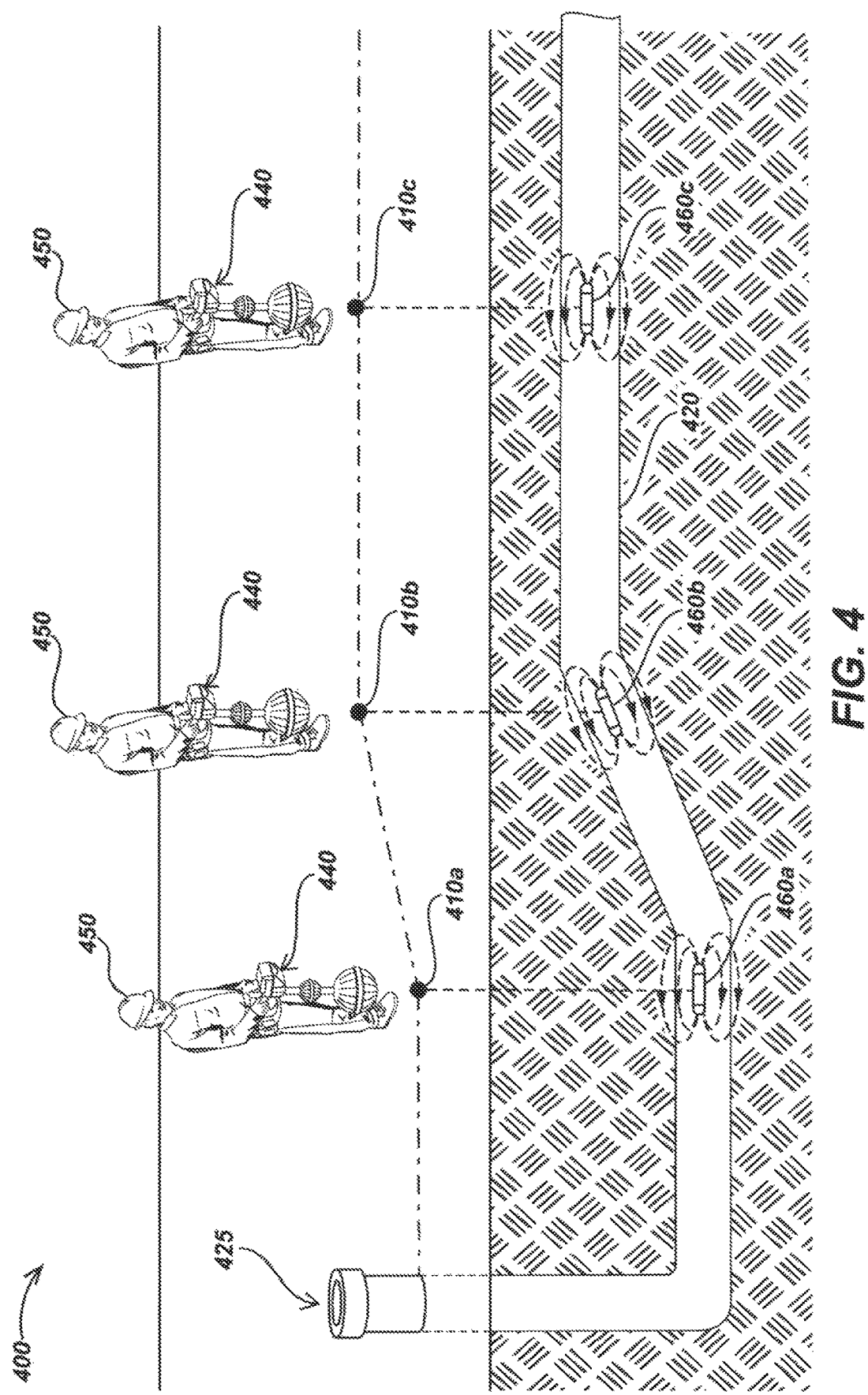
FIG. 4 is an illustration of a pipe inspection and mapping operation.

Turning to FIG. 4, a pipe inspection and mapping operation 400 is illustrated. In operation 400, various locate points (also referred to as location points) (410a, 410b, and 410c) may be ground level locations corresponding to pipe 420 locations. For instance, as a camera head is moved through the pipe 420, a Sonde device disposed in the camera head and/or on the push cable at a known distance from the camera head may broadcast a signal measurable by a utility locating device 440 carried by a user 450. The Sonde broadcast locations, 460a, 460b, and 460c, may be determined at the utility locating device 440 to correspond to ground level locate points 410a, 410b, and 410c. In such embodiments, a pipe map may be fitted to a map of the ground surface. In some embodiments, the geolocation of the access point 425 of the pipe 420 may be determined, and locate points, such as locate points 410a, 410b, and 410c, may be used to determine the direction of the camera head or correct direction of the camera head.

Still referring to FIG. 4, the Sonde devices may be configured to always be on during an inspection and separate from the camera head. In system embodiments wherein the camera head includes one or more compass or other inertial sensors, such as the camera head 110 of FIG. 1B or camera head 210 of FIG. 2B or camera head 510 of FIG. 5 or camera head 610 of FIG. 6, the Sonde device(s) may be modulated to avoid saturating the input of such sensors. In some embodiments, the modulation of the Sonde device may be controlled by a motion metric determined by inertial sensors and/or the cable counting element and/or motion detected visually through the image sensor(s). For instance, the signal level of the Sonde device may be increased when the camera head is stationary or near stationary and decreased when in motion. In some embodiments, the change in received Sonde device signal at the compass sensor may be used to determine the position of the Sonde device relative to the camera head. This known position of the Sonde device relative to the camera head may be further be used to determine past position of the camera head. A succession of past camera head positions may further determine a path traveled by a camera head which may further be mapped and stored.

Figure 5:
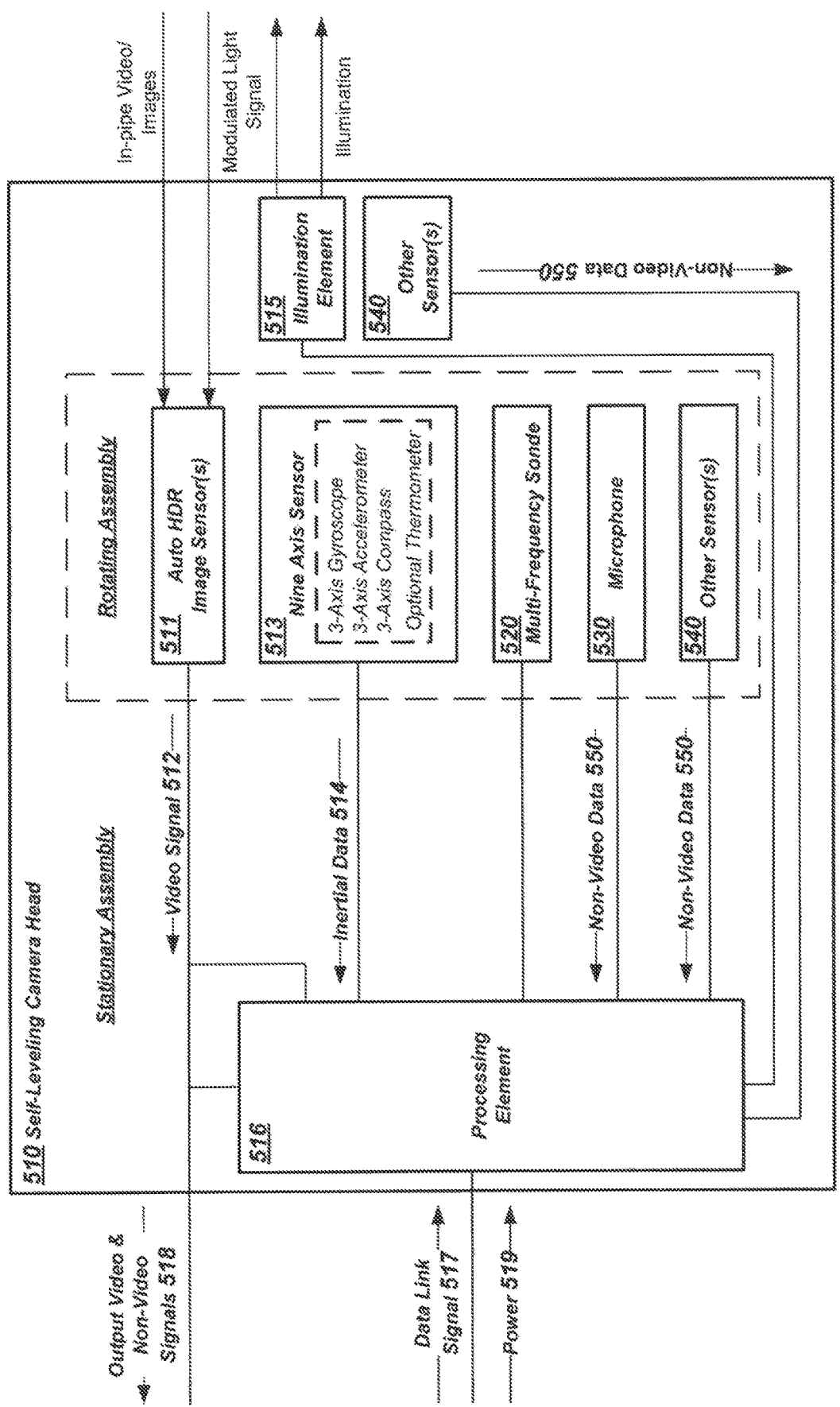
FIG. 5 is a diagram of a self-leveling motion tracking camera head.

Turning to FIG. 5, a diagram of a camera head 510 in keeping with the present disclosure is illustrated which may be a self-leveling camera head having both stationary and rotating assemblies. The stationary assembly may refer to the internal camera component assembly or assemblies that are moveable relative to the camera head housing. The rotating assembly may refer to the internal camera assembly or assemblies configured to rotate relative to the camera head housing. Such rotations may generally allow the rotating assembly components to remain upright with respect to gravity.

The camera head 510 may be or share aspects with the mechanical or digital self-leveling camera heads described in U.S. patent application Ser. No. 13/358,463, now U.S. Pat. No. 9,927,368, filed Jan. 25, 2012, entitled Self-Leveling Inspection Systems and Methods and U.S. Pat. No. 8,587,648, issued Nov. 19, 2013, entitled Self-Leveling Camera Head. The content of each of these applications is incorporated by reference herein in its entirety.

The image sensors of camera head 510 may be one or more Auto HDR image sensors 511 generating HDR video signal(s) 512 which may be video and images of scenes from the inside of a pipe. The image sensor(s) 511 may be disposed in the rotating assembly of camera head 510 such that the image sensor(s) rotate to be upright with respect to gravity. The camera head 510 may also include one or more multi-axis sensors, such as one or more nine axis sensors 513 in the rotating assembly for generating inertial data 514 relating to measured positions, orientations, and movements (or lack thereof) of camera head 510. The nine axis sensors 513 may include accelerometers, magnetometers, and gyroscopic sensors measuring inertial data in three dimensions. The nine axis sensor 513 of FIG. 5 may further include an optional thermometer configured to measure temperature in the camera head 510.

The rotating assembly of camera head 510 may further include a variety of other non-video sensors and elements. For instance, the rotating assembly of camera head 510 may include a multi-frequency Sonde 520, a microphone 530, and/or a variety of other sensors 540 (e.g., humidity sensors, rangefinder sensors, or the like). The multi-frequency Sonde 520 may broadcast a multitude of electromagnetic dipole signals that may be measured at the ground surface by a utility locating device. The microphone 530 and other sensors 540 may produce non-video data 550 relating to in-pipe audio and other non-video aspects.

The stationary assembly may include an illumination element 515 which may be or include LEDs or other light producing elements configured to illuminate the view of the one or more image sensors 511. One or more other sensors 540 (e.g., humidity sensors, rangefinder sensors, or the like) may also be included in the stationary assembly producing non-video data. In some embodiments, the stationary assembly may include one or more additional nine axis sensors configured to produce inertial data which may be compared against inertial data generated by nine axis sensors in the rotating assembly. In camera head 510, a processing element 516 may be disposed on the stationary assembly configured to receive video signals 512, inertial data 514, and non-video data 550 such as that from microphone 530 and other sensors 540 and/or, in some embodiments, other non-video data from other devices in other camera head or otherwise directly or indirectly wired or wirelessly coupled system devices. Such non-video data may include datalink signals 517 which may include instructions from other system devices. In some embodiments, the datalink signal 517 may include cable counting data from a cable counting element corresponding to the measured amount of the push cable dispensed from a drum reel.

Corrected inertial data and pipe mapping methods, such as method 300 of FIG. 3, may be performed partially or fully in the processing element 516 of camera head 510 and/or in the various processing elements of other system devices (e.g., CCU, utility locating device, other computing devices, or the like). The processing element 516 may be configured to receive datalink signals 517 and perform operations relating to received instructions as well as communicate instructions to the various sensors and other elements of camera head 510. Power 519 may likewise be provided to processing element 516 for provisioning to the camera head 510. The processing element 516 may generate output video and non-video data signals 518 communicated via the push cable to other system devices. Output video and non-video data signals may include data relating to video signals 512, inertial data 514, and other non-video data 550.

Figure 6:
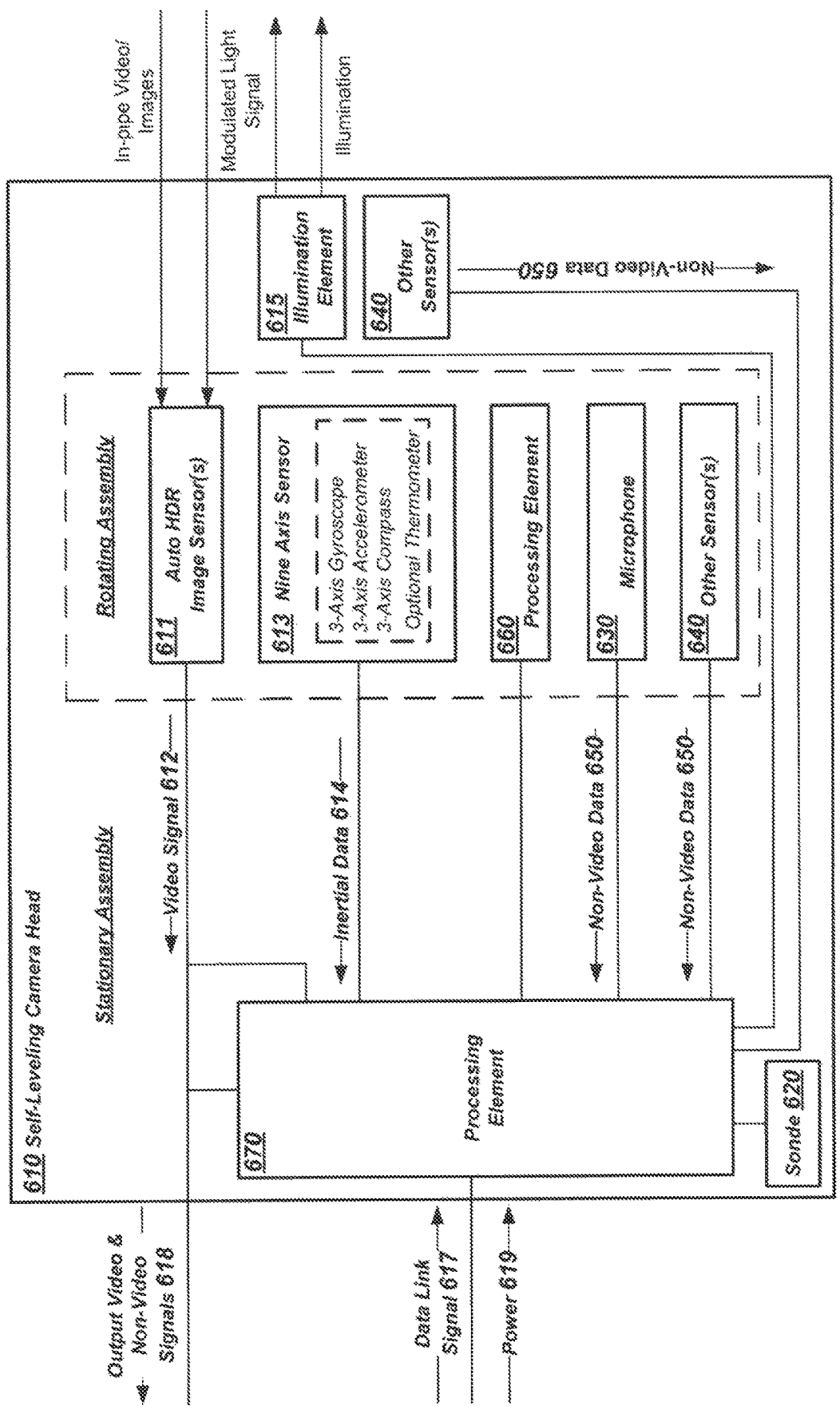
FIG. 6 is a diagram of another self-leveling motion tracking camera head.

Turning to FIG. 6, a diagram of a camera head 610 in keeping with the present disclosure is illustrated which may be a self-leveling camera head having processing elements in both the rotating and stationary assemblies. The camera head 610 may be or share aspects with the mechanical or digital self-leveling camera heads described in U.S. patent application Ser. No. 13/358,463, now U.S. Pat. No. 9,927,368, filed Jan. 25, 2012, entitled Self-Leveling Inspection Systems and Methods, and U.S. Pat. No. 8,587,648, issued Nov. 19, 2013, entitled Self-Leveling Camera Head. The content of each of these applications is incorporated by reference herein in its entirety.

The image sensor(s) 611 of camera head 610 may be one or more HDR or auto HDR sensors generating video signal(s) 612 which may be video and images of scenes from the inside of a pipe. The image sensor(s) 611 may be disposed in the rotating assembly of camera head 610 such that the image sensor(s) rotate to be upright with respect to gravity. The camera head 610 may also include one or more nine axis sensors 613 in the rotating assembly for generating inertial data 614 relating to measured positions, orientations, and movements (or lack thereof) of camera head 610. The nine axis sensor 613 may include accelerometers, magnetometers, and gyroscopic sensors measuring in three dimensions. The nine axis sensor 613 of FIG. 6 may further include an optional thermometer configured to measure temperature in the camera head 610.

The rotating assembly of camera head 610 may further include a variety of other non-video sensors and elements. For instance, the rotating assembly of camera head 610 may include a microphone 630, and/or a variety of other sensors 640 (e.g., humidity sensors, rangefinder sensors, or the like). A first processing element 660 may be included in the rotating assembly with image sensor(s) 611. The first processing element 660 may be configured to control aspects relating to the operation of the image sensor(s) 611 and/or video signals 612 therefrom and or nine axis sensors 613, associated inertial data 614, and/or other sensors 640. For instance, inertial data 614 from nine axis sensors 613 disposed in the stationary assembly of camera head 610 may be used to determine a motion metric that, when exceeding or falling within a certain threshold, may initiate the image sensor(s) to generate HDR imagery.

The stationary assembly may include an illumination element 615 which may be or include LEDs or other light producing elements configured to illuminate the view of the one or more image sensors 611. One or more other sensors 640 (e.g., humidity sensors, rangefinder sensors, or the like) may also be included in the stationary assembly producing non-video data. In some embodiments, the stationary assembly may include one or more additional nine axis sensors configured to produce inertial data which may be compared against inertial data generated by the nine axis sensors in the rotating assembly.

The stationary assembly of camera head 610 may include one or more Sondes 620 which may broadcast electromagnetic signal(s) that may be measured at the ground surface by a utility locating device. A second processing element 670 may be disposed on the stationary assembly configured to receive video signals 612, inertial data 614, and non-video data 650 such as that from microphone 630 and other sensors 640 and/or, in some embodiments, other non-video data from other devices in other camera head or otherwise directly or indirectly wired or wirelessly coupled system devices. Such non-video data may include datalink signals 617 which may include instructions from other system devices. In some embodiments, the datalink signal 617 may include cable counting data from a cable counting element corresponding to the measured amount of the push cable dispensed from a drum reel.

Corrected inertial data and pipe mapping methods, such as method 300 of FIG. 3, may be performed partially or fully in the processing element 670 of camera head 610 and/or in the various processing elements of other system devices (e.g., CCU, utility locating device, other computing devices, or the like). The processing element 670 may be configured to receive datalink signals 617 and perform operations relating to received instructions as well as communicate instructions to the various sensors and other elements of camera head 610. Power 619 may likewise be provided to processing element 670 for provisioning to the camera head 610. The processing element 670 may generate output video and non-video data signals 618 communicated via the push cable to other system devices. Output video and non-video data signals may include data relating to video signal 612, inertial data 614, and other non-video data 650. The first processing element 660 of the rotating element and second processing element 670 of the stationary element may be configured to communicate data.

Figure 7A:
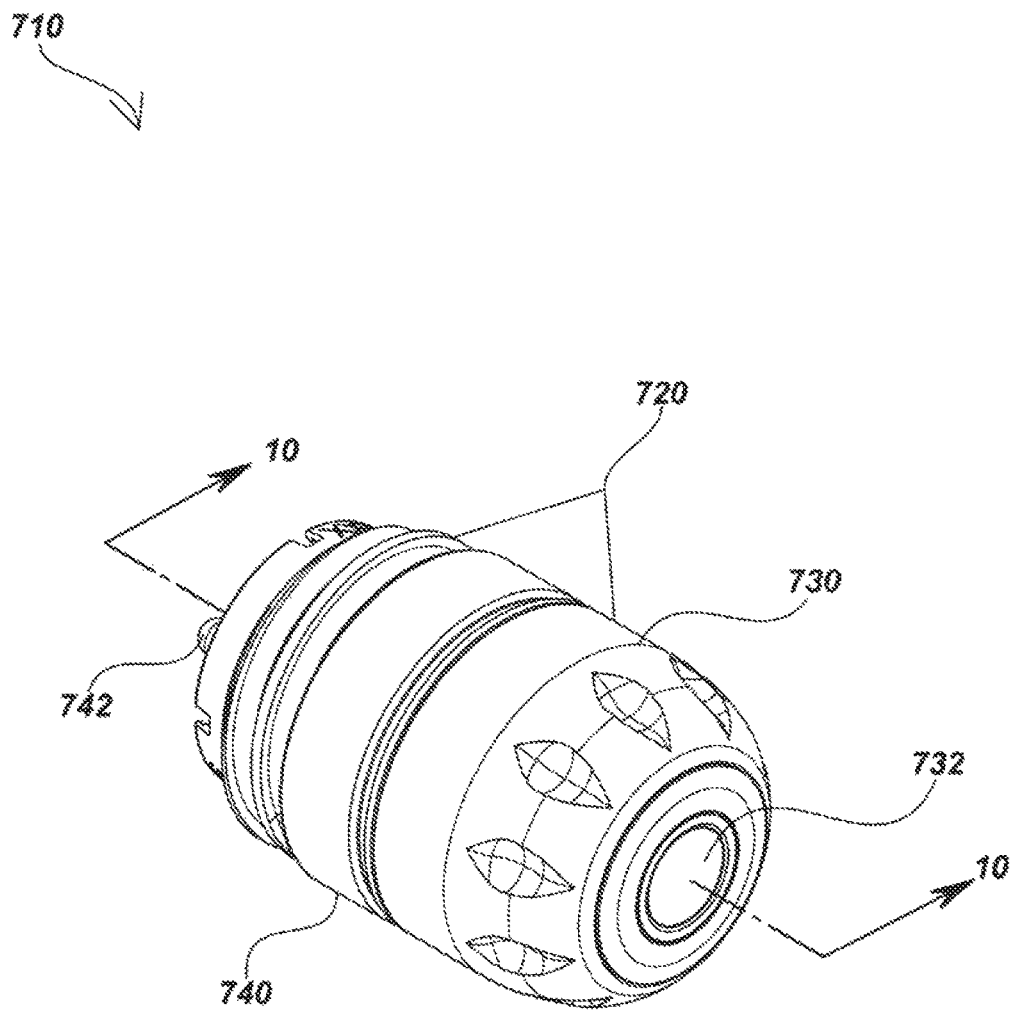
FIG. 7A is an isometric view of a self-leveling motion tracking camera head embodiment.
Figure 7B:
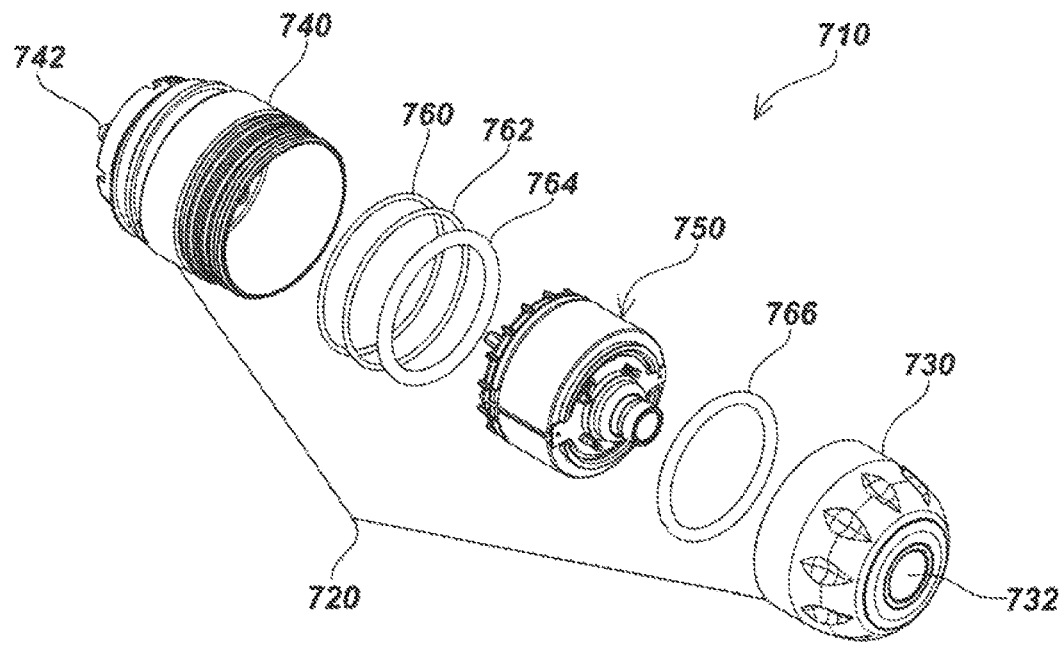
FIG. 7B is a partially exploded view of the camera head from FIG. 7A.
Figure 7C:
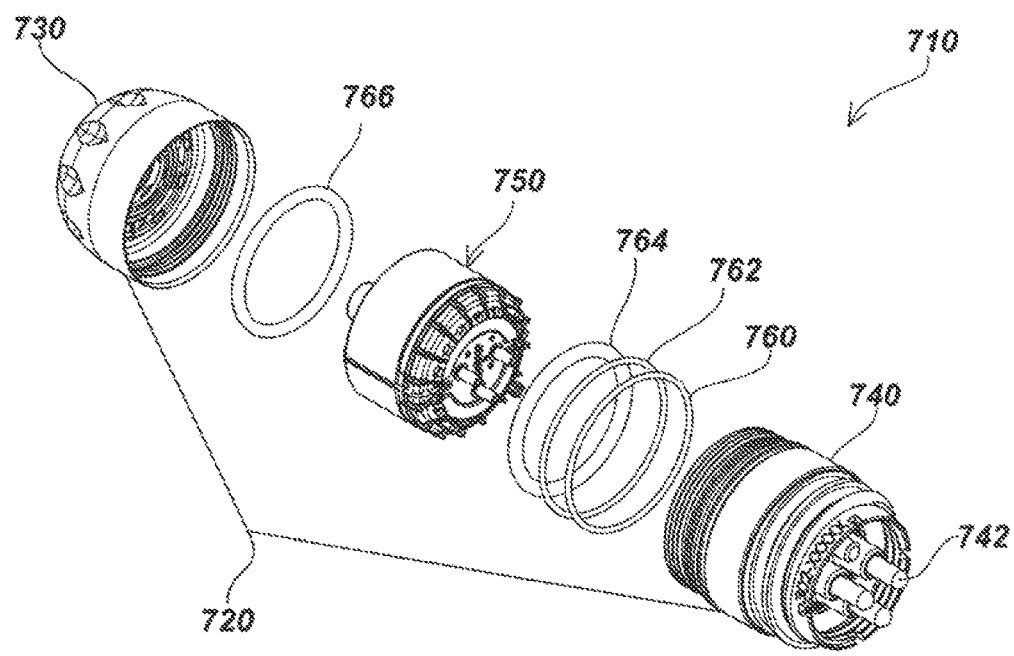
FIG. 7C is another partially exploded view of the camera head from FIG. 7A.

FIGS. 7A-7C illustrate details of an exemplary embodiment of a self-leveling motion tracking camera head 710 configured to generate inertial data relating to measured positions, orientations, and movements (or lack thereof) as it is moved through a pipe, as well as to generate a video signal representing real time or near real time images of scenes from the inside of the pipe. The camera head 710 may include an outer housing assembly 720 having a front housing element 730 and rear housing element 740. The front housing element 730 may have a window 732 allowing light to pass into the camera head 710 from the external environment. The window 732 may be glass, plastic, or sapphire ports that provide strength and protection against impacts, scratches, and other damage. The rear housing element 740 may have a connector 742 allowing the camera head 710 to attach to a push cable and provide power and communicate datalink as well as video and non-video data signals which may include inertial data generated therein. The front housing element 730 and rear housing element 740 may encapsulate a self-leveling camera module 750 (FIGS. 7B and 7C). A series of O-rings 760-766 (FIGS. 7B and 7C) may be disposed in camera head 710 to provide a water-tight seal protecting internal components from the ingress of water. In some embodiments, the housing assembly 720 may comprise non-magnetic materials.

Figure 8A:
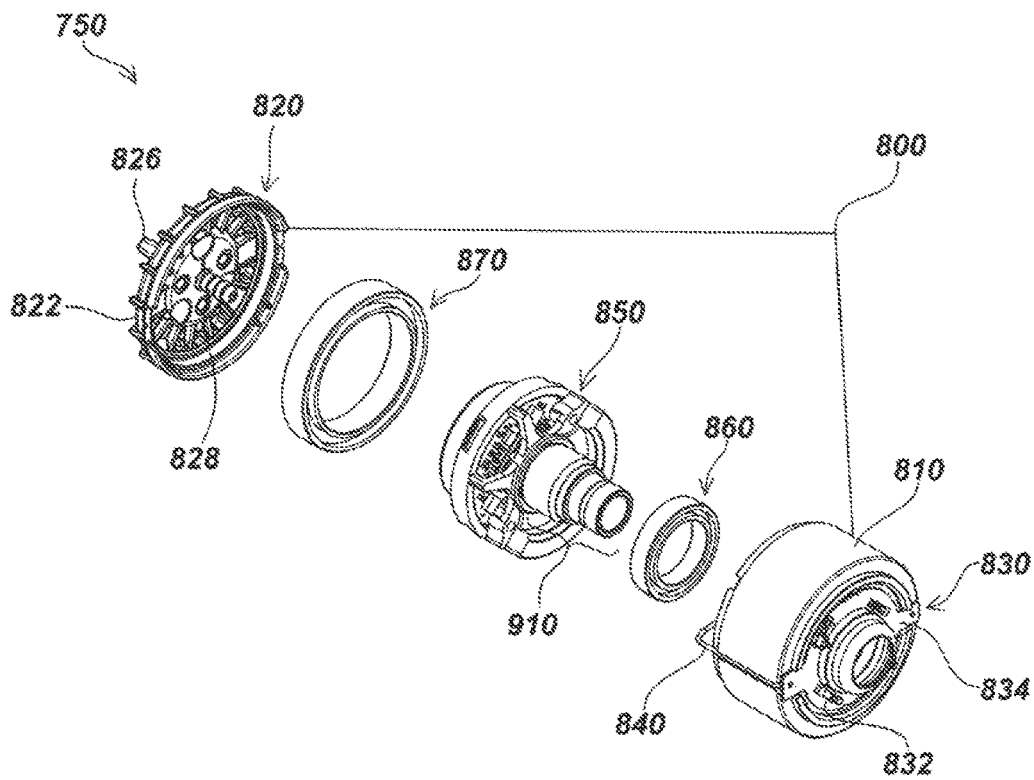
FIG. 8A is an exploded view of a camera module of the self-leveling motion tracking camera head embodiment of FIG. 7A.
Figure 8B:
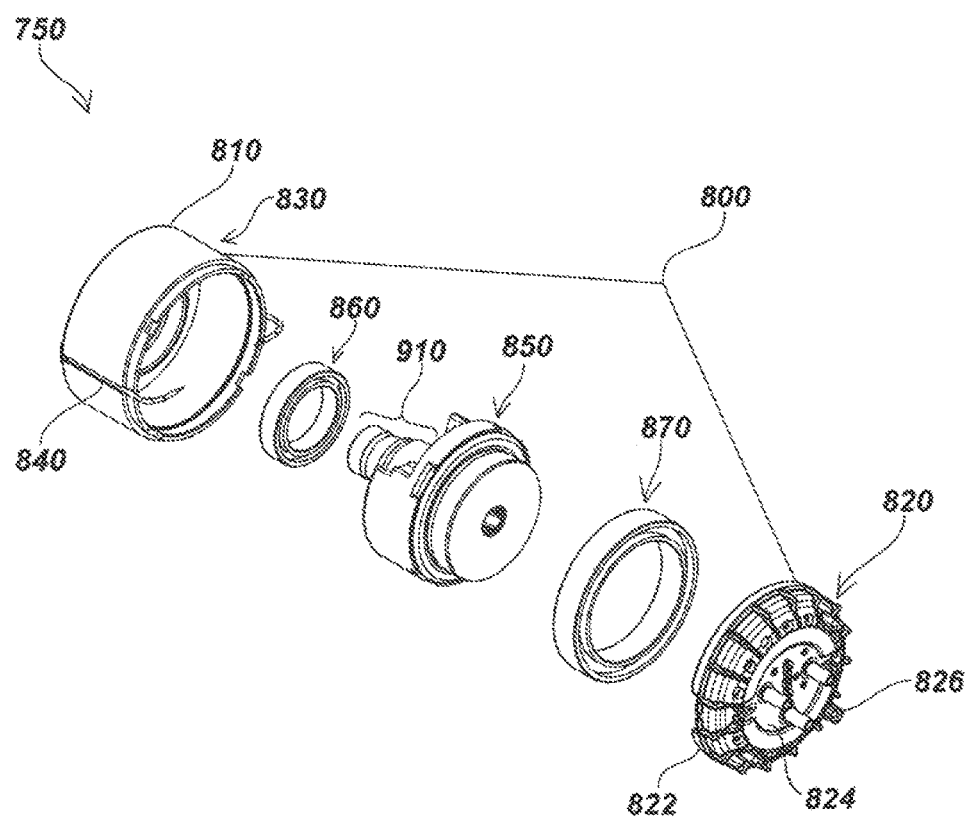
FIG. 8B is another exploded view of a camera module of the self-leveling motion tracking camera head embodiment of FIG. 7A.

Turning to FIGS. 8A and 8B, the self-leveling camera module 750 may have a stationary assembly 800 and a rotating assembly 850. The stationary assembly 800 may be moveable relative to the housing assembly 720 (FIG. 7A). The rotating assembly 850 may rotate relative to the housing assembly 720 (FIG. 7A) allowing the rotating assembly components to remain upright with respect to gravity. The stationary assembly 800 may include a cylindrical hollow body element 810 with a cap assembly 820 coupled onto the back end of the body element 810 and an illumination element 830 coupled onto the forward end of the body element 810.

A connector 840 may further connect the cap assembly 820 and illumination element 830 for purposes of signal/data communication as well as provisioning of power. The cap assembly 820 may include a cap body 822 dimensioned to fit onto the end of the cylindrical body element 810. A PCB 824 may secure to the back of the cap body 822 which may contain the stationary assembly processing element. Pins 826 coupled to PCB 824 may further contact corresponding contact elements in the connector 742 (FIG. 7C) and provide an electrical pathway further to a contact ring module 828 disposed on the inner side of the cap assembly 820. The contact ring module 828 may have a series of stacked isolated electrical contacts that may, in assembly, protrude into the rotating assembly 850 and make contact with brush elements disposed in a brush contact module 950 (FIGS. 9A and 9B) to communicate signals/data as well as provide power to the rotating assembly 850.

A bearing module 860 may fit about a lens module 910 (FIGS. 9A and 9B) of the rotating assembly 850 so as to be situated between the rotating assembly 850 and illumination element 830. An additional bearing module 870 may seat between the back of the rotating assembly 850 and the cap assembly 820 of the stationary assembly 800. The bearing modules 860 and 870 may allow the rotating assembly 850 to rotate about axis 880. The bearing modules 860 and 870 may be of non-magnetic materials so as to not impact inertial data, Sondes optionally disposed in the camera head, or the like. In some embodiments, a rotary encoder may be disposed between the stationary assembly and a rotating assembly to measure rotations of the rotating assembly.

The illumination element 830 may include a series of LEDs 832 disposed on an annular PCB 834 dimensioned to allow the lens module 910 (FIGS. 9A and 9B) of the rotating assembly 850 to pass through. In some embodiments, the LEDs 832 may be controlled by a processing element (and/or from datalink or like control signals from other system devices) to allow control over how illuminated the field of view is and/or be modulated to generate a modulated light signal so as to communicate with an optional in-pipe accessory device. In some camera head embodiments, the PCB 834 may further include a number of other sensors or elements (e.g., humidity sensors, temperature sensors, rangefinder sensors, Sondes, nine axis sensors, or the like).

Figure 9A:
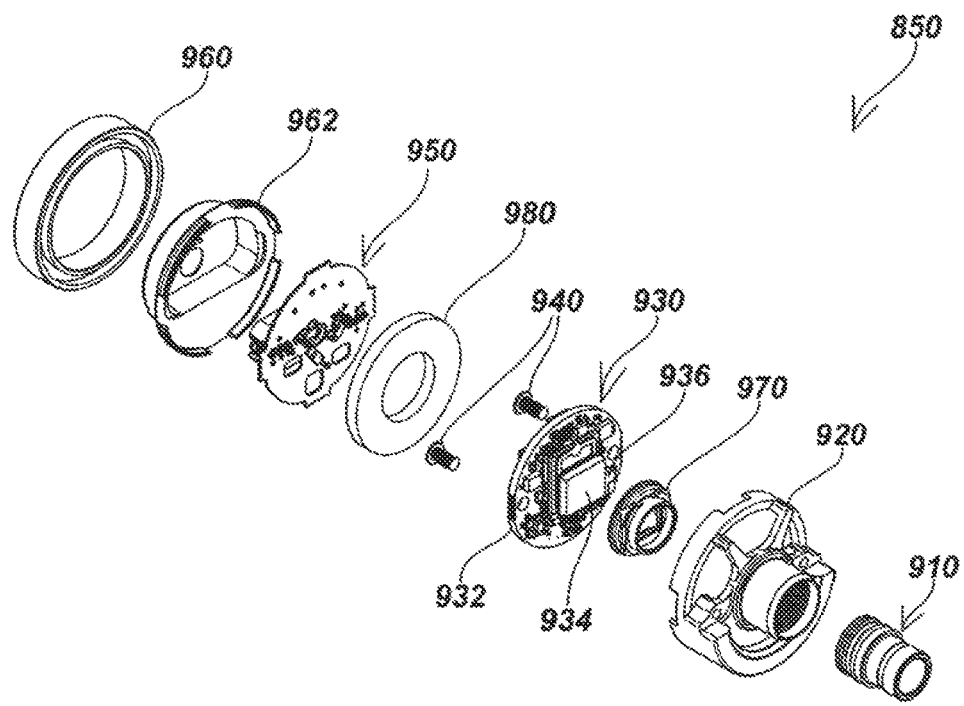
FIG. 9A is an exploded view of the rotating assembly.
Figure 9B:
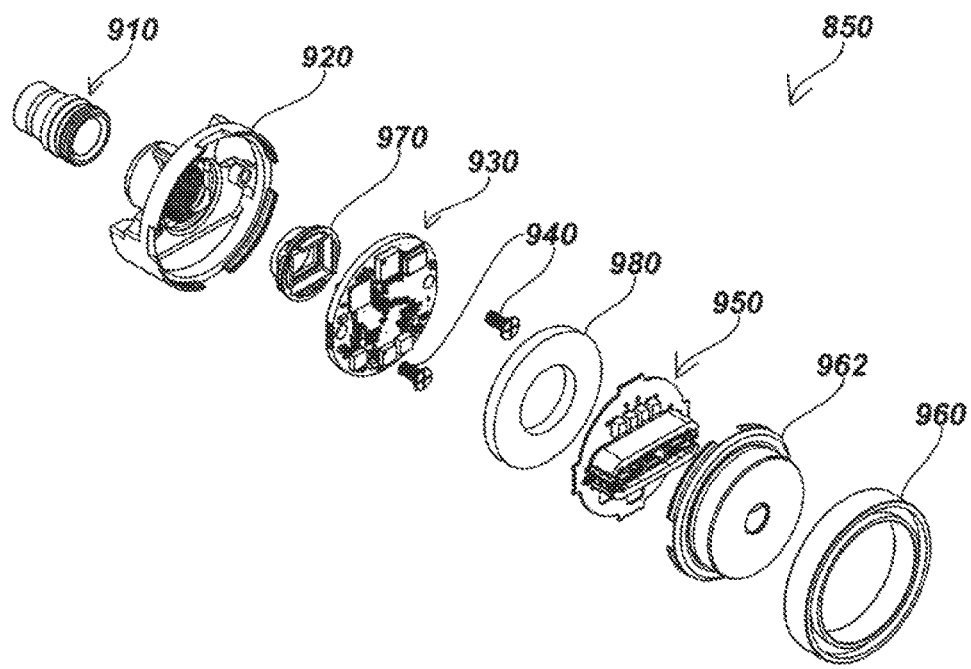
FIG. 9B is another exploded view of the rotating assembly.

Turning to FIGS. 9A and 9B, the rotating assembly 850 may include a lens module 910, a front counterweight housing 920, an imaging and sensing module 930, a series of screws 940, a brush contact module 950, a rear counterweight housing 960, a light limiting element 970, and a seal 980. The imaging and sensing module 930 may include a PCB 932 with at least one imaging sensor 934, which may be an HDR or auto HDR imaging sensor, and at least one nine axis sensor 936. In some embodiments, the imaging and sensing module 930 may further include one or more other sensors or elements including, but not limited to humidity sensors, temperature sensors, rangefinder sensors, Sondes, and nine axis sensors.

In assembly, a light limiting element 970 may fit over the imaging sensor 934 and control the amount of light provided by the imaging sensor 934. Seal 980 may seat between the imaging and sensing module 930 and brush contact module 950 providing a barrier for the brush contact module 950 in preventing the ingress of dust or debris and degrading the electrical contact made between the brush elements in the brush contact module 950 and contact rings of the of the contact ring module 828 (FIG. 8A). Threads formed along the bottom of the lens module 910 may be made to mate with threads formed centrally about the top of the front counterweight housing 920 to secure the lens module 910 and the front counterweight piece 920 together. Screws 940 may secure imaging and sensing module 930 to the front counterweight housing 920 thus securing the light limiting element 970 in between. Desiccant paper may optionally be placed within the rear counterweight housing 960 and below the brush contact module 950 so as to aid in preventing corrosion and/or fogging of the lens.

The front counterweight housing 920 may be formed with a half-circle ridge formed along one edge which may provide additional mass along one side of the rotating assembly 850. The rear counterweight housing 960 may be formed with a pocket along one side designed to fit a brush contact module 950 and provide an asymmetry in mass along the same side as the front counterweight housing 920. The front counterweight housing 920 and the rear counterweight housing 960 may further comprise dense materials such as, but not limited to, steel, zinc, brass, tungsten, or filled plastics. In some embodiments, the housings 920 and 960 may be non-magnetic materials to not interfere with the inertial data generated by nine axis sensor(s) 934. As the rotating assembly 850 may be made to rotate freely in respect to the stationary assembly 800 (FIGS. 8A and 8B), when in use, the asymmetry in mass along one side of the front counterweight housing 920 and the rear counterweight housing 960 may allow for the forces of gravity to operate as the leveling force of the camera head 710 (FIG. 7A). The rear counterweight housing 960 may further secure to the bottom of the front counterweight housing 920 and have a hole 962 dimensioned to fit the contact rings of the contact ring module 828.

Figure 10:
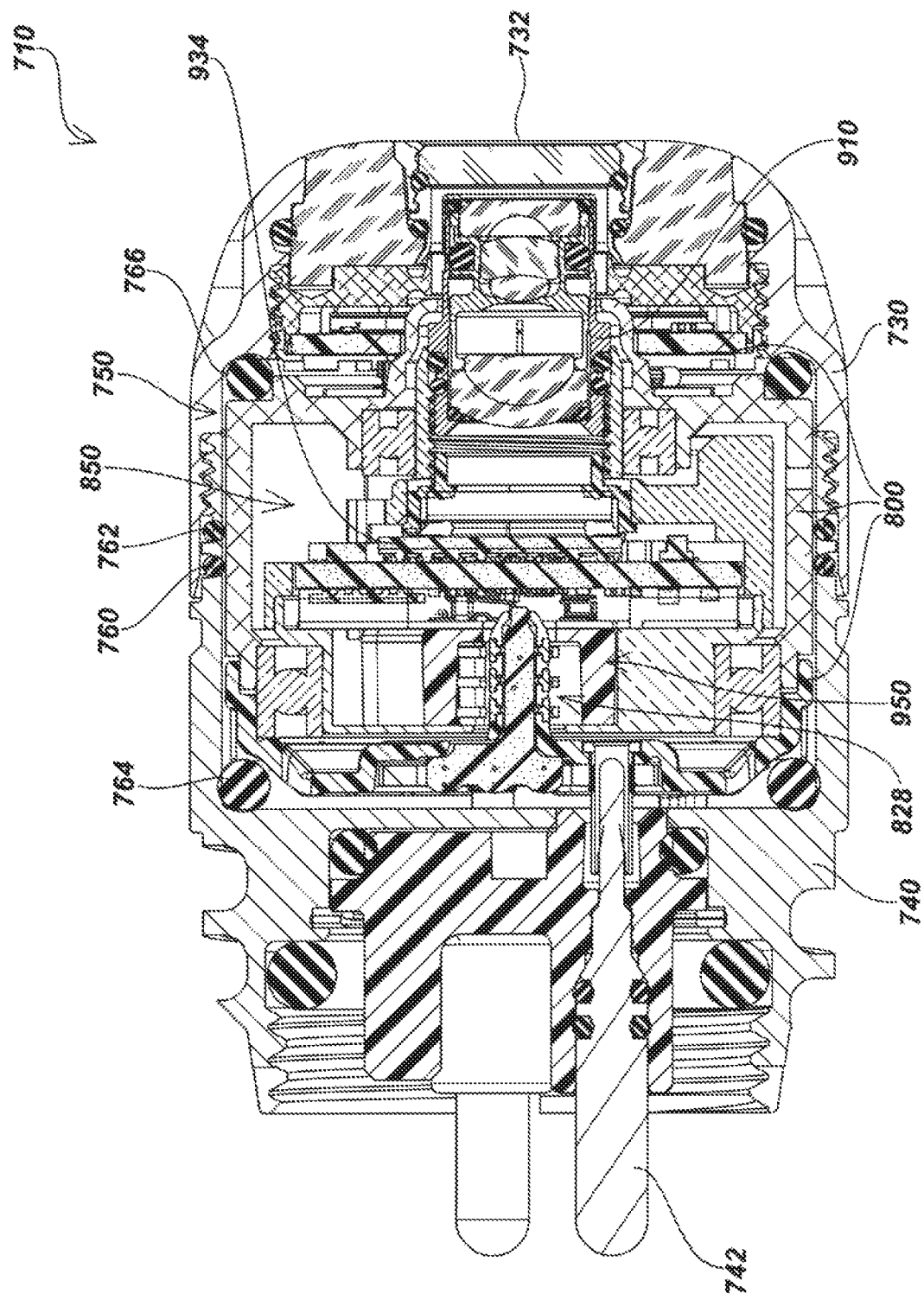
FIG. 10 is a section view of the camera head from FIG. 7A along line 10-10.

In assembly, as illustrated in FIG. 10, the contact rings of the contact ring module 828 may fit into the rear counterweight housing 960 and into the brush contact module 950. Brushes in the brush contact module 950 may contact the contact rings of the contact ring module 828 providing electrical pathways for purposes of communicating signals and provisioning of power between the stationary assembly 800 and the rotating assembly 850.

Figure 11:
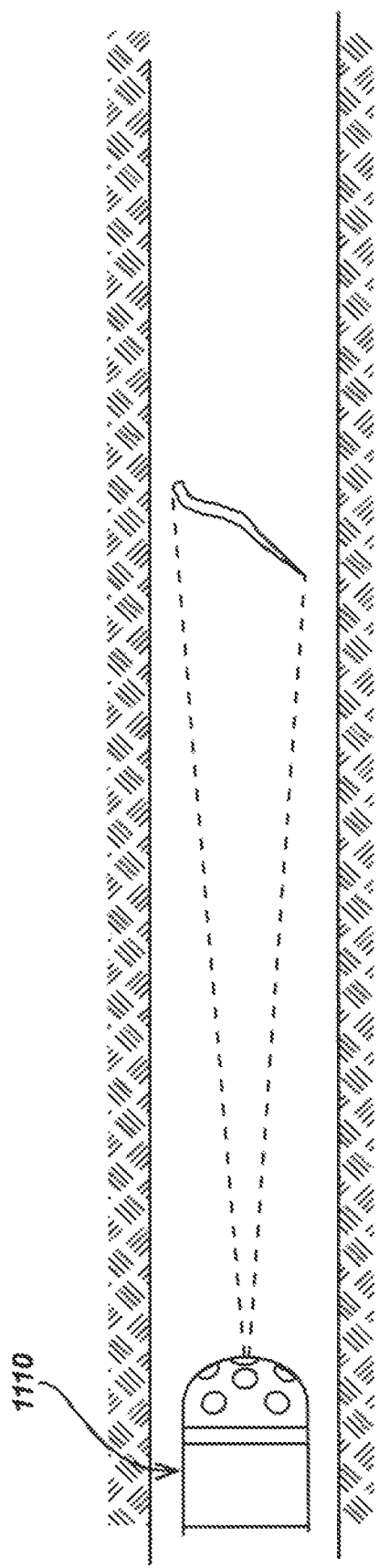
FIG. 11 is an illustration of a camera head with ranging sensors.

In some embodiments, the camera head may include one or more sensors configured as ranging devices to measure distances inside of a pipe or other inspection area. As illustrated in FIG. 11, the camera head 1110 may be the camera head embodiment 110 of FIG. 1, camera head 210 of FIGS. 2A and 2B, camera head 510 of FIG. 5, camera head 610 of FIG. 6, camera head 710 of FIGS. 7A-10 with the addition of rangefinder sensors and/or otherwise configured as a ranging device. Likewise, the camera head 1110 may be or share aspects with the camera head 1210 of FIG. 12. The range finding may be achieved through one or more imaging sensors and/or through dedicated ranging devices/sensors such as vertical-cavity surface-emitting laser time of flight (VCSEL TOF) sensors. In some embodiments, one or more image sensors may operate for optical ranging. In some embodiments, a camera head such as camera head 1110 configured for generating ranging measurements may generate measurements of objects or elements in the pipe or other inspection area.

Figure 12:
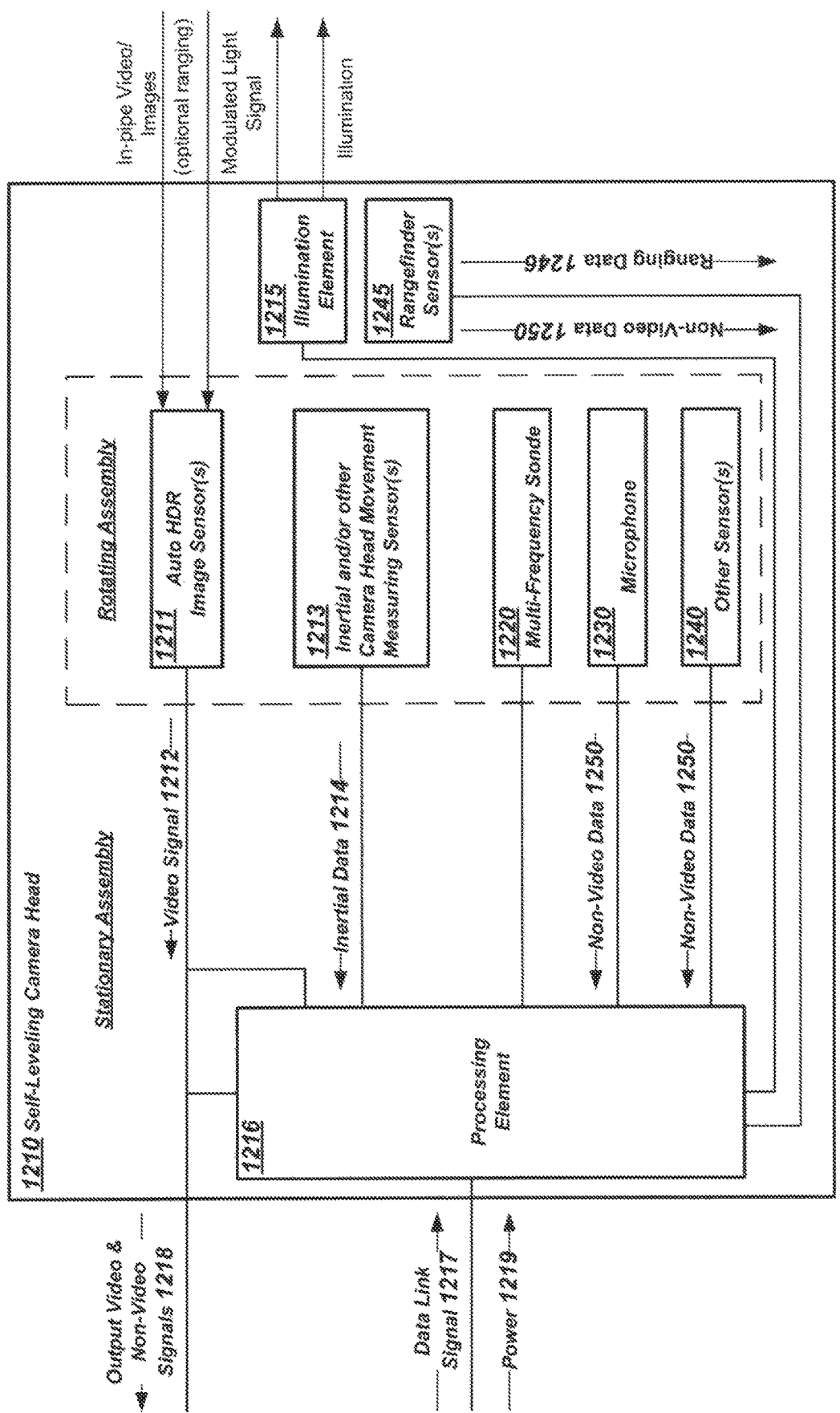
FIG. 12 is a diagram of a camera head having one or more ranging sensors.

Turning to FIG. 12, a diagram of a camera head 1210 in keeping with the present disclosure is illustrated which may be a self-leveling camera head configured for ranging. The stationary assembly may refer to the internal camera component assembly or assemblies that are moveable relative to the camera head housing. The rotating assembly may refer to the internal camera assembly or assemblies configured to rotate relative to the camera head housing. Such rotations may generally allow the rotating assembly components to remain upright with respect to gravity.

The camera head 1210 may be or share aspects with the mechanical or digital self-leveling camera heads described in U.S. patent application Ser. No. 13/358,463, filed Jan. 25, 2012, entitled Self-Leveling Inspection Systems and Methods and U.S. Pat. No. 8,587,648, issued Nov. 19, 2013, entitled Self-Leveling Camera Head. The content of each of these applications is incorporated by reference herein in its entirety.

The image sensors of camera head 1210 may be one or more Auto HDR image sensors 1211 generating HDR video signal(s) 1212 which may be video and images of scenes from the inside of a pipe. The image sensor(s) 1211 may be disposed in the rotating assembly of camera head 1210 such that the image sensor(s) rotate to be upright with respect to gravity. One or more of the image sensors 1211 may be configured as ranging sensors to measure distances and/or generate measurements of elements or objects in the pipe. Camera head 1210 may further include one or more dedicated ranging sensors 1245 likewise to measure distances and/or generate measurements of elements or objects in the pipe. The ranging sensors 1245 may be or include vertical-cavity surface-emitting laser time of flight (VCSEL TOF) sensors and/or other ranging sensors producing ranging data 1246 communicated with processing element 1216.

Camera head 1210 may one or more inertial sensors and/or other camera head movement measuring sensor(s) 1213 for generating inertial data 1214 relating to measured positions, orientations, and movements (or lack thereof) of camera head 1210. The inertial sensors and/or other camera head movement measuring sensor(s) 1213 may include accelerometers, magnetometers, gyroscopic sensors, and/or other sensors for or relating to measuring positions, orientations, and movements (or lack thereof) of camera head 1210. The inertial sensor and/or other camera head movement measuring sensor(s) 1213 of FIG. 12 may further include an optional thermometer configured to measure temperature in the camera head 1210. The inertial sensor(s) and/or other camera head movement measuring sensor(s) 1213 may be nine-axis sensors, six-axis sensors, or other sensors measuring along any number axes or combination of sensors measuring along different axes.

The rotating assembly of camera head 1210 may further include a variety of other non-video sensors and elements. For instance, the rotating assembly of camera head 1210 may include a multi-frequency Sonde 1220, a microphone 1230, and/or a variety of other sensors 1240 (e.g., humidity sensors, temperature sensors, or the like). The multi-frequency Sonde 1220 may broadcast a multitude of electromagnetic dipole signals that may be measured at the ground surface by a utility locating device. The microphone 1230 and other sensors 1240 may produce non-video data 1250 relating to in-pipe audio and other non-video aspects.

The stationary assembly may include an illumination element 1215 which may be or include LEDs or other light producing elements configured to illuminate the view of the one or more image sensors 1211. One or more other sensors 1240 (e.g., humidity sensors, rangefinder sensors, or the like) may also be included in the stationary assembly producing non-video data. In some embodiments, the stationary assembly may include one or more additional nine axis sensors configured to produce inertial data which may be compared against inertial data generated by nine axis sensors and/or other camera head movement measuring sensors in the rotating assembly. In camera head 1210, a processing element 1216 may be disposed on the stationary assembly configured to receive video signals 1212, inertial data 1214, ranging data 1246, and non-video data 1250 such as that from microphone 1230 and other sensors 1240 and/or, in some embodiments, other non-video data from other devices in other camera head or otherwise directly or indirectly wired or wirelessly coupled system devices. Such non-video data may include datalink signals 1217 which may include instructions from other system devices. In some embodiments, the datalink signal 1217 may include cable counting data from a cable counting element corresponding to the measured amount of the push cable dispensed from a drum reel.

Corrected inertial data and pipe mapping methods, such as method 300 of FIG. 3, may be performed partially or fully in the processing element 1216 of camera head 1210 and/or in the various processing elements of other system devices (e.g., CCU, utility locating device, other computing devices, or the like). The processing element 1216 may be configured to receive datalink signals 1217 and perform operations relating to received instructions as well as communicate instructions to the various sensors and other elements of camera head 1210. Power 1219 may likewise be provided to processing element 1216 for provisioning to the camera head 1210. The processing element 1216 may generate output video and non-video data signals 1218 communicated via the push cable to other system devices. Output video and non-video data signals may include data relating to video signals 1212, inertial data 1214, and other non-video data 1250.

Figure 13:
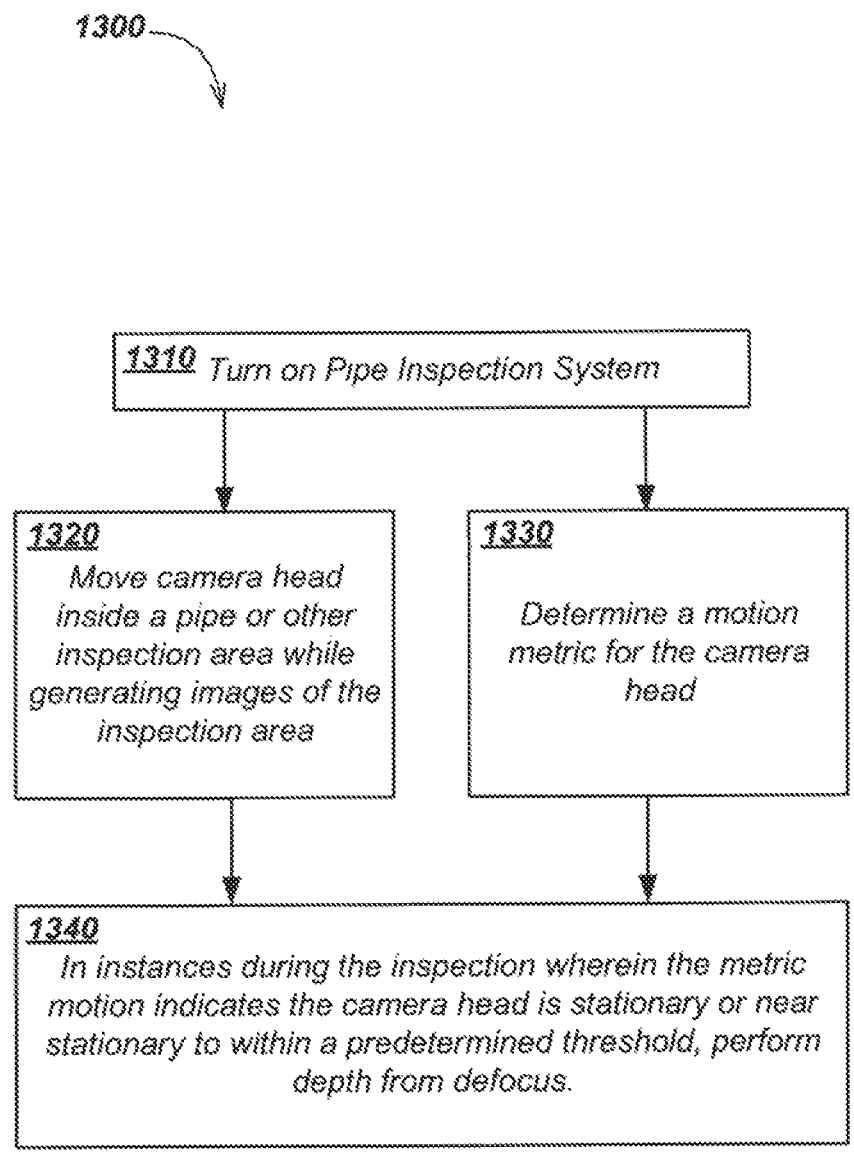
FIG. 13 is a method for depth from defocus for pipe inspection systems.

Some camera head and system embodiments in keeping with the present disclosure may be configured to perform depth from defocus measurements. As described in method 1300 of FIG. 13, the pipe inspection system may be turned on in a step 1310. For instance, a user may power on a system including at least a camera control unit that is coupled to a camera head. In a step 1320, the camera head may be moved inside a pipe or other inspection area generating images of the inspection area. Such images may include still and/or video images. In a step 1330 parallel with step 1320, a motion metric may be determined regarding the motion of the camera head. For instance, the motion metric may be determined by one or more multi-axis inertial sensors disposed in the camera head, cable counting element such as that disposed in the CCU, by detecting motion through image sensors in the camera head, and/or other motion sensing sensors or elements or a combination of the aforementioned sensors and elements. In a subsequent step 1340, depth from defocus may be performed when the metric motion indicates the camera head is stationary or near stationary to within a predetermined threshold, the inspection system may perform depth from defocus measurements. The depth from defocus measurements may be processed in the camera head, CCU, other directly or wirelessly coupled system device or devices.

In some system embodiments, acoustic exciter devices may be employed at one or more locations to broadcast an audio signal which may be measured at the one or more microphones disposed in a camera head as disclosed herein. The spectral content of the audio signal measured at the camera head may allow the system to determine various aspects or qualities of the pipe or inspection environment.

Figure 14:
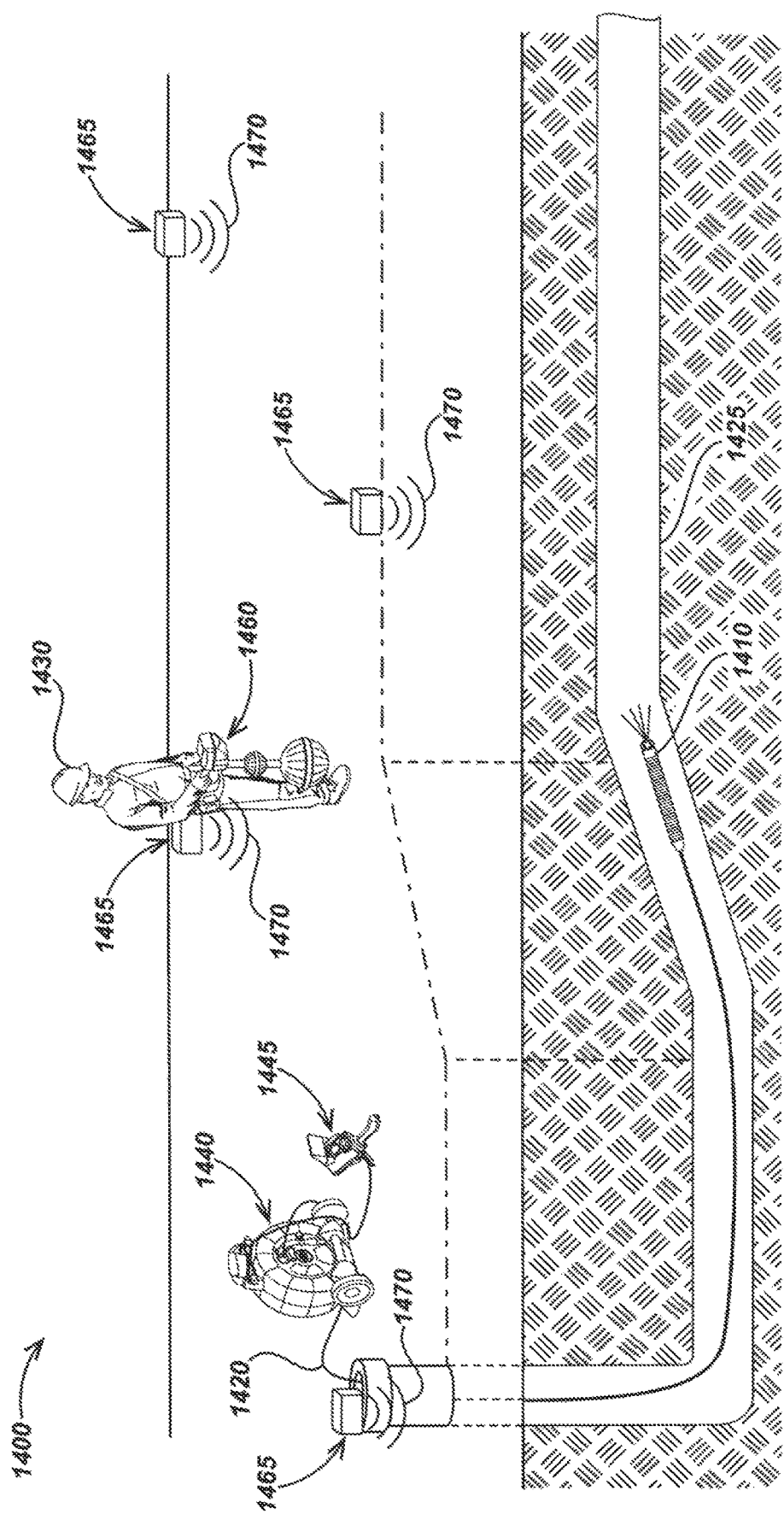
FIG. 14 is an illustration of a pipe inspection system with acoustic exciter devices.

As illustrated in FIG. 14, the inspection system 1400 may include a camera head 1410 which may be or share aspects with camera heads disclosed herein that include at least one microphone such as the camera head 510 of FIG. 5 or camera head 610 of FIG. 6. The camera head 1410 may be disposed on the distal end of a push cable 1420 that may be forced into a pipe 1425 or like inspection area by a user 1430 or other electromechanical auto-feeder device (not illustrated). The push cable 1420 may be dispensed from or into a drum reel 1440. A CCU 1445 may be coupled to the drum reel 1440 to display images, video, and/or data provided from the camera head 1410. The CCU 1445 may further control operation of the camera head 1410, displayed images/video, and/or other devices within the inspection system. Likewise, processing and storage of camera head data may, in some embodiments, partially or fully occur in CCU 1445. The system 1400 may further include a utility locating device 1460 as carried by user 1430. One or more acoustic exciter devices 1465 may be present in various locations throughout the locate environment. As illustrated in FIG. 14, some acoustic exciter device locations may include at the opening to the pipe 1425, at ground level locations corresponding to the pipe location in the ground, carried with the user 1430, and/or other locations oblique to the pipe in the ground. The acoustic exciters 1465 may broadcast an audio signal 1470 which may be measured at the one or more microphones disposed in the camera head 1410. The spectral signature of the audio signal 1470 measured at the camera head 1410 may allow the system 1400 to determine various aspects or qualities of the pipe 1425 or inspection environment. For instance, the material and/or thickness of the material present in the pipe 1425 may alter spectral signature the audio signal 1470 measured at one or more microphones in the camera head 1410. Each particular spectral signature may then be used to determine inspection or pipe parameters (e.g., pipe material type, pipe thickness, the structural integrity of the pipe, location of the camera head relative to the exciter as it traverses in the pipe or the like).

Figure 15:
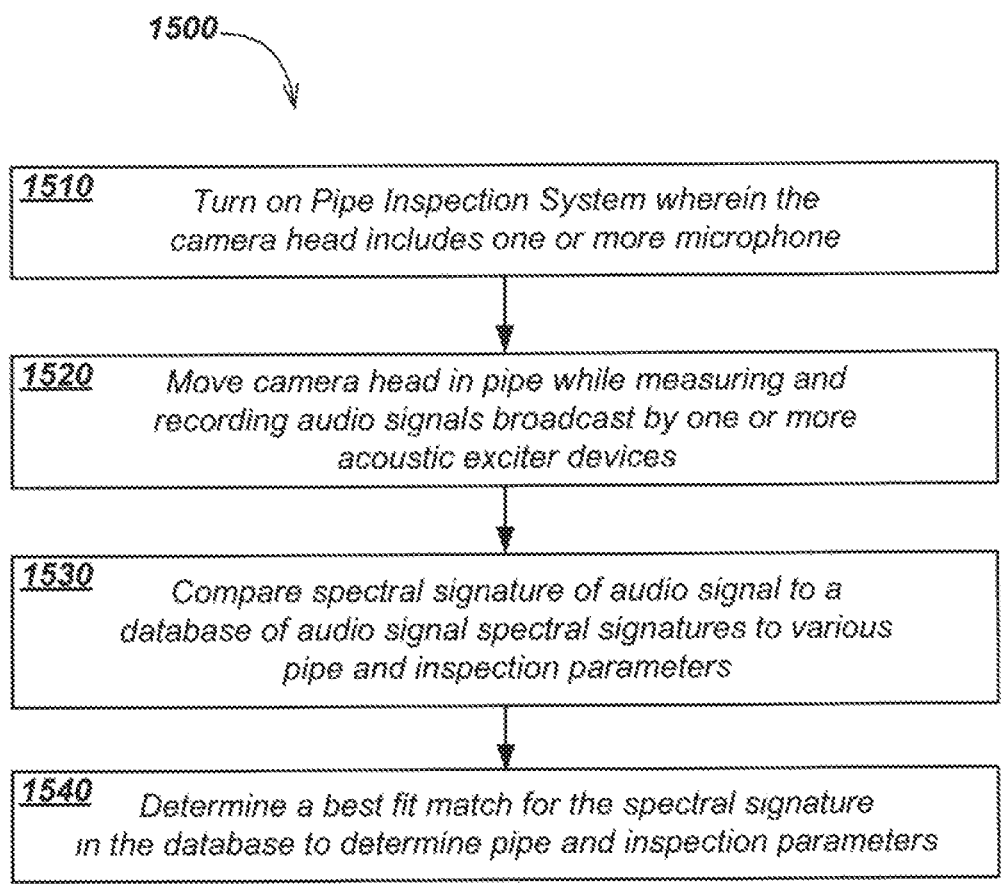
FIG. 15 is a method for determining pipe and inspection parameters from a pipe inspection system with acoustic exciter devices.
Figure 16:
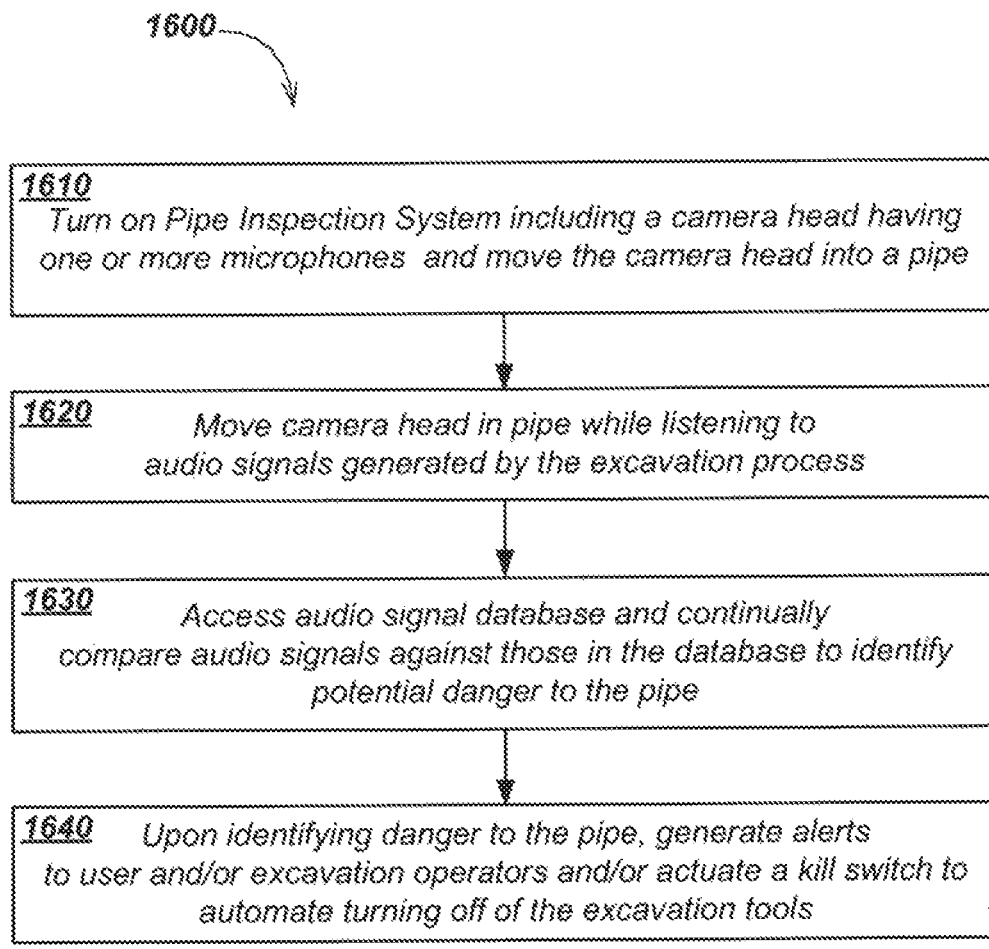
FIG. 16 is a method for alerting and/or avoiding pipe damage with a pipe inspection system having a camera head with one or more microphones.

Turning to FIG. 15, a method 1500 for using one or more acoustic exciter devices for pipe inspection systems is described. In a step 1510, the pipe inspection system including one or more acoustic exciter devices are turned on. In a step 1520, the camera head is moved in the pipe while measuring the acoustic signals broadcast by the one or more acoustic exciter devices. In a step 1530, the spectral signal of the acoustic signals are compared against a database of spectral signals that correspond to various inspection or pipe parameters (e.g., pipe material type, pipe thickness, the structural integrity of the pipe, location of the camera head relative to the exciter as it traverses in the pipe, or the like). In a step 1540, a best match to the database may be determined providing data regarding the related inspection and/or pipe parameters. The processing of acoustic signals may occur in the camera head, CCU, other connected or remotely coupled devices either in real time, near real time, or in post processing. In some embodiments, the acoustic data in combination with the inertial data collected by the camera head may be used to determine the material and/or size of the pipe. In some inspection systems having a camera head with one or more microphones, such as the camera head 510 of FIG. 5 or camera head 610 of FIG. 6, may be configured to listen for and detect the proximity to nearby excavation to further generate alerts and/or actuate a kill switch turning off the excavation tools. Such a method is described with method 1600 of FIG. 16. In a step 1610, an inspection system including a camera head having one or more microphones may be turned on and the camera head may be moved into a pipe. In a step 1620, the camera head may listen to audio signals generated by the excavation process. For instance, the excavation process may become louder as it approached the pipe or the audio signal may otherwise change as the excavating tools nears or contacts the pipe. In a step 1630, access audio signal database and continually compare audio signals against those in the database to identify potential danger to the pipe. For instance, the audio signal database may include audio signals in an acceptable range (e.g., those sounds in a range determined as safe) or may include audio signals outside an acceptable range (e.g., those sounds in a range determined as unsafe wherein the utility may be damaged due to excavation) or may include audio signals that are in an acceptable range as well as those outside an acceptable range. In a step 1640, upon identifying a danger to the pipe, the inspection system may generate alerts to alert user and/or excavation operators and/or actuate a kill switch to automate turning off of the excavation tools. In some such embodiments, the system may be equipped with a feeder device to retract the push cable and camera head.

Figure 17A:
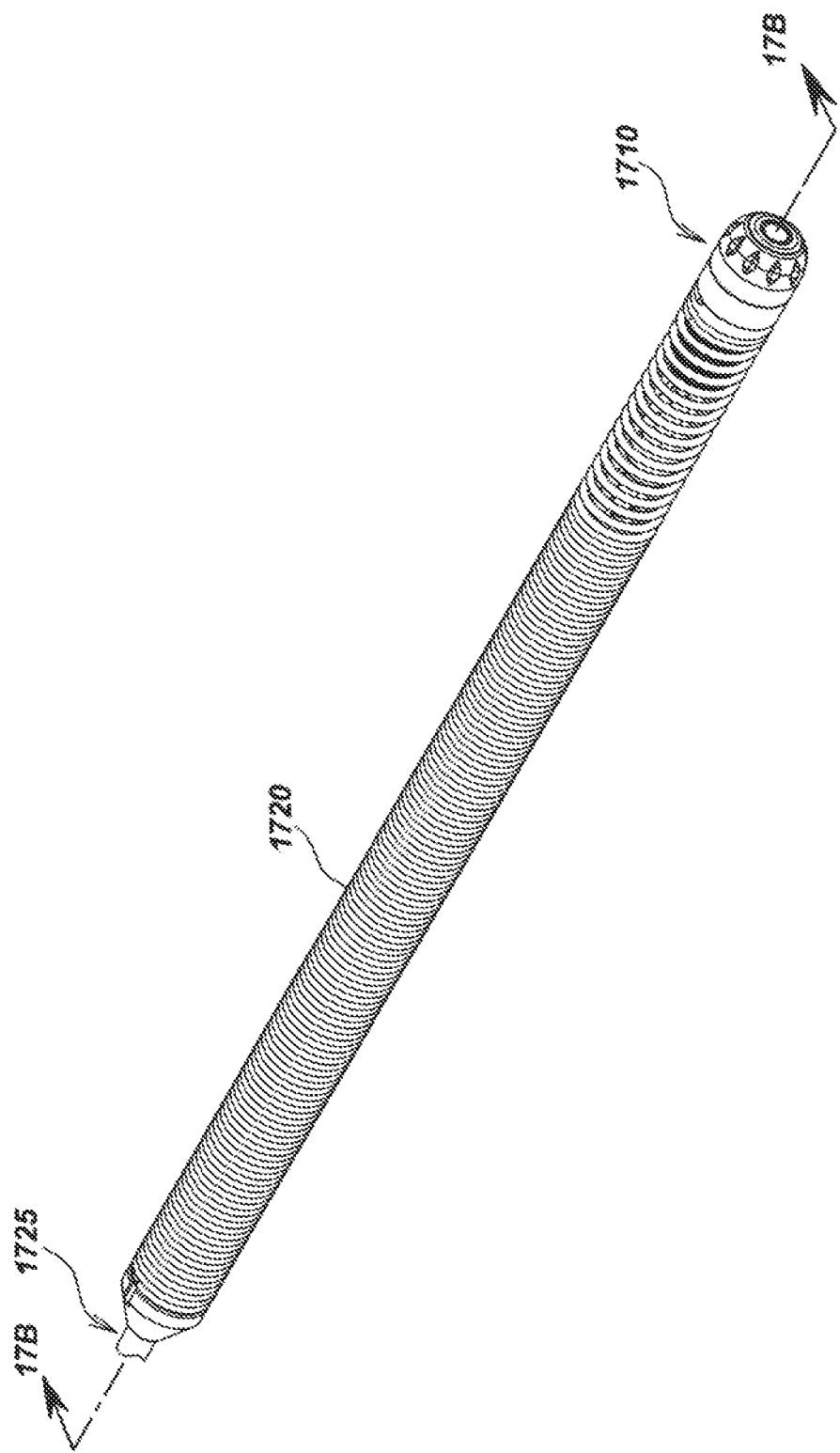
FIG. 17A is an isometric view of a camera head with a push cable spring attached.
Figure 17B:
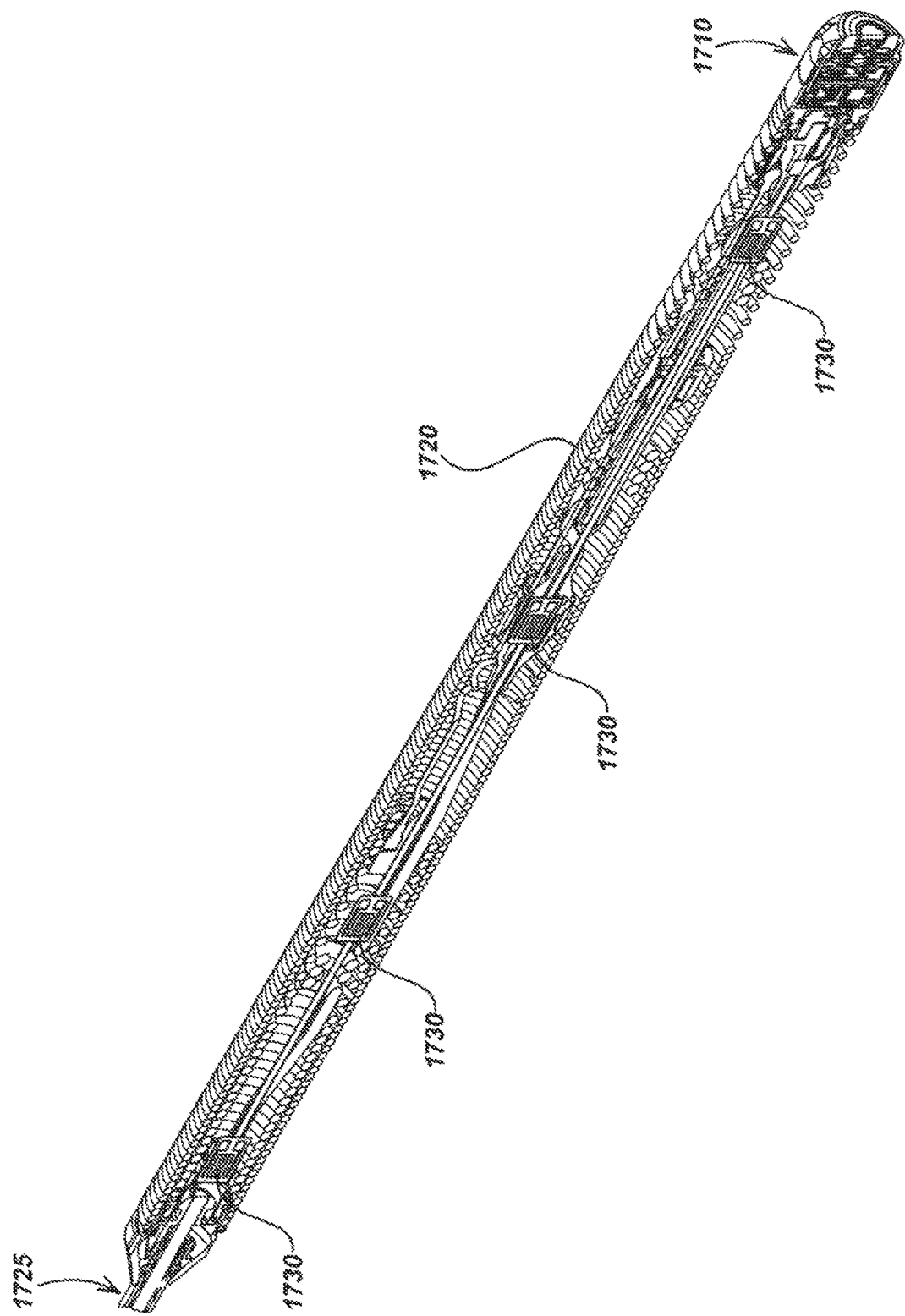
FIG. 17B is a section view of the camera head and push cable spring from FIG. 17A along line 17B-17B.

Turning to FIGS. 17A and 17B, the camera head 1710, which may be or share aspects with the various camera head embodiments disclosed herein further having a push cable spring 1720 couple behind camera head 1710 on the end. The push cable spring 1720, as well as the various push cable springs described herein, may be formed through 3D printing process. In assembly, the opposite end of the push cable spring 1720 may couple to a push cable 1725 which, in an inspection system, further connect to a drum reel and a CCU such as the drum reel 1840 and CCU 1845 of system 1800 of FIG. 18. In the assembly of FIGS. 17A and 17B, the push cable spring 1720 may be used to further improve movement and/or handling of the camera head 1710 into and inside a pipe or other void.

As illustrated in FIG. 17B, a series of strain gauges 1730 may be arranged in various locations in the push cable spring 1720. The strain gauges may transmit their output to the camera head 1710 and/or a CCU and/or other coupled or wirelessly connected system devices to estimate the configuration of the push cable spring 1720 as it moves through bends and turns in the pipe. In other embodiments, the one or more strain gauges may instead or additionally be disposed around or in a length of push cable, such as push cable 1725, rather than in the push cable spring, such as push cable spring 1720. In the various embodiments, the one or more strain gauges, such as strain gauges 1730, may measure both the degree and direction of the movements. The strain gauge data may further be used to determine and map the path of the camera head through the pipe or other conduit.

Figure 18:
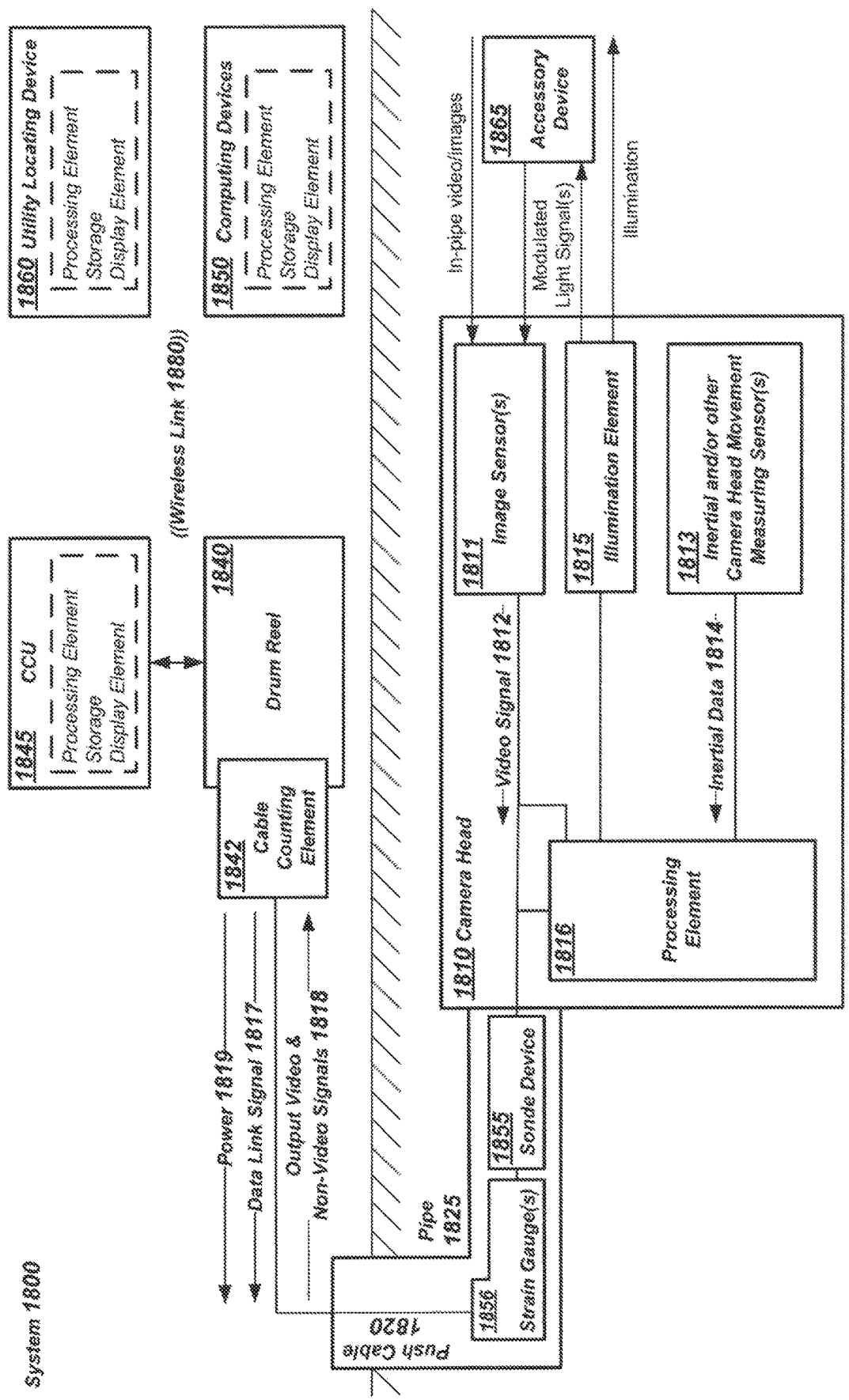
FIG. 18 is a diagram describing aspects of another pipe inspection and mapping system embodiment.

A diagram of a pipe inspection and mapping system embodiment 1800 which may include one or more strain gauges (e.g., strain gauges 1856) is illustrated in FIG. 18. In system 1800, a camera head 1810 may include one or image sensors 1811 generating video signal(s) 1812 which may be video and images of scenes from the inside of pipe 1825 and one or more inertial sensors and/or other camera head movement measuring sensor(s) 1813 generating inertial data 1814 relating to measured positions, orientations, and movements (or lack thereof) of the camera head 1810. The inertial sensor(s) and/or other camera head movement measuring sensor(s) 1813 may include accelerometers, magnetometers, gyroscopic sensors, and/or other sensors for or relating to measuring positions, orientations, and movements (or lack thereof) of the camera head 1810. The inertial sensor(s) and/or other camera head movement measuring sensor(s) 1813 may be nine-axis sensors, six-axis sensors, or other sensors measuring along any number axes or combination of sensors measuring along different axes. Such inertial data may further include movements estimating the configuration of a push cable 1820 coupled to camera head 1810 via one or more strain gauges 1856 as the assembly is moved through bends and turns in pipe 1820. In other embodiments, the one or more strain gauges may instead or additionally be disposed around or in a push cable spring, such as push cable spring 1720 of FIG. 17B, rather than in the push cable 1820 of FIG. 18. In the various embodiments, the one or more strain gauges, such as strain gauges 1856, may measure both the degree and direction of movements. The one or more image sensors 1811 may be HDR or auto HDR imagers. An illumination element 1815 may be disposed in camera head 1810 that may be or include LEDs or other light producing elements configured to illuminate the field of view of the one or more image sensors 1811.

The camera head 1810 may include a processing element 1816 configured to receive video signals 1812 and inertial data 1814 and, in some embodiments, other non-video data from other sensors or elements in the camera head or otherwise directly or indirectly wired or wirelessly coupled system devices. Such non-video data may include datalink signals 1817 which may include instructions from other system devices. In some embodiments, the datalink signal 1817 may include cable counting data from a cable counting element 1842 corresponding to the measured amount of push cable 1820 dispensed from drum reel 1840. The cable counting element 1842 is illustrated as coupled to the drum reel 1840 in system 1800. In some system embodiments, a cable counting element such as cable counting element 1842 may be included for measuring the amount of push cable dispensed. Power 1819 may likewise be provided to processing element 1816 for provisioning to the camera head 1810. For instance, the CCU 1845, drum reel 1840, or other connected system device may be battery powered or otherwise connect to a power outlet which may further power the camera head 1810.

Corrected inertial data and pipe mapping methods, such as method 300 of FIG. 3, may be performed partially or fully in the processing element 1816 of camera head 1810. Such corrected inertial data may include inertial data determined via strain gauges 1856. Such processing may additionally or instead occur in processing elements disposed in the CCU 1845 and/or utility locating device 1860 and/or computing devices 1850 and/or other system devices containing a processing element. Likewise, storage of system data, including video signals and data, inertial data, output of inertial data and pipe mapping methods, and/or other system data may occur in the CCU 1845 and/or utility locating device 1860 and/or computing devices 1850 and/or other system devices containing storage which include one or more non-transitory memories. The processing element 1816 may be configured to receive datalink signals 1817 and perform operations relating to received instructions as well as communicate instructions to the various sensors and other elements of camera head 1810.

The processing element 1816 may generate output video and non-video data signals 1818 communicated via push cable 1820 to the CCU 1845 and/or utility locating device 1860 and/or computing devices 1850 and/or other system devices. Output video and non-video data signals 1818 may include data relating to video signal 1812 and inertial data 1814.

Displaying of video/image data may occur at one or more system devices equipped with a display element (e.g., CCU 1845, utility locating device 1860, computing devices 1850, or the like). A wireless link 1880 may allow the exchange of data between the drum reel 1840 and/or CCU 1845 and the utility locating device 1860 as well as the exchange of data between the drum reel 1840 and/or CCU 1845 and one or more other wirelessly connected computing devices 1850. The computing devices 1850 may be or include smart phones, laptop computers, and/or other like portable or non-portable computing devices 1850. In some embodiments, such computing devices 1850 may include one or more remote servers.

Turning to FIGS. 19A and 19B, the camera head 1910, which may be or share aspects with the various camera head embodiments disclosed herein further having a push cable spring 1920 couple behind camera head 1910 on end. In assembly, the opposite end of the push cable spring 1920 may couple to a push cable 1925 which, in an inspection system, may further connect to a drum reel and a CCU such as the drum reel 2140 and CCU 2145 of system 2100 of FIG. 21. In the assembly of FIGS. 19A and 19B, the push cable spring 1920 may be used to further improve movement and/or handling of the camera head 1910 into and inside a pipe or other void. An optical lace system 1930 may be disposed in the push cable spring 1920. The optical lace system 1930 may estimate the configuration of the push cable spring 1920 (or length of push cable 1925 in some alternative embodiments) as the assembly moves through bends and turns in the pipe or other conduit. For instance, the optical lace system 1930 may include a deformable lattice structure embedded with optical fibers or similar optical pathways to interpret the movement of light via a series of sensors in order to determine the degree, direction, and location of deformation movements along the lattice structure. In use with a pipe inspection system, as an assembly containing the optical lace system is moved through bends and turns in a pipe or other conduit resulting deformation movements in the lattice structure may be interpreted, in both degree and direction, and mapped as movements of the camera head at a known distance from the optical lace system. Such inertial data generated via the optical lace system 1930 may further be communicated to one or more processing elements in the camera head 1910 and/or a CCU and/or other coupled or wirelessly connected system devices. In some embodiments, an optical lace system, such as optical lace system 1930, may instead or additionally be disposed around or in a length of push cable 1925. In some embodiments, the push cable spring 1920 and/or lattice structure of the optical lace system 1930 may be 3D printed.

Figure 20:
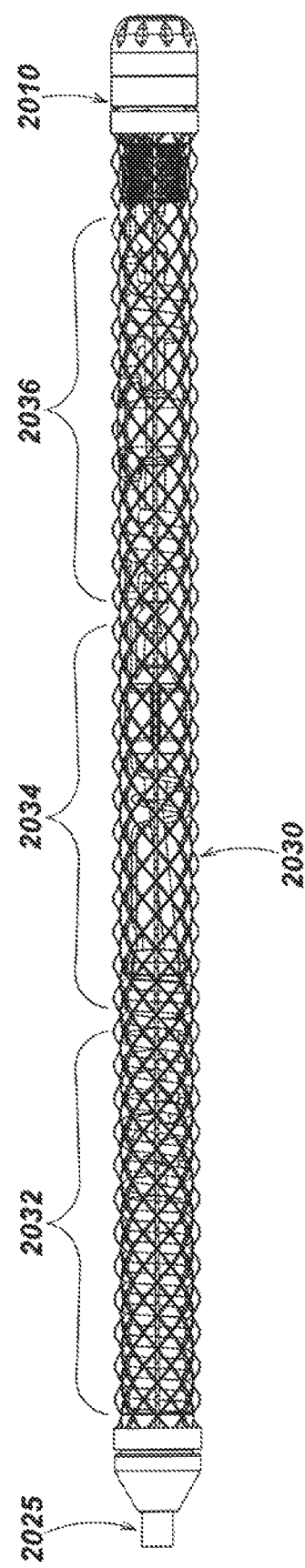
FIG. 20 is an illustration of a camera head, optical lace system, and push cable assembly there the optical lace system functions as a push cable spring.

Turning to FIG. 20, a camera head 2010, which may be or share aspects with the various camera head embodiments disclosed herein, is further illustrated having an optical lace system 2030 that may further function as a push cable spring to provide improved movement and/or handling control of a camera head 2010 into and inside a pipe or other void. The optical lace system 2030 may couple behind camera head 2010 on the end and couple to a push cable 2025 on the opposite end. In an inspection system, the push cable 2025 may further connect to a drum reel and a CCU such as the drum reel 2140 and CCU 2145 of system 2100 of FIG. 21. The optical lace system 2030 may, beyond generating inertial data corresponding to degree and direction of movement of the camera head as moved through bend and turns in a pipe or other conduit, may have various sections of differing stiffness, such as optical lace sections 2032, 2034, and 2036, allowing for improved control and handling of the assembly. For instance, optical lace section 2036 may be the least stiff allowing the camera head 2010 to more easily be moved along bends and turns. The remaining optical lace sections 2034 and 2032 may be increasingly more stiff to better match the stiffness of the push cable 2025 and allow the assembly to otherwise more readily be moved into and through a pipe or like conduit. In some embodiments, the lattice structure of the optical lace system 2030 may be 3D printed. In some embodiments, a push cable spring, such as the push cable spring 1920 of FIGS. 19A and 19B, may itself contain optical fibers or similar optical pathways further coupled to one or more illumination sources and optical sensors in order to determine the degree and direction of bending movements of the push cable spring.

Figure 21:
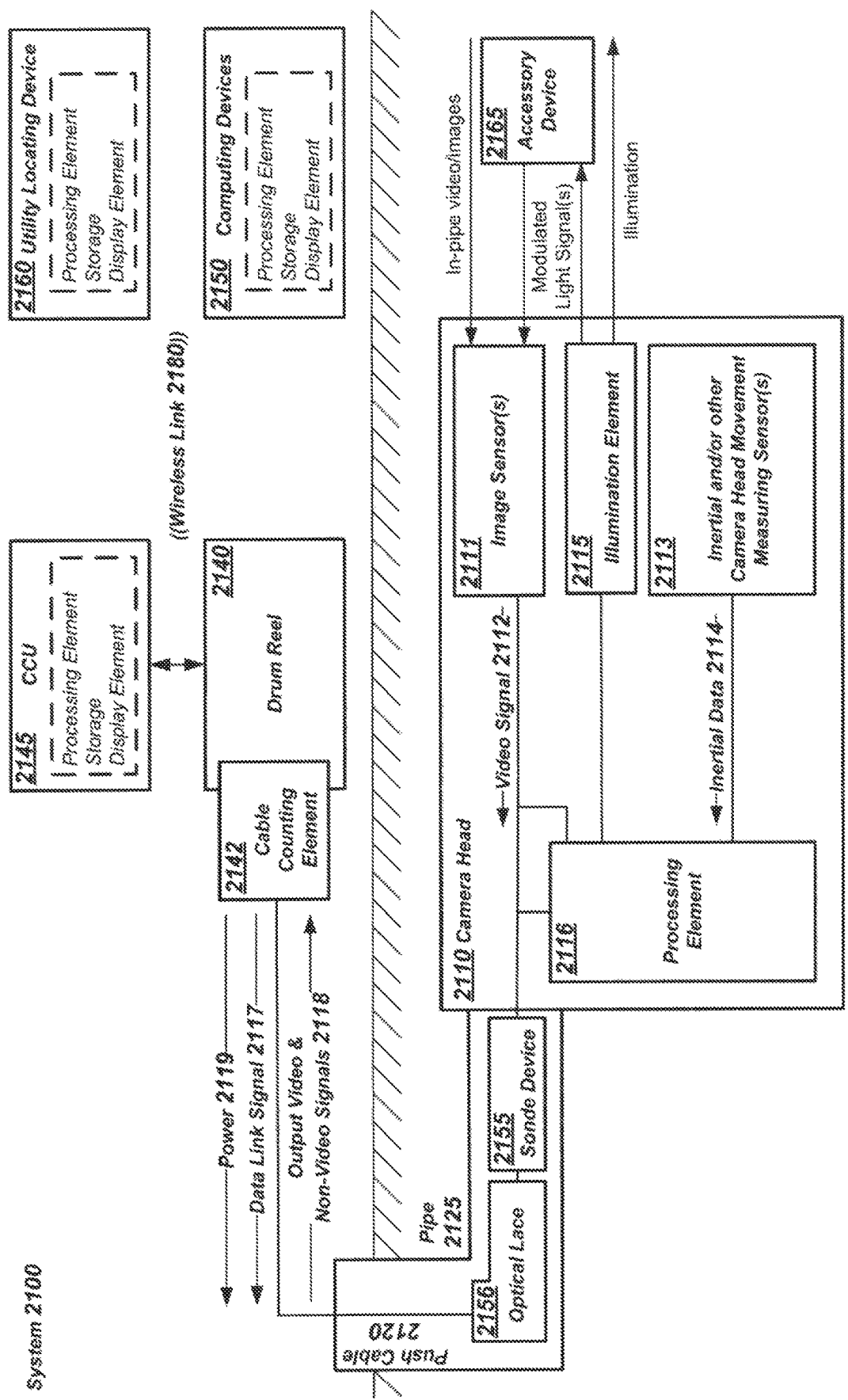
FIG. 21 is a diagram describing aspects of another pipe inspection and mapping system embodiment.

A diagram of a pipe inspection and mapping system embodiment 2100 which may include an optical lace system (e.g., optical lace 2156) is illustrated in FIG. 21. In system 2100, a camera head 2110 may include one or image sensors 2111 generating video signal(s) 2112 which may be video and images of scenes from the inside of pipe 2125 and one or more inertial and/or other camera head movement measuring sensor(s) 2113 generating inertial data 2114 relating to measured positions, orientations, and movements (or lack thereof) of the camera head 2110. The inertial sensor(s) and/or other camera head movement measuring sensor(s) 2113 may include accelerometers, magnetometers, gyroscopic sensors, and/or other sensor for or relating to measuring positions, orientations, and movements (or lack thereof) of the camera head 2110. The inertial sensor(s) and/or other camera head movement measuring sensor(s) 2113 may be nine-axis sensors, six-axis sensors, or other sensors measuring along any number axes or combination of sensors measuring along different axes. Such inertial data may further include movements estimating the configuration of a push cable 2120 coupled to camera head 2110 via optical lace 2156 as the assembly is moved through bends and turns in pipe 2120. In other embodiments, the optical lace may instead or additionally be disposed around or in a push cable spring, such as push cable spring 1720 of FIG. 17B, and/or be the push cable spring mechanism in providing improved handling of the assembly as described with the optical lace system 2030 of FIG. 20. In the various embodiments, the optical lace system, such as optical lace 2156, may measure both the degree and direction of bending movements as the assembly is moved through bends and turns.

The one or more image sensors 2111 may be HDR or auto HDR imagers. An illumination element 2115 may be disposed in camera head 2110 that may be or include LEDs or other light producing elements configured to illuminate the field of view of the one or more image sensors 2111.

The camera head 2110 may include a processing element 2116 configured to receive video signals 2112 and inertial data 2114 and, in some embodiments, other non-video data from other sensors or elements in the camera head or otherwise directly or indirectly wired or wirelessly coupled system devices. Such non-video data may include datalink signals 2117 which may include instructions from other system devices. In some embodiments, the datalink signal 2117 may include cable counting data from a cable counting element 2142 corresponding to the measured amount of push cable 2120 dispensed from drum reel 2140. The cable counting element 2142 is illustrated as coupled to the drum reel 2140 in system 2100. In some system embodiments, a cable counting element such as cable counting element 2142 may be included for measuring the amount of push cable dispensed. Power 2119 may likewise be provided to processing element 2116 for provisioning to the camera head 2110. For instance, the CCU 2145, drum reel 2140, or other connected system device may be battery powered or otherwise connect to a power outlet which may further power the camera head 2110.

Corrected inertial data and pipe mapping methods, such as method 300 of FIG. 3, may be performed partially or fully in the processing element 2116 of camera head 2110. Such corrected inertial data may include inertial data determined via optical lace 2156. Such processing may additionally or instead occur in processing elements disposed in the CCU 2145 and/or utility locating device 2160 and/or computing devices 2150 and/or other system devices containing a processing element. Likewise, storage of system data, including video signals and data, inertial data, output of inertial data and pipe mapping methods, and/or other system data may occur in the CCU 2145 and/or utility locating device 2160 and/or computing devices 2150 and/or other system devices containing storage which include one or more non-transitory memories. The processing element 2116 may be configured to receive datalink signals 2117 and perform operations relating to received instructions as well as communicate instructions to the various sensors and other elements of camera head 2110.

The processing element 2116 may generate output video and non-video data signals 2118 communicated via push cable 2120 to the CCU 2145 and/or utility locating device 2160 and/or computing devices 2150 and/or other system devices. Output video and non-video data signals 2118 may include data relating to video signal 2112 and inertial data 2114.

Displaying of video/image data may occur at one or more system devices equipped with a display element (e.g., CCU 2145, utility locating device 2160, computing devices 2150, or the like). A wireless link 2180 may allow the exchange of data between the drum reel 2140 and/or CCU 2145 and the utility locating device 2160 as well as the exchange of data between the drum reel 2140 and/or CCU 2145 and one or more other wirelessly connected computing devices 2150. The computing devices 2150 may be or include smart phones, laptop computers, and/or other like portable or non-portable computing devices 2150. In some embodiments, such computing devices 2150 may include one or more remote servers.

Figure 22A:
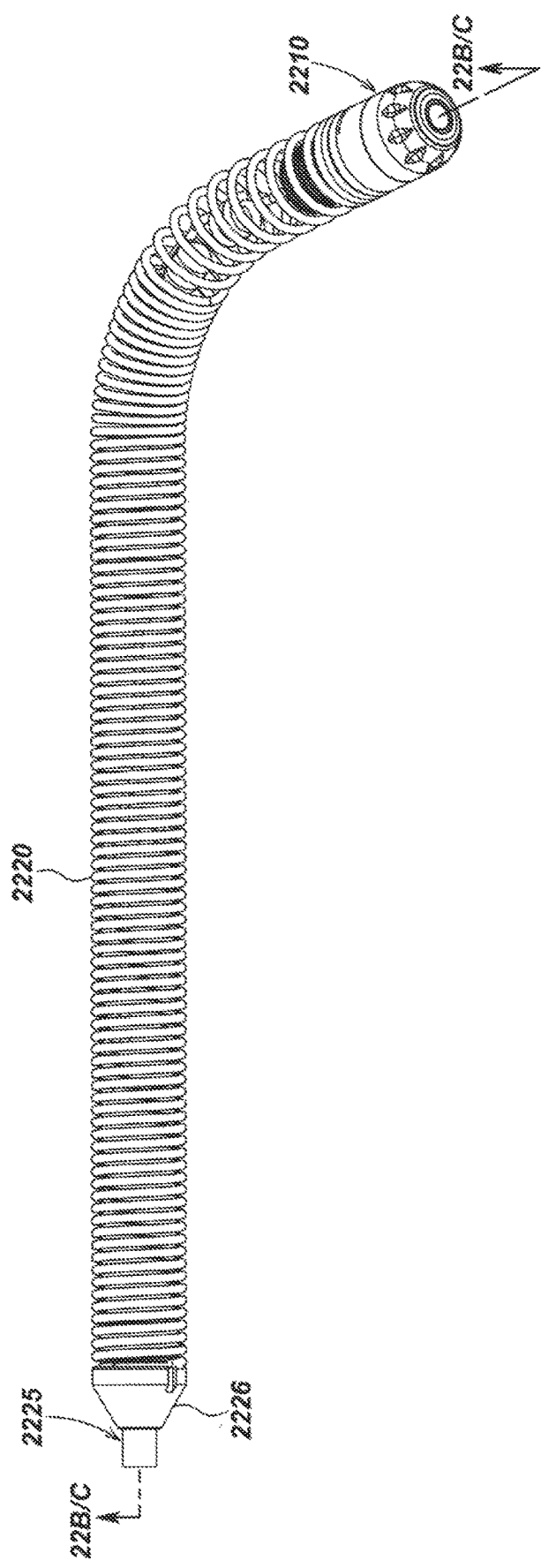
FIG. 22A is an illustration of a camera head, push cable spring, and push cable assembly.
Figure 22B:
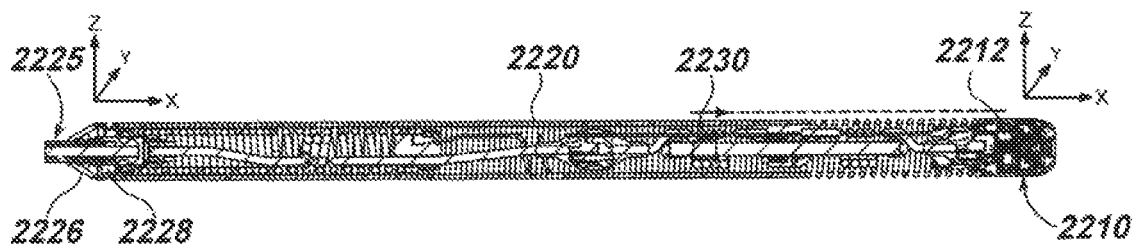
FIG. 22B is a section view of the assembly from FIG. 22A along line 22A/B-22A/B demonstrating relative alignment of spatial separated inertial sensors when the assembly is straightened.
Figure 22C:
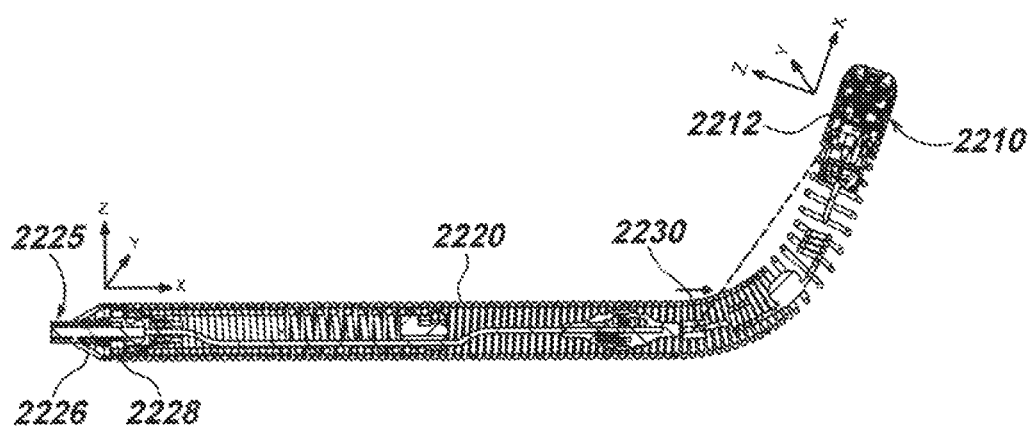
FIG. 22C is a section view of the assembly from FIG. 22A along line 22A/B-22A/B demonstrating relative alignment of spatial separated inertial sensors when the assembly is bent.

Turning to FIGS. 22A-22C, a camera head 2210, which may be or share aspects with the various camera head embodiments disclosed herein including a push cable spring 2220 coupled behind camera head 2210 and between the camera head 2210 and a push cable 2225. A termination 2226 may couple the push cable 2225 and push cable spring 2220. The push cable spring 2220 may be used to further improve movement and/or handling of the camera head 2210 into and inside a pipe or other void.

As illustrated in FIGS. 22B and 22C, one or more inertial sensors 2228 which may be or include magnetometers, gyroscopic sensors, accelerometers, and/or other motion or motion related sensors may be disposed in the termination 2226. In other embodiments, inertial sensors may likewise or instead be included in or on push cable 2225 and/or push cable spring 2220 in a known orientation relative to the inertial sensors 2212 in the camera head 2210. The inertial sensor 2212 may be or include magnetometers, gyroscopic sensors, accelerometers, and/or other motion or motion related sensors and/or be the nine axis sensors described in the various embodiments herein. The inertial sensors 2210 and 2228 may transmit their output to processing elements disposed in the camera head 2210 and/or a CCU and/or other coupled or wirelessly connected system devices to estimate and map the degree and direction of bends and turns in a pipe or other conduit as the assembly is made to move through. For instance, inertial sensors 2210 and 2228 may have a known alignment relative to one another as illustrated in FIG. 22B. When a change in alignment has occurred, as illustrated in FIG. 22C, the amount of difference may be measured and used to determine the degree and direction of the bend or turn experience and further mapped via the camera head 2210. A measure of the change of alignment between inertial sensors 2210 and 2228 may, for instance, utilize lookup tables or other indexing operations and/or various other computational methods to determine the degree and direction of the bend or turn experience and mapped via the camera head 2210.

Still referring to FIGS. 22B and 22C, the assembly may further include one or more magnets, such as magnet 2230, disposed in a known location relative to the one or more inertial sensors 2210 and/or 2228 which may be or include magnetometers. The orientation of the polarity of magnet 2230 may be known such that when a bend or turning movement occurs at the assembly, the degree and direction of the bend or turn may be determined via change in alignment and distance between magnet 2230 and the one or more inertial sensors 2210 and 2228. In some such embodiments, the magnet 2230 may be cylindrical, toroidal, or some other shape. Likewise, such an embodiment may include more than one magnet which may also be located in the camera head 2210, in or near the push cable spring 2220, push cable 2225, and/or termination 2226.

Figure 23:
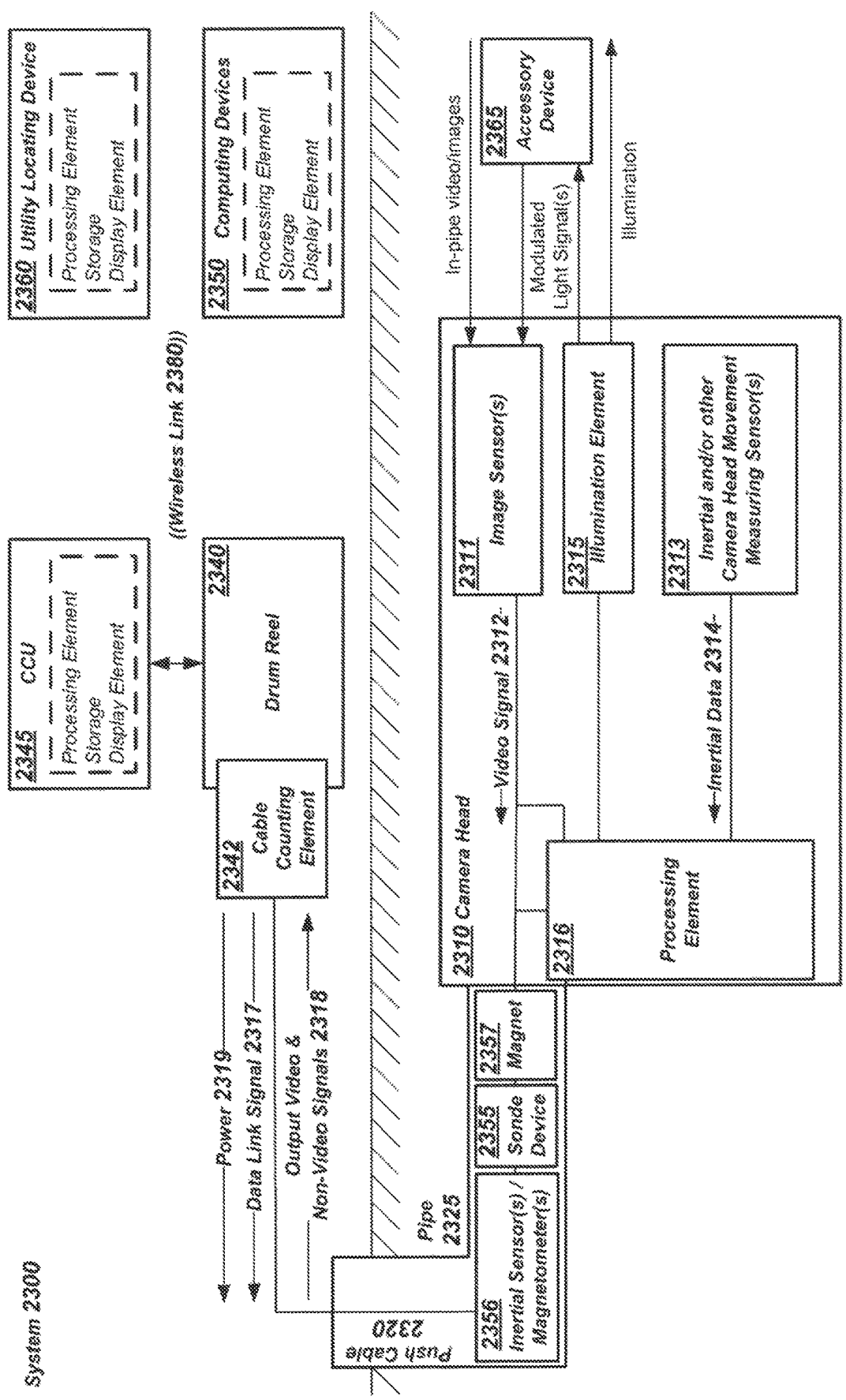
FIG. 23 is a diagram describing aspects of another pipe inspection and mapping system embodiment.

A diagram of a pipe inspection and mapping system embodiment 2300 which may include multiple inertial sensors, magnetometers, and/or like sensors with known orientations in different locations to determine bends and turns in pipes (e.g., inertial sensor(s)/magnetometer(s) 2356 and inertial sensor(s) and/or other camera head movement measuring sensor(s) 2313) is illustrated in FIG. 23. In such a system as pipe inspection and mapping system embodiment 2300, the degree and direction of misalignment between such sensors (e.g., inertial sensor(s)/magnetometer(s) 2356 and inertial sensor(s) and/or other camera head movement measuring sensor(s) 2313) may allow for the degree and direction of bends in a pipe to be determined and mapped. In some such systems as pipe inspection and mapping system embodiment 2300, one or more magnets, such as magnet 2357, may be disposed along push cable 2320 or otherwise in a location relative to the one or more sensors (e.g., inertial sensor(s)/magnetometer(s) 2356 and inertial sensor(s) and/or other camera head movement measuring sensor(s) 2313). The orientation of the magnet's 2230 polarity may be known such that when a bend or turning movement occurs at the assembly, the degree and direction of the bend or turn may be determined via change in alignment and distance to between magnet 2230 and the one or more sensors. In some such embodiments, the magnet 2230 may be cylindrical, toroidal, or some other shape. Likewise, such an embodiment may include more than one magnet which may also be located in the camera head 2210, in or near the push cable spring 2220, push cable.

In system 2300, a camera head 2310 may include one or image sensors 2311 generating video signal(s) 2312 which may be video and images of scenes from the inside of pipe 2325 and one or more inertial sensor(s) and/or other camera head movement measuring sensor(s) 2313 generating inertial data 2314 relating to measured positions, orientations, and movements (or lack thereof) of the camera head 2310. The inertial sensor(s) and/or other camera head movement measuring sensor(s) 2313 may include accelerometers, magnetometers, gyroscopic sensors, and/or other sensors for or relating to measuring positions, orientations, and movements (or lack thereof) of the camera head 2310. Such inertial data may further include movements estimating the bending configurations of a push cable 2320 coupled to camera head 2310 via a measured difference in alignment between the inertial sensor(s) and/or other camera head movement measuring sensor(s) 2313 and one or more additional inertial sensors/magnetometer(s) 2356 in or around push cable 2320 that may be generated as the assembly is moved through bends and turns in pipe 2320. In other embodiments, the inertial sensors may instead or additionally be disposed around or in a push cable spring, such as push cable spring 1720 of FIG. 17B, and/or a termination such as termination 2226 of FIGS. 22A-22C.

The one or more image sensors 2311 of camera head 2310 may be HDR or auto HDR imagers. An illumination element 2315 may be disposed in camera head 2310 that may be or include LEDs or other light producing elements configured to illuminate the field of view of the one or more image sensors 2311.

The camera head 2310 may include a processing element 2316 configured to receive video signals 2312 and inertial data 2314 and, in some embodiments, other non-video data from other sensors or elements in the camera head or otherwise directly or indirectly wired or wirelessly coupled system devices. Such non-video data may include datalink signals 2317 which may include instructions from other system devices. In some embodiments, the datalink signal 2317 may include cable counting data from a cable counting element 2342 corresponding to the measured amount of push cable 2320 dispensed from drum reel 2340. The cable counting element 2342 is illustrated as coupled to the drum reel 2340 in system 2300. In some system embodiments, a cable counting element such as cable counting element 2342 may be included for measuring the amount of push cable dispensed. Power 2319 may likewise be provided to processing element 2316 for provisioning to the camera head 2310. For instance, the CCU 2345, drum reel 2340, or other connected system device may be battery powered or otherwise connect to a power outlet which may further power the camera head 2310.

Corrected inertial data and pipe mapping methods, such as method 300 of FIG. 3, may be performed partially or fully in the processing element 2316 of camera head 2310. Such corrected inertial data may include inertial data determined via differences in inertial sensors such as inertial sensors/magnetometer(s) 2356 and inertial sensor(s) and/or other camera head movement measuring sensor(s) 2313. Such processing may additionally or instead occur in processing elements disposed in the CCU 2345 and/or utility locating device 2360 and/or computing devices 2350 and/or other system devices containing a processing element. Likewise, storage of system data, including video signals and data, inertial data, output of inertial data and pipe mapping methods, and/or other system data may occur in the CCU 2345 and/or utility locating device 2360 and/or computing devices 2350 and/or other system devices containing storage which include one or more non-transitory memories. The processing element 2316 may be configured to receive datalink signals 2317 and perform operations relating to received instructions as well as communicate instructions to the various sensors and other elements of camera head 2310.

The processing element 2316 may generate output video and non-video data signals 2318 communicated via push cable 2320 to the CCU 2345 and/or utility locating device 2360 and/or computing devices 2350 and/or other system devices. Output video and non-video data signals 2318 may include data relating to video signal 2312 and inertial data 2314.

Displaying of video/image data may occur at one or more system devices equipped with a display element (e.g., CCU 2345, utility locating device 2360, computing devices 2350, or the like). A wireless link 2380 may allow the exchange of data between the drum reel 2340 and/or CCU 2345 and the utility locating device 2360 as well as the exchange of data between the drum reel 2340 and/or CCU 2345 and one or more other wirelessly connected computing devices 2350. The computing devices 2350 may be or include smart phones, laptop computers, and/or other like portable or non-portable computing devices 2350. In some embodiments, such computing devices 2350 may include one or more remote servers.

Figure 24:
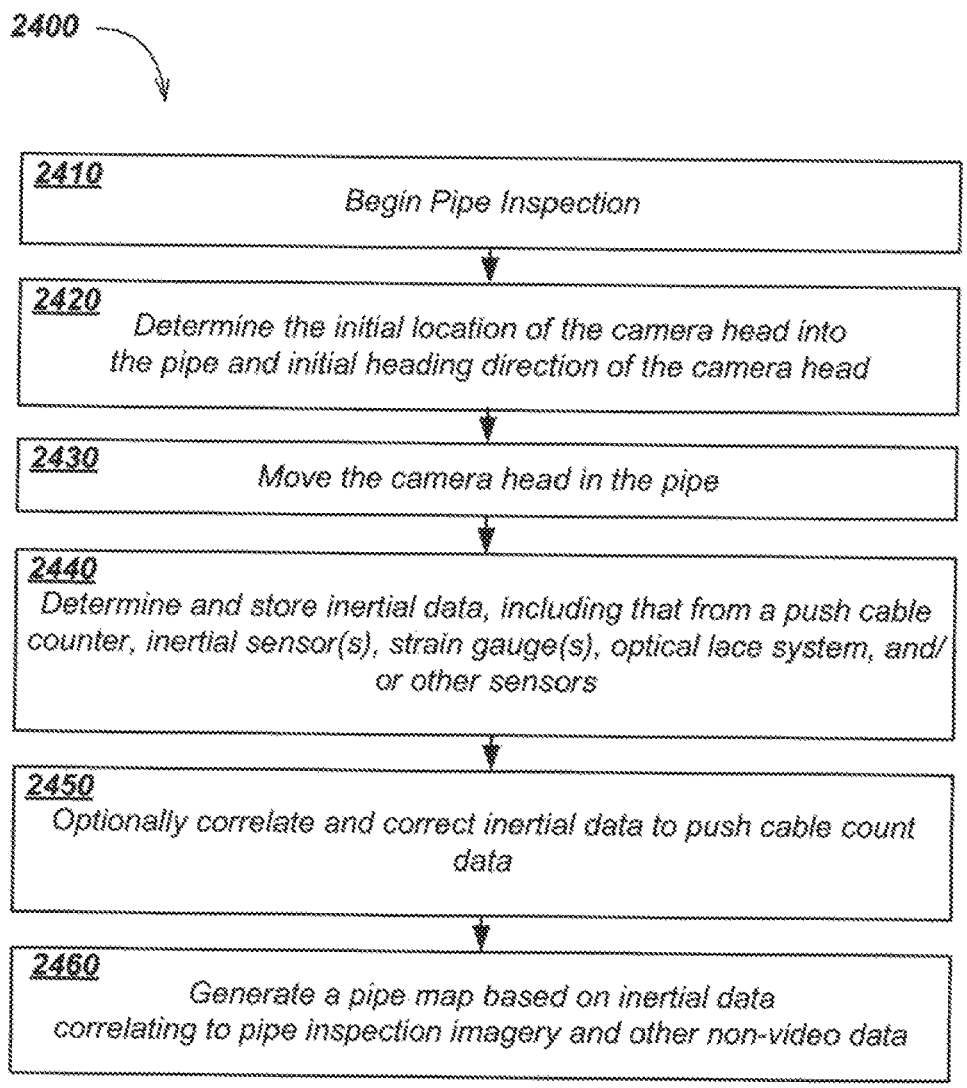
FIG. 24 is a method for pipe mapping including the use of various inertial sensors.

Turning to FIG. 24, a method 2400 for generating corrected inertial data and a subsequent pipe map is described. In a step 2410, the pipe inspection operation may begin. In a step 2420, the initial location of the camera head into a pipe and heading or orientation may be determined. Step 2420 may, for instance, include the use of magnetometers in the camera head to determine heading/orientation. In a step 2430, the camera head may be moved in a pipe. In a step 2440, movement data relating to the camera head may be determined and stored. For instance, inertial data relating to movement of the camera head may be determined via a push cable counter, various inertial sensors (including redundant inertial sensors at different system location configured to measure bending movements), strain gauges, optical lace systems, and/or other like sensors or systems. In an optional step 2450, the inertial data may be correlated and corrected to push cable count data (e.g., through method 300 of FIG. 3). In a step 2460, a pipe map may be generated based on inertial data correlating to pipe inspection imager and other non-video data.

Figure 25:
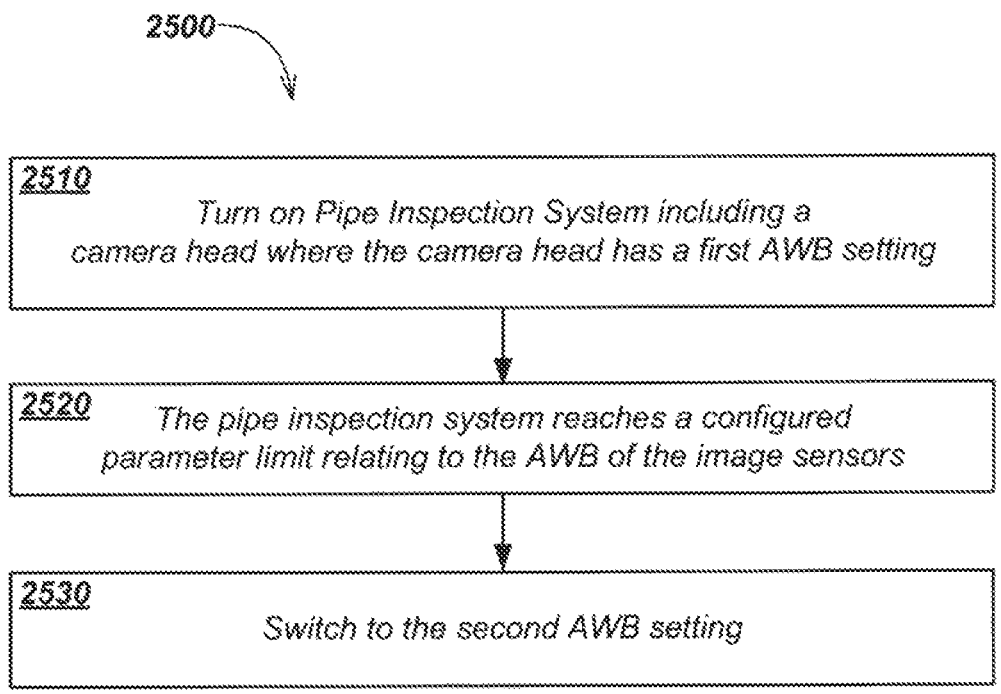
FIG. 25 is a method for controlling automatic white balance (AWB) in a pipe inspection system.

Turning to FIG. 25, the camera head embodiments described herein may use a method 2500 to control on and off automatic white balance (AWB). In a step 2510, the inspection system may be turned on wherein the AWB is set to a first AWB setting. The first AWB setting may be on and optimized for the environment outside of a pipe allowing the camera to clearly view the environment outside the pipe. In a step 2520, the pipe inspection system reaches a configured parameter limit relating to the AWB of the camera head image sensors. For instance, the configured parameter limit may be a certain time from startup (generally long enough for the camera head to have entered the pipe), a certain push cable count provided by a cable counter element, a level of movement detected by the inertial sensors and/or image sensors, or other parameter allowing the outside of the pipe to be viewed with optimized AWB and for AWB to be turned off or down to optimize viewing inside of a pipe. In a step 2530, the inspection system may switch to a second AWB setting. The second AWB setting may, for instance, turn AWB off completely or turn the sensitivity down. The various AWB settings may be configured to match the camera heads LED light output, stored in memory on the camera head and/or CCU and/or other coupled or remotely connected system devices. In some embodiments, the second AWB setting may further be determined by color sensors in the camera head adjustably defined according to a look up table which may use time and temperature as variables that may be measured by sensors disposed in the camera head.

In one or more exemplary embodiments, certain functions, methods and processes described herein related to control of and/or data communication to or from imaging modules, illumination modules, processing elements, and/or other electronic elements of camera heads and associated inspection systems may be implemented in hardware, software, firmware or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed herein are examples of exemplary approaches. Based upon design preferences, it is understood that the specific order or hierarchy of steps or stages in the processes may be rearranged while remaining within the scope of the present disclosure. Any accompanying method claims present elements of the various steps in a sample order and are not meant to be limited to the specific order or hierarchy presented unless explicitly noted.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles or any combination thereof.

Those of skill would further appreciate that the various illustrative logical blocks, modules, circuits and algorithm steps described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein and, for example, in processing elements as described herein may be implemented or performed with a general purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. A processing element may further include or be coupled to one or more memory elements for storing instructions, data and/or other information in a non-transitory digital storage format.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, CD-ROMs or any other form of storage medium known or developed in the art. An exemplary storage medium is coupled to the processor such that the processor can read information from and write information to the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The scope of the disclosure is not intended to be limited to the aspects shown herein, but is to be accorded the full scope consistent with the language of this specification and accompanying drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the invention. Thus, the scope of the invention is not intended to be limited to the aspects shown herein but is to be accorded the widest scope consistent with the principles and novel features disclosed herein.

We claim:

1. A system for inspecting and/or mapping pipes or cavities, comprising:
    a cable storage drum;
    a push-cable, retractably stored inside the cable storage drum, having a distal end and a proximal end;
    a camera head, coupled to the distal end of the push-cable, comprising one or more image sensors to capture images and/or videos from interior of a pipe or cavity, the camera head movable in a first direction when the push-cable is deployed into the pipe or cavity and a second direction, different from the first direction, when the push-cable is retracted from the pipe or cavity;
    one or more multi-axis inertial sensors disposed in the camera head to sense inertial data corresponding to movement of the camera head in the first direction and the second direction; and
    a processing element communicatively coupled to the image sensors and the inertial sensors to receive the images and/or videos from the image sensors and the sensed inertial data from the inertial sensors; and generate, based at least on the received images and/or videos and the inertial data sensed during movement of the camera head in the first direction and the second direction, information pertaining to the pipe or cavity.

2. The system of claim 1, further comprising a cable counter to generate cable count data indicative of an amount of cable dispensed or retracted to/from the cable storage drum.

3. The system of claim 2, wherein the generated information pertaining to the pipe or cavity is further based on the cable count data.

4. The system of claim 2, wherein the processing element correlates, based at least on the cable count data, the inertial data sensed in the first direction and the second direction and associates the images and/or videos of the pipe or cavity with the correlated data to generate a pipe map, wherein one or more location points on the pipe map corresponds to location points on a ground surface.

5. The system of claim 1, further comprising one or more buried utility locator devices to receive electromagnetic field signals emitted from a hidden or buried pipe or cavity and determine, based at least on the received electromagnetic field signals, location or position of the hidden or buried pipe or cavity.

6. The system of claim 1, further comprising one or more electronic devices communicatively coupled to the processing element to display and/or store the images and/or videos representing interior of the pipe or cavity.

7. The system of claim 6, further comprising a wireless transceiver module to wirelessly transmit the images and/or videos and/or inertial data for processing, storage, and/or display onto the one or more coupled electronic devices.

8. The system of claim 7, wherein the wireless transceiver module is disposed in a central hub of the cable storage drum.

9. The system of claim 1, wherein the camera head is a self-leveling camera head.

10. The system of claim 1, wherein the image sensors are high dynamic range (HDR) sensors.

11. The system of claim 1, wherein the one or more multi-axis inertial sensor comprises at least a nine-axis sensor including a three-axis accelerometer, a three-axis magnetometer and a three-axis gyroscope.

12. The system of claim 1, further including one or more acoustic exciter devices to broadcast acoustics signal in locations by the pipe being inspected.

13. The system of claim 1, including a push cable spring disposed behind the camera head that includes one or more strain gauges.

14. The system of claim 1, including a push cable spring disposed behind the camera head that includes an optical lace system configured to determine deformations in the lace network through changes in optical patterns coinciding with camera head movements in the pipe.

15. The system of claim 1, wherein the push cable spring is 3D printed.

16. The system of claim 1, wherein the push cable spring is an optical lace system.

17. The system of claim 16, wherein the optical lace system push cable spring includes a plurality of sections having various sections of differing stiffnesses.

18. The system of claim 16, wherein the camera head, push cable, and push spring assembly includes a series of spatially separated magnetometers or other inertial sensors having known orientations and the degree and direction of bends and turns in the pipe are measured and mapped at least in part based on changes in the alignment of the sensors.

19. The assembly of claim 18, further including one or more magnets having a known location or polarity orientation relative to the magnetometers/inertial sensors such that the degree and direction of bends and turns in the pipe are measured and mapped based at least in part on changes in the alignment between the magnets and sensors.

20. The assembly of claim 19, wherein the one or more magnets have a toroidal shape.

21. The assembly of claim 19, wherein the one or more magnets have a cylindrical shape.

22. The system of claim 1, including a Sonde device to broadcast a signal capable of being modulated.

* * * * *